United States Patent
Yamamoto

(10) Patent No.: US 11,232,568 B2
(45) Date of Patent: Jan. 25, 2022

(54) THREE-DIMENSIONAL IMAGE DISPLAY METHOD, THREE-DIMENSIONAL IMAGE DISPLAY DEVICE, AND RECORDING MEDIUM

(71) Applicant: OLYMPUS CORPORATION, Tokyo (JP)

(72) Inventor: Naoki Yamamoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 117 days.

(21) Appl. No.: 16/751,449

(22) Filed: Jan. 24, 2020

(65) Prior Publication Data

US 2020/0250823 A1  Aug. 6, 2020

(30) Foreign Application Priority Data

Feb. 6, 2019  (JP) .............................. JP2019-020066

(51) Int. Cl.
*G06T 7/00* (2017.01)
*G06T 7/62* (2017.01)

(52) U.S. Cl.
CPC .............. *G06T 7/0014* (2013.01); *G06T 7/62* (2017.01); *G06T 2200/04* (2013.01); *G06T 2200/08* (2013.01); *G06T 2207/10028* (2013.01); *G06T 2207/10068* (2013.01)

(58) Field of Classification Search
None
See application file for complete search history.

(56) References Cited

U.S. PATENT DOCUMENTS

| | | | |
|---|---|---|---|
| 2011/0098533 A1* | 4/2011 | Onoda | A61B 5/065 600/117 |
| 2012/0095341 A1* | 4/2012 | Shiki | A61B 8/523 600/443 |
| 2012/0113111 A1* | 5/2012 | Shiki | A61B 8/466 345/419 |
| 2012/0223937 A1* | 9/2012 | Bendall | G01B 11/24 345/419 |
| 2018/0125340 A1* | 5/2018 | Ishikawa | A61B 1/00193 |
| 2019/0008377 A1* | 1/2019 | Sumiya | G02B 26/101 |
| 2019/0094153 A1* | 3/2019 | Yamamoto | G01N 21/93 |
| 2020/0234495 A1* | 7/2020 | Nakao | H04N 21/6587 |

FOREIGN PATENT DOCUMENTS

JP  6030837 B2  11/2016

* cited by examiner

*Primary Examiner* — Jiangeng Sun
(74) *Attorney, Agent, or Firm* — Scully, Scott, Murphy & Presser, P.C.

(57) ABSTRACT

A display control unit is configured to display a second image on a display. The second image is an image of a subject seen in a first direction from a first viewpoint. A reference figure calculation unit is configured to calculate a reference figure on the basis of three-dimensional coordinates of at least two points that have been set on the basis of at least one reference point. A viewpoint calculation unit is configured to calculate a second direction and a second viewpoint on the basis of the reference figure. An image generation unit is configured to generate a third image that is a three-dimensional image of the subject seen in the second direction from the second viewpoint. The display control unit is configured to display the third image on which information representing a position of the reference figure has been superimposed on the display.

22 Claims, 37 Drawing Sheets

THREE-DIMENSIONAL IMAGE DISPLAY METHOD, THREE-DIMENSIONAL IMAGE DISPLAY DEVICE, AND RECORDING MEDIUM

BACKGROUND OF THE INVENTION

Field of the Invention

The present invention relates to a three-dimensional image display method, a three-dimensional image display device, and a recording medium.

Priority is claimed on Japanese Patent Application No. 2019-020066, filed on Feb. 6, 2019, the contents of which is incorporated herein by reference.

Description of Related Art

Industrial endoscope devices have been used for observation and inspection of internal damage, corrosion, and the like of boilers, pipes, aircraft engines, and the like. In such an endoscope device, a plurality of types of optical adapters for observing and inspecting various objects to be observed are prepared. Optical adapters are provided at the tips of endoscopes and are exchangeable. In inspection using such an endoscope device, there is a desire to quantitatively measure the size of the defect and damage of a subject. To meet such a desire, an endoscope device provided with a three-dimensional measurement function is present.

For example, an endoscope device is provided with a function of measuring geometric dimensions on the basis of information of a point designated on an image by a user. For example, in distance between two points measurement, the three-dimensional distance between two measurement points designated by a user is measured. In line-based measurement, a reference line is set on the basis of two reference points designated by a user and the three-dimensional distance from a measurement point designated by a user to the reference line is measured. In plane-based measurement, a reference plane is set on the basis of three reference points designated by a user and the three-dimensional distance from a measurement point designated by a user to the reference plane is measured.

A user designates a point on a two-dimensional image displayed on a display. The accuracy of measurement depends on the accuracy of a position of a point designated by a user. Even when a user determines that a point at the correct position has been designated, a point at a position shifted in the depth direction of an image may be designated. It is difficult to visually determine such a position shift of a point.

The technology to simplify confirmation of a position designated on an image by a user is disclosed in Japanese Patent No. 6030837. In the technology disclosed in Japanese Patent No. 6030837, a three-dimensional image of a peripheral region of a plurality of points designated by a user is displayed. A user can rotate the three-dimensional image. For this reason, a user can confirm a position of a point on an image of a subject seen from a plurality of viewpoints.

SUMMARY OF THE INVENTION

According to a first aspect of the present invention, a three-dimensional image display method includes an image acquisition step, a coordinate calculation step, a first display step, an input step, a reference figure calculation step, a viewpoint calculation step, an image generation step, and a second display step. An image acquisition unit acquires a first image that is a two-dimensional image of a subject in the image acquisition step. A coordinate calculation unit calculates three-dimensional coordinates of a plurality of points on the subject on the basis of the first image in the coordinate calculation step. A display control unit displays a second image on the display in the first display step. The second image represents an image of the subject seen in a first direction from a first viewpoint. The second image is one of the first image and a three-dimensional image of the subject generated on the basis of the three-dimensional coordinates of the plurality of points. An acceptance unit accepts input of at least one reference point in the input step. The at least one reference point is on a region included in the second image and is included in the plurality of points. A reference figure calculation unit calculates a reference figure on the basis of three-dimensional coordinates of at least two points that have been set on the basis of the at least one reference point in the reference figure calculation step. The at least two points are included in the plurality of points. A viewpoint calculation unit calculates a second direction different from the first direction and a second viewpoint different from the first viewpoint on the basis of the reference figure in the viewpoint calculation step. An image generation unit generates a third image on the basis of the three-dimensional coordinates of the plurality of points in the image generation step. The third image is a three-dimensional image of the subject seen in the second direction from the second viewpoint. The display control unit displays the third image on which information representing a position of the reference figure has been superimposed on the display in the second display step.

According to a second aspect of the present invention, in the first aspect, the reference figure may be one of a straight line, a line segment, and a plane. The second direction may be parallel to a straight line axis. The straight line axis may be perpendicular to the reference figure or parallel to the reference figure.

According to a third aspect of the present invention, in the second aspect, the reference figure may be one of the straight line and the line segment and the straight line axis may be perpendicular to the reference figure.

According to a fourth aspect of the present invention, in the second aspect, the reference figure may be one of the straight line and the line segment and the straight line axis may be parallel to the reference figure.

According to a fifth aspect of the present invention, in the second aspect, the reference figure may be the plane and the straight line axis may be parallel to the reference figure.

According to a sixth aspect of the present invention, in the second aspect, the reference figure may be one of the straight line and the line segment. The viewpoint calculation unit may calculate an approximate plane on the basis of three-dimensional coordinates of at least three points. The approximate plane is a plane that approximates a surface of the subject. The at least three points are included in the plurality of points and are near the reference figure or on the reference figure. The straight line axis may be parallel to the approximate plane.

According to a seventh aspect of the present invention, in the second aspect, the reference figure may be one of the straight line and the line segment. The viewpoint calculation unit may calculate an approximate plane on the basis of three-dimensional coordinates of at least three points. The approximate plane is a plane that approximates a surface of the subject. The at least three points are included in the plurality of points and are near the reference figure or on the reference figure. The straight line axis may be perpendicular to the approximate plane.

According to an eighth aspect of the present invention, in the second aspect, the second direction may be a direction from a first region to a second region. The straight line axis may pass through the first region and the second region. A volume of the first region and a volume of the second region may be the same. The volume of the subject included in the first region may be less than the volume of the subject included in the second region.

According to a ninth aspect of the present invention, in the second aspect, the viewpoint calculation unit may further calculate a third direction and a third viewpoint on the basis of the reference figure in the viewpoint calculation step. The third direction is different from any of the first direction and the second direction. The third viewpoint is different from any of the first viewpoint and the second viewpoint. The image generation unit may further generate a fourth image on the basis of the three-dimensional coordinates of the plurality of points in the image generation step. The fourth image is a three-dimensional image of the subject seen in the third direction from the third viewpoint. The display control unit may further display the fourth image on which information representing a position of the reference figure has been superimposed on the display in the second display step.

According to a tenth aspect of the present invention, in the ninth aspect, when the second direction and the second viewpoint that are based on the subject are changed, the image generation unit may further generate the second image again on the basis of the changed second direction and the changed second viewpoint in the image generation step. When the second viewpoint that is based on the subject is changed, the third viewpoint that is based on the subject may be changed such that a relative relationship between the second viewpoint and the third viewpoint is maintained. When the second direction that is based on the subject is changed, the third direction that is based on the subject may be changed such that a relative relationship between the second direction and the third direction is maintained. The image generation unit may further generate the fourth image again on the basis of the changed third direction and the changed third viewpoint in the image generation step. The display control unit may further display the second image generated again and the fourth image generated again on the display in the second display step.

According to an eleventh aspect of the present invention, in the second aspect, after the first display step, the display control unit may display the third image on the display in the second display step such that at least part of the third image overlaps the second image.

According to a twelfth aspect of the present invention, in the second aspect, after the first display step, the display control unit may display the third image on the display in the second display step such that the third image does not overlap the second image.

According to a thirteenth aspect of the present invention, in the second aspect, the three-dimensional image display method may further include a third display step in which the display control unit displays information that represents the second viewpoint and the second direction on the display.

According to a fourteenth aspect of the present invention, in the second aspect, the reference figure may be one of the straight line and the line segment. The image generation unit may generate the third image on the basis of three-dimensional coordinates of at least three points in the image generation step. The at least three points are included in the plurality of points and are on a plane that passes through the reference figure and is perpendicular to the straight line axis.

According to a fifteenth aspect of the present invention, in the second aspect, the reference figure may be one of the straight line and the line segment. The image generation unit may generate the third image on the basis of three-dimensional coordinates of at least three points in the image generation step. The at least three points are included in the plurality of points and are away from a plane in the second direction. The plane passes through the reference figure and is perpendicular to the straight line axis.

According to a sixteenth aspect of the present invention, in the second aspect, the reference figure may be one of the straight line and the line segment. The image generation unit may generate the third image on the basis of three-dimensional coordinates of at least three points in the image generation step. The at least three points are included in the plurality of points and are positioned in a region between a first plane and a second plane. The first plane passes through the reference figure and is perpendicular to the straight line axis. The second plane is perpendicular to the straight line axis and is away from the first plane in the second direction.

According to a seventeenth aspect of the present invention, in the second aspect, the reference figure may be the plane. The display control unit may display the third image on which distance information has been superimposed on the display in the second display step. The distance information represents a statistic of a distance between each point included in the plurality of points and the plane.

According to an eighteenth aspect of the present invention, in the first aspect, the reference figure calculation unit may calculate the reference figure on the basis of three-dimensional coordinates of at least three points in the reference figure calculation step. The reference figure may be a plane that approximates a surface of the subject. The at least three points are included in the plurality of points and are determined on the basis of the at least one reference point. The second direction may be parallel to a straight line axis. The straight line axis may be perpendicular to the reference figure or parallel to the reference figure.

According to a nineteenth aspect of the present invention, a three-dimensional image display device includes an image acquisition unit, a coordinate calculation unit, a display control unit, an acceptance unit, a reference figure calculation unit, a viewpoint calculation unit, and an image generation unit. An image acquisition unit is configured to acquire a first image that is a two-dimensional image of a subject. A coordinate calculation unit is configured to calculate three-dimensional coordinates of a plurality of points on the subject on the basis of the first image. A display control unit is configured to display a second image on the display. The second image represents an image of the subject seen in a first direction from a first viewpoint. The second image is one of the first image and a three-dimensional image of the subject generated on the basis of the three-dimensional coordinates of the plurality of points. An acceptance unit is configured to accept input of at least one reference point. The at least one reference point is on a region included in the second image and is included in the plurality of points. A reference figure calculation unit is configured to calculate a reference figure on the basis of three-dimensional coordinates of at least two points that have been set on the basis of the at least one reference point. The at least two points are included in the plurality of points. A viewpoint calculation unit is configured to calculate a second direction different from the first direction and a second viewpoint different from the first viewpoint on the basis of the reference figure. An image generation unit is configured to generate a third image on the basis of the three-dimensional coordinates of the plurality of points. The third image is a three-dimensional image of the subject seen in the second direction from the second viewpoint. The display control unit is configured to display the third image on which information representing a position of the reference figure has been superimposed on the display.

According to a twentieth aspect of the present invention, a non-transitory computer-readable recording medium saves a program for causing a computer to execute an image acquisition step, a coordinate calculation step, a first display step, an input step, a reference figure calculation step, a viewpoint calculation step, an image generation step, and a second display step. The computer acquires a first image that is a two-dimensional image of a subject in the image acquisition step. The computer calculates three-dimensional coordinates of a plurality of points on the subject on the basis of the first image in the coordinate calculation step. The computer displays a second image on the display in the first display step. The second image represents an image of the subject seen in a first direction from a first viewpoint. The second image is one of the first image and a three-dimensional image of the subject generated on the basis of the three-dimensional coordinates of the plurality of points. The computer accepts input of at least one reference point in the input step. The at least one reference point is on a region included in the second image and is included in the plurality of points. The computer calculates a reference figure on the basis of three-dimensional coordinates of at least two points that have been set on the basis of the at least one reference point in the reference figure calculation step. The at least two points are included in the plurality of points. The computer calculates a second direction different from the first direction and a second viewpoint different from the first viewpoint on the basis of the reference figure in the viewpoint calculation step. The computer generates a third image on the basis of the three-dimensional coordinates of the plurality of points in the image generation step. The third image is a three-dimensional image of the subject seen in the second direction from the second viewpoint. The computer displays the third image on which information representing a position of the reference figure has been superimposed on the display in the second display step.

According to a twenty-first aspect of the present invention, a three-dimensional image display method includes an image acquisition step, a coordinate calculation step, a first display step, an input step, a reference figure calculation step, a viewpoint calculation step, an image generation step, and a second display step. An image acquisition unit acquires a first image that is a two-dimensional image of a subject in the image acquisition step. A coordinate calculation unit calculates three-dimensional coordinates of a plurality of points on the subject on the basis of the first image in the coordinate calculation step. A display control unit displays a second image on the display in the first display step. The second image represents an image of the subject seen in a first direction from a first viewpoint. The second image is one of the first image and a three-dimensional image of the subject generated on the basis of the three-dimensional coordinates of the plurality of points. An acceptance unit accepts input of at least one reference point in the input step. The at least one reference point is on a region included in the second image and is included in the plurality of points. A reference figure calculation unit calculates a reference figure on the basis of three-dimensional coordinates of at least two points that have been set on the basis of the at least one reference point in the reference figure calculation step. The at least two points are included in the plurality of points. A viewpoint calculation unit calculates a second direction different from the first direction and a second viewpoint different from the first viewpoint on the basis of the reference figure in the viewpoint calculation step. An image generation unit generates a third image on the basis of the three-dimensional coordinates of the plurality of points in the image generation step. The third image is an image of the subject seen in the second direction from the second viewpoint. The display control unit displays the third image on which information representing a position of the reference figure has been superimposed on the display in the second display step.

DETAILED DESCRIPTION OF THE INVENTION

Hereinafter, embodiments of the present invention will be described with reference to the drawings. Hereinafter, an example in which a three-dimensional image display device is an endoscope device will be described. The three-dimensional image display device has only to be a device having a function of displaying an image and is not limited to an endoscope device. A subject is an industrial product.

First Embodiment

Figure 1:
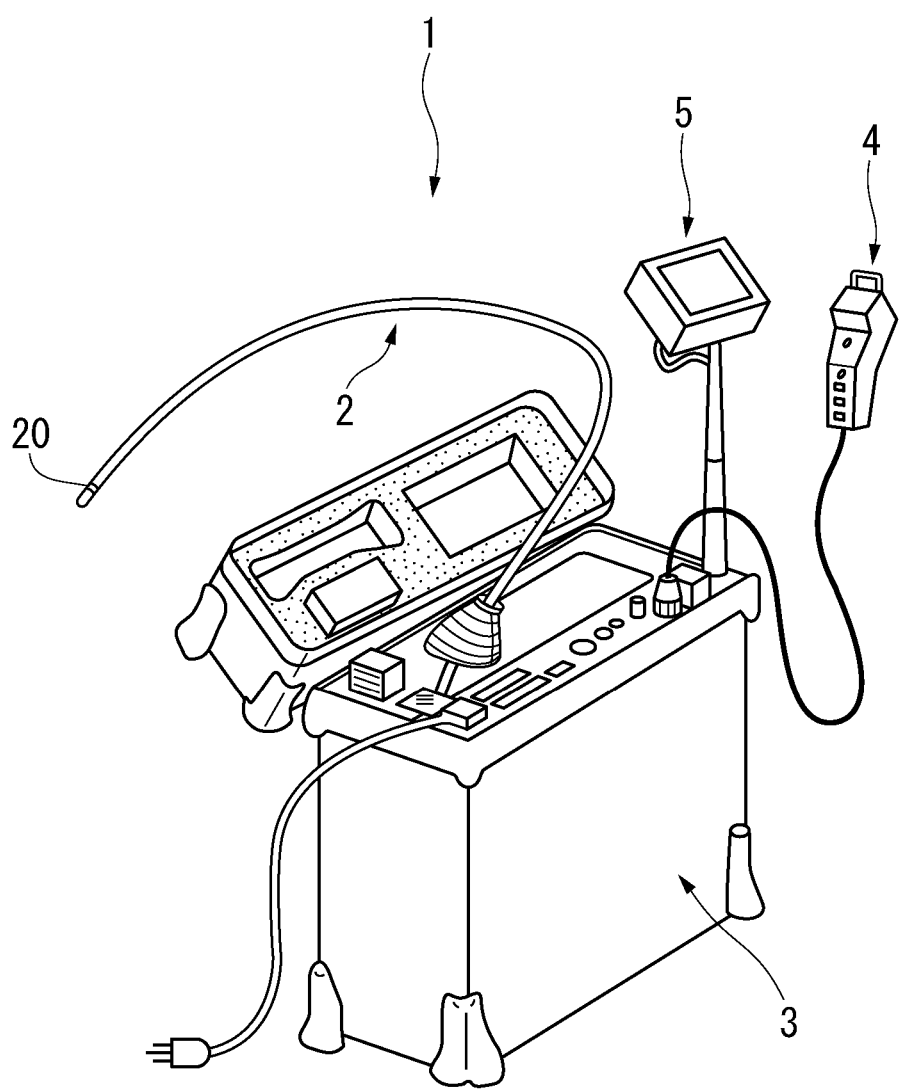
FIG. 1 is a perspective view showing an entire configuration of an endoscope device according to a first embodiment of the present invention.
Figure 2:
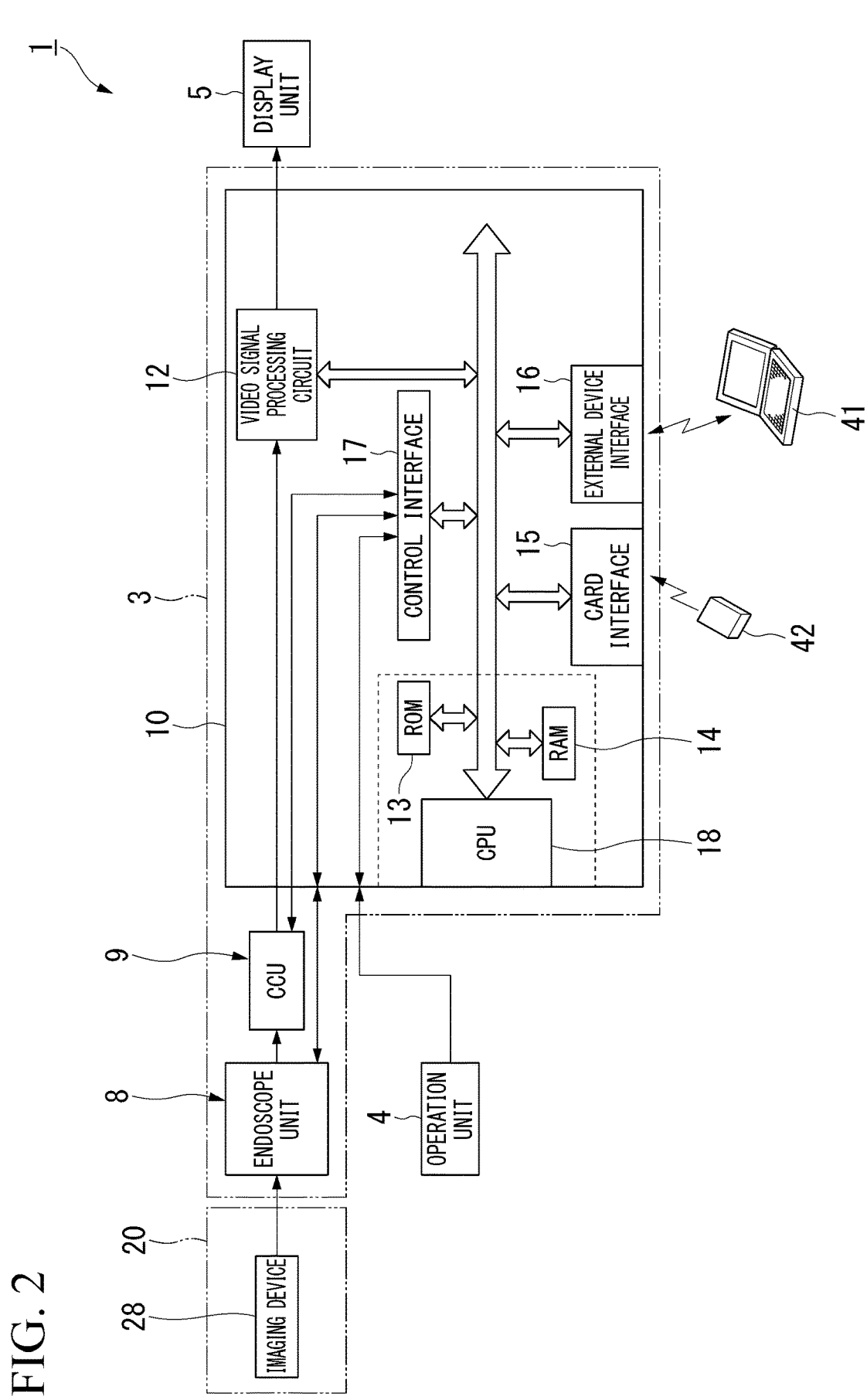
FIG. 2 is a block diagram showing an internal configuration of the endoscope device according to the first embodiment of the present invention.

FIG. 1 shows an entire configuration of an endoscope device 1 (three-dimensional image display device) according to a first embodiment of the present invention. FIG. 2 shows an internal configuration of the endoscope device 1. The endoscope device 1 images a subject and measures geometrical features of the subject by using images. In order to observe and measure various subjects, an inspector can perform replacement of an optical adaptor mounted at a tip end 20 of an insertion unit 2, selection of a built-in measurement processing program, and addition of a measurement processing program.

The endoscope device 1 shown in FIG. 1 includes the insertion unit 2, a main body 3, an operation unit 4, and a display unit 5.

The insertion unit 2 is inserted into the inside of a subject. The insertion unit 2 has a long and thin bendable tube shape from the tip end 20 to a base end portion. The insertion unit 2 images a measurement part and outputs an imaging signal to the main body 3. An optical adapter is mounted on the tip end 20 of the insertion unit 2. The main body 3 is a control device including a housing unit that houses the insertion unit 2. The operation unit 4 accepts an operation for the endoscope device 1 from a user. The display unit 5 includes a display screen and displays an image of a subject acquired by the insertion unit 2, an operation menu, and the like on the display screen.

The operation unit 4 is a user interface. For example, the operation unit 4 is at least one of a button, a switch, a key, a mouse, a joystick, a touch pad, a track ball, and a touch panel. The display unit 5 is a monitor (display) such as a liquid crystal display (LCD). The display unit 5 may be a touch panel. In such a case, the operation unit 4 and the display unit 5 are integrated.

The main body 3 shown in FIG. 2 includes an endoscope unit 8, a camera control unit (CCU) 9, and a control device 10. The endoscope unit 8 includes a light source device and a bending device not shown in the drawing. The light source device supplies illumination light that is necessary for observation. The bending device bends a bending mechanism not shown in the drawing. An imaging device 28 is built into the tip end 20 of the insertion unit 2. The imaging device 28 is an image sensor. The imaging device 28 photo-electrically converts a subject image (optical image) formed by an optical adaptor and generates an imaging signal. The CCU 9 drives the imaging device 28. An imaging signal output from the imaging device 28 is input to the CCU 9. The CCU 9 executes preprocessing including amplification, noise elimination, and the like for the imaging signal acquired by the imaging device 28. The CCU 9 converts the processed imaging signal into a video signal such as an NTSC signal.

The control device 10 includes a video signal processing circuit 12, a read only memory (ROM) 13, a random access memory (RAM) 14, a card interface 15, an external device interface 16, a control interface 17, and a central processing unit (CPU) 18.

The video signal processing circuit 12 performs predetermined video processing on the video signal output from the CCU 9. For example, the video signal processing circuit 12 performs video processing related to improvement of visibility. For example, the video processing is color reproduction, gray scale correction, noise suppression, contour enhancement, and the like. The video signal processing circuit 12 also performs processing for improving measurement performance when measurement is executed. In addition, the video signal processing circuit 12 combines the video signal output from the CCU 9 and a graphic image signal generated by the CPU 18. The graphic image signal includes an image of the operation screen, measurement information, and the like. The measurement information includes a measurement result and the like. The video signal processing circuit 12 outputs a combined video signal to the display unit 5. In addition, the video signal processing circuit 12 outputs image data that is based on the video signal output from the CCU 9 to the CPU 18.

The ROM 13 is a nonvolatile recording medium on which a program for the CPU 18 to control the operation of the endoscope device 1 is recorded. The RAM 14 is a volatile recording medium that temporarily stores information used by the CPU 18 for controlling the endoscope device 1. The CPU 18 controls the operation of the endoscope device 1 on the basis of the program recorded on the ROM 13.

A memory card 42 that is a removable recording medium is connected to the card interface 15. The card interface 15 inputs control processing information, image information, and the like stored in the memory card 42 to the control device 10. In addition, the card interface 15 records the control processing information, the image information, and the like generated by the endoscope device 1 on the memory card 42.

An external device such as a USB device is connected to the external device interface 16. For example, a personal computer 41 is connected to the external device interface 16. The external device interface 16 transmits information to the personal computer 41 and receives information from the personal computer 41. In this way, a monitor of the personal computer 41 can display information. In addition, by inputting an instruction to the personal computer 41, a user can perform an operation related to control of the endoscope device 1.

The control interface 17 performs communication with the operation unit 4, the endoscope unit 8, and the CCU 9 for operation control. The control interface 17 notifies the CPU 18 of an instruction input to the operation unit 4 by a user. The control interface 17 outputs control signals used for controlling the light source device and the bending device to the endoscope unit 8. The control interface 17 outputs a control signal used for controlling the imaging device 28 to the CCU 9.

A program executed by the CPU 18 may be recorded on a computer-readable recording medium. The program recorded on this recording medium may be read and executed by a computer other than the endoscope device 1. For example, the program may be read and executed by the personal computer 41. The personal computer 41 may control the endoscope device 1 by transmitting control information used for controlling the endoscope device 1 to the endoscope device 1 in accordance with a program. Alternatively, the personal computer 41 may acquire a video signal from the endoscope device 1 and perform measurement by using the acquired video signal.

The program described above may be transmitted from the computer storing the program to the endoscope device 1 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). A combination of a program that has already been recorded in a computer and a differential program may realize the functions described above.

As described above, the endoscope device 1 includes the imaging device 28 (image acquisition unit) and the CPU 18. The imaging device 28 images a subject and generates an imaging signal. The imaging signal includes an image of the subject. Therefore, the imaging device 28 acquires the image of the subject generated by capturing the image of the subject. The imaging device 28 acquires a two-dimensional image (first image) of the subject seen in a first direction from a first viewpoint in an image acquisition step. The image acquired by the imaging device 28 is input to the CPU 18 through the video signal processing circuit 12.

The imaging device 28 has a function of an image acquisition unit that acquires an image of a subject. The image acquisition unit may be an image input device. For example, in a case in which the personal computer 41 operates as a three-dimensional image display device, the image acquisition unit is a communication interface (communicator) that performs communication with the endoscope device 1. The image acquisition unit may be a wireless communicator. The image acquisition unit may be a reading circuit that reads an image from a recording medium on which the image is recorded.

The endoscope device 1 according to the first embodiment has a line-based measurement function. In the first embodiment, two reference points and one measurement point are designated by a user. Each of the two reference points represents a reference position for calculating a reference line in line-based measurement. The measurement point represents a position for measuring the size of a subject.

For example, the endoscope device 1 executes stereo measurement. In the stereo measurement, measurement of a subject is performed by using the principle of triangulation on the basis of two subject images corresponding to two different viewpoints. A measurement method applied to the endoscope device 1 is not limited to the stereo measurement. For example, the endoscope device 1 may perform measurement on the basis of the phase shift method using an image of a subject on which a plurality of stripe patterns of which spatial phases are different from each other are projected. Alternatively, the endoscope device 1 may perform measurement using an image of a subject on which a random pattern is projected.

Figure 3:
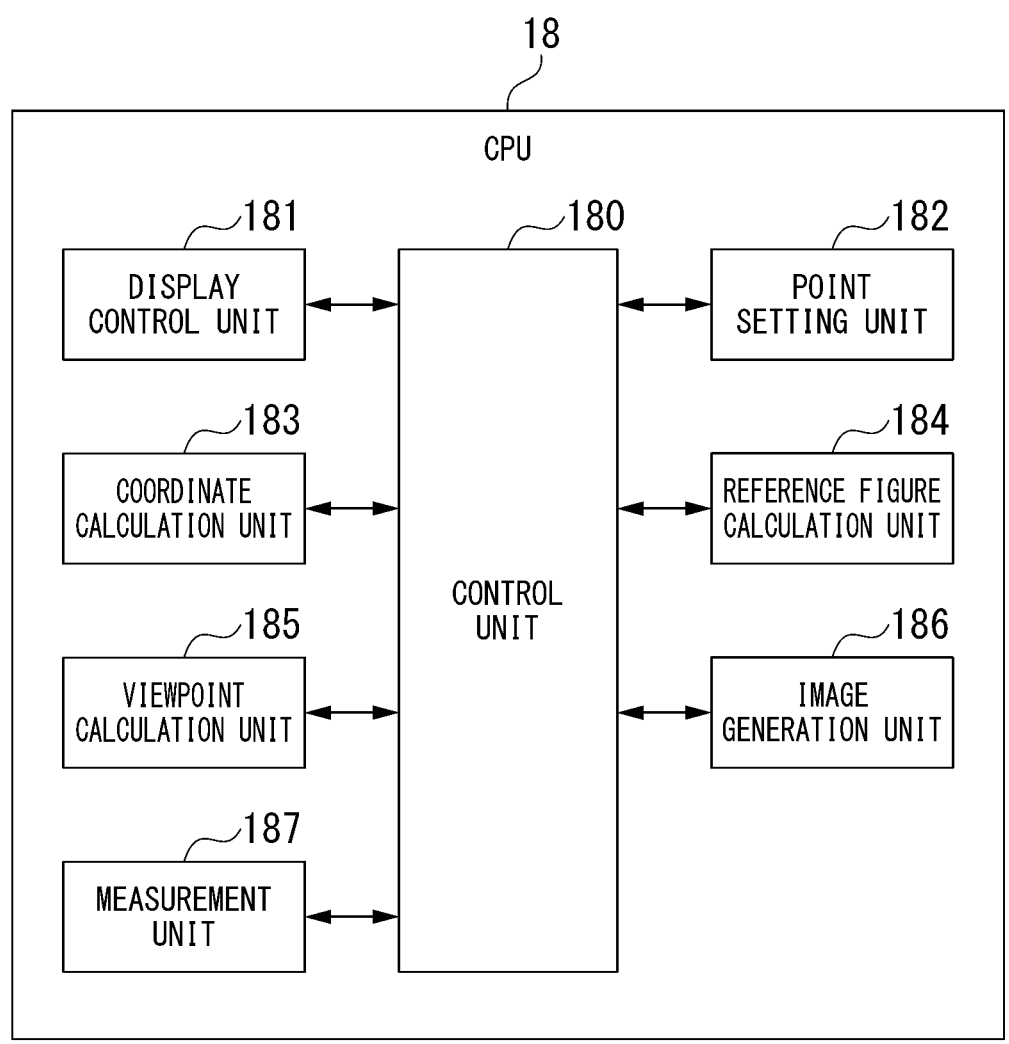
FIG. 3 is a block diagram showing a functional configuration of a CPU according to the first embodiment of the present invention.

FIG. 3 shows a functional configuration of the CPU 18. The functions of the CPU 18 are constituted by a control unit 180, a display control unit 181, a point setting unit 182, a coordinate calculation unit 183, a reference figure calculation unit 184, a viewpoint calculation unit 185, an image generation unit 186, and a measurement unit 187. At least one of the blocks shown in FIG. 3 may be constituted by a circuit different from the CPU 18.

Each unit shown in FIG. 3 may be constituted by at least one of a processor and a logic circuit. For example, the processor is at least one of a CPU, a digital signal processor (DSP), and a graphics processing unit (GPU). For example, the logic circuit is at least one of an application specific integrated circuit (ASIC) and a field-programmable gate array (FPGA). Each unit shown in FIG. 3 may include one or a plurality of processors. Each unit shown in FIG. 3 may include one or a plurality of logic circuits.

An outline of the configuration shown in FIG. 3 will be described. The coordinate calculation unit 183 calculates three-dimensional coordinates of a plurality of points on a subject on the basis of a first image acquired by the imaging device 28 in a coordinate calculation step. The display control unit 181 displays a second image on the display unit 5 in a first display step. The second image represents an image of the subject seen in a first direction from a first viewpoint. The second image is one of the first image and a three-dimensional image of the subject generated on the basis of the three-dimensional coordinates of the plurality of points. The operation unit 4 accepts input of at least one reference point in an input step. Each of the at least one reference point is on a region included in the second image and is one of the plurality of points on the subject. The reference figure calculation unit 184 calculates a reference figure on the basis of three-dimensional coordinates of at least two points that have been set on the basis of the at least one reference point in a reference figure calculation step. Each of the at least two points is one of the plurality of points on the subject. A reference line is the reference figure in the first embodiment. The viewpoint calculation unit 185 calculates a second direction different from the first direction and a second viewpoint different from the first viewpoint on the basis of the reference figure in a viewpoint calculation step. The image generation unit 186 generates a third image on the basis of the three-dimensional coordinates of the plurality of points on the subject in an image generation step. The third image is a three-dimensional image of the subject seen in the second direction from the second viewpoint. The display control unit 181 displays the third image on which information representing the position of the reference figure has been superimposed on the display unit 5 in a second display step.

The reference figure is one of a straight line, a line segment, and a plane. The line segment is part of a straight line. The second direction is parallel to a straight line axis. The straight line axis is perpendicular to the reference figure or parallel to the reference figure. The second viewpoint is on the straight line axis.

The straight line axis is an imaginary axis defining the second viewpoint and the second direction, and is a straight line. In the first embodiment, the reference figure is a straight line and the straight line axis is perpendicular to the reference figure. The operation unit 4 accepts input of two reference points. The reference figure calculation unit 184 calculates the reference figure on the basis of three-dimensional coordinates of the two reference points.

Details of the configuration shown in FIG. 3 will be described. The control unit 180 controls processing executed by each unit. The display control unit 181 displays a 2D image or a 3D image on the display unit 5. The 2D image is a two-dimensional image acquired by the imaging device 28. The 3D image is a three-dimensional image generated by the image generation unit 186.

For example, the display control unit 181 controls processing executed by the video signal processing circuit 12. The display control unit 181 causes a video signal processed by the video signal processing circuit 12 to be output from the video signal processing circuit 12 to the display unit 5. The video signal includes color data of each pixel of the 2D image. The display unit 5 displays the 2D image on the basis of the video signal output from the video signal processing circuit 12. Alternatively, the display control unit 181 outputs a 3D video signal to the display unit 5 through the video signal processing circuit 12. The 3D video signal includes color data of each pixel of the 3D image. Each pixel of the 3D image is associated with three-dimensional coordinates. The display unit 5 displays the 3D image on the basis of the 3D video signal output from the video signal processing circuit 12.

The display control unit 181 displays various kinds of information on the display unit 5. In other words, the display control unit 181 displays various kinds of information on an image. Various kinds of information include a cursor, a mark, a reference figure, a measurement result, and the like. The cursor is a pointer used by a user for designating a specific position on an image. The mark represents a position designated on an image by a user. The reference figure is a reference line, a reference plane, or the like. Various kinds of information may include a line other than the reference figure. Various kinds of information may include an illustration and the like.

For example, the display control unit 181 generates a graphic image signal of various kinds of information. The display control unit 181 outputs the generated graphic image signal to the video signal processing circuit 12. The video signal processing circuit 12 combines a video signal output from the CCU 9 and a graphic image signal output from the CPU 18. In this way, various kinds of information are superimposed on a 2D image. The video signal processing circuit 12 outputs the combined video signal to the display unit 5. The display unit 5 displays the 2D image on which various kinds of information are superimposed. Alternatively, the image generation unit 186 generates a graphic image signal of various kinds of information and superimposes the graphic image signal on a 3D video signal. In this way, various kinds of information are superimposed on a 3D image. The display control unit 181 outputs the 3D video signal on which the graphic image signal has been superimposed to the display unit 5 through the video signal processing circuit 12. The display unit 5 displays the 3D image on which various kinds of information are superimposed.

A user inputs position information of a cursor to the operation unit 4 by operating the operation unit 4. The operation unit 4 accepts the position information that is input to the operation unit 4 by a user and outputs the position information. The position information input to the operation unit 4 is input to the control interface 17 that is an input unit. The position information input to the control interface 17 is input to the CPU 18. The display control unit 181 detects a position represented by the position information input to the operation unit 4. The display control unit 181 displays a cursor at the position represented by the position information input to the operation unit 4. In a case in which the display unit 5 is a touch panel, in other words, the display unit 5 and the operation unit 4 are integrated, a user inputs the position information of the cursor to the operation unit 4 by touching the screen of the display unit 5.

A 2D image or a 3D image used for setting a reference point or a measurement point is displayed on the display unit 5. The 2D image and the 3D image are an image (second image) of a subject seen in a first direction from a first viewpoint in three-dimensional space. After the 2D image or the 3D image is displayed on the display unit 5, the point setting unit 182 sets at least two reference points on the 2D image or the 3D image. Specifically, a user inputs position information of a reference point to the operation unit 4 by operating the operation unit 4. The operation unit 4 accepts the position information that is input to the operation unit 4 by a user and outputs the position information to the control interface 17. The position information is input to the CPU 18 through the control interface 17. The point setting unit 182 sets a reference point at a position represented by the position information on the 2D image that is acquired by the imaging device 28 and is displayed on the display unit 5. Alternatively, the point setting unit 182 sets a reference point at a position represented by the position information on the 3D image that is generated by the image generation unit 186 and is displayed on the display unit 5. The position information of the reference point set by the point setting unit 182 is stored on the RAM 14. The reference point is set by associating the reference point with a specific image.

After the 2D image or the 3D image is displayed on the display unit 5, the point setting unit 182 sets one measurement point on the 2D image or the 3D image. Specifically, a user inputs position information of a measurement point to the operation unit 4 by operating the operation unit 4. The operation unit 4 accepts the position information that is input to the operation unit 4 by a user and outputs the position information. The position information input to the operation unit 4 is input to the CPU 18 through the control interface 17. The point setting unit 182 sets a measurement point at a position represented by the position information on the 2D image that is acquired by the imaging device 28 and is displayed on the display unit 5. Alternatively, the point setting unit 182 sets a measurement point at a position represented by the position information on the 3D image that is generated by the image generation unit 186 and is displayed on the display unit 5. The position information of the measurement point set by the point setting unit 182 is stored on the RAM 14. The measurement point is set by associating the measurement point with a specific image.

A reference point and a measurement point are coordinate information of a target position determined on the basis of a user's instruction. Designation of a reference point or a measurement point means that a user instructs the endoscope device 1 of the reference point or the measurement point. A user designates a reference point or a measurement point by using the cursor. Alternatively, a user designates a reference point or a measurement point by touching the reference point or the measurement point on the screen of the display unit 5. The setting of a reference point means that the point setting unit 182 associates the reference point with an image. The setting of a measurement point means that the point setting unit 182 associates the measurement point with an image.

The coordinate calculation unit 183 calculates three-dimensional coordinates of each of a plurality of points on a 2D image by using the 2D image. For example, the coordinate calculation unit 183 calculates three-dimensional coordinates corresponding to each pixel of a 2D image.

The reference figure calculation unit 184 calculates a reference line on the basis of the three-dimensional coordinates of the plurality of reference points set by the point setting unit 182. The reference line is a straight line that passes through points each having three-dimensional coordinates of each of two reference points in three-dimensional space.

The viewpoint calculation unit 185 calculates a second viewpoint and a second direction for displaying a 3D image used for confirmation of a reference point. The specific method of calculating the second viewpoint and the second direction will be described later.

The image generation unit 186 generates a 3D image (third image) of a subject seen in a second direction from a second viewpoint on the basis of the three-dimensional coordinates of the plurality of points. The 3D image is equivalent to an optical image of a subject projected on user's eyes when the user views the surface of the subject in three-dimensional space from a specific viewpoint. In a case in which a 3D image is used for setting a reference point and a measurement point, the image generation unit 186 generates a 3D image of a subject seen in a first direction from a first viewpoint.

The measurement unit 187 executes three-dimensional measurement of a subject. The measurement unit 187 executes the three-dimensional measurement of a subject by using a reference line in the first embodiment. Specifically, the measurement unit 187 calculates the three-dimensional distance between a three-dimensional reference line and a point having three-dimensional coordinates of a measurement point.

Figure 4:
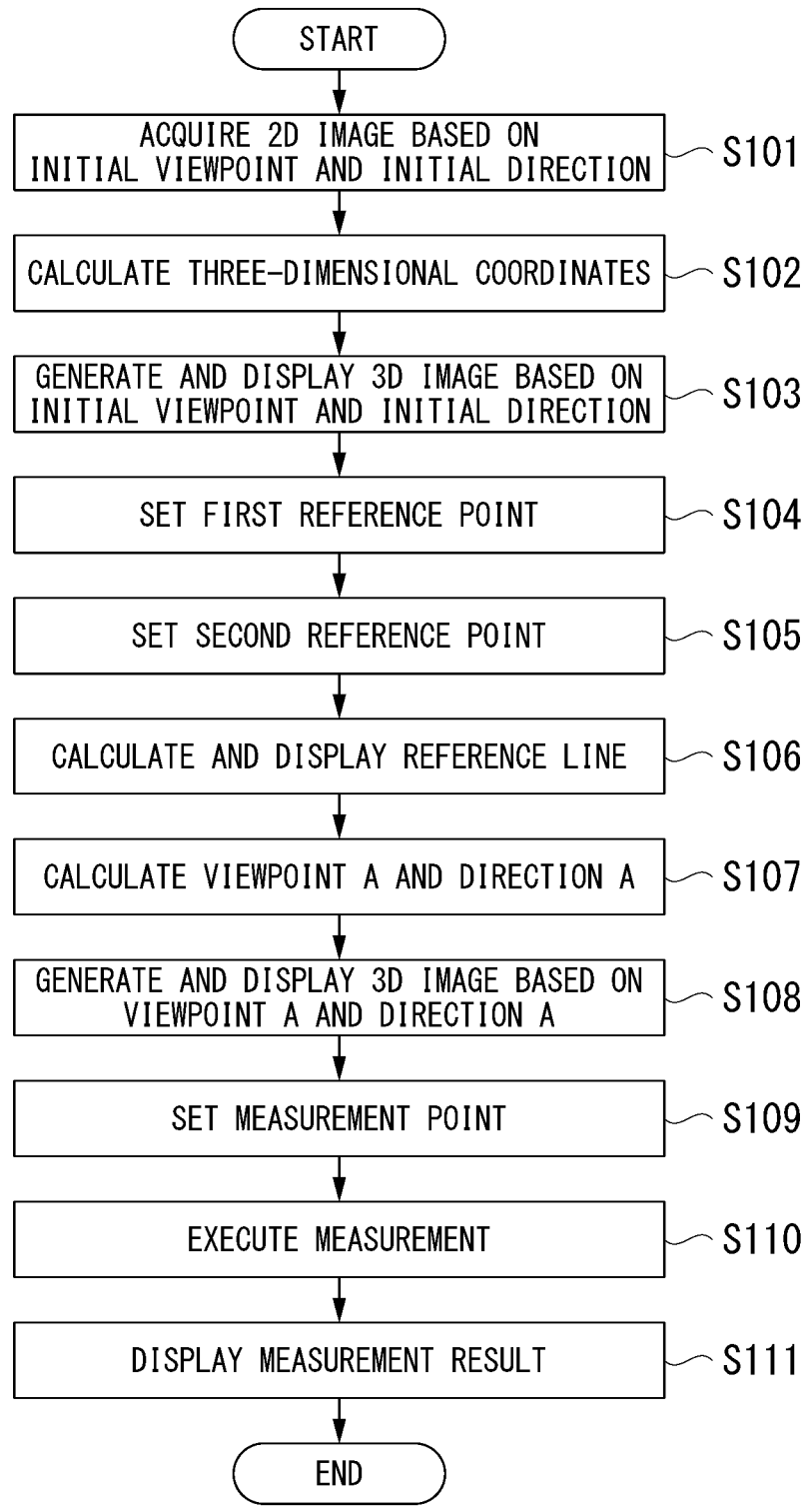
FIG. 4 is a flow chart showing a procedure of three-dimensional measurement in the first embodiment of the present invention.

Three-dimensional measurement in the first embodiment will be described by using FIG. 4. FIG. 4 shows a procedure of the three-dimensional measurement.

The imaging device 28 acquires a 2D image of a subject by imaging the subject and generating an imaging signal. The acquired 2D image (first image) is a two-dimensional image of the subject seen in an initial direction (first direction) from an initial viewpoint (first viewpoint). The CPU 18 acquires the 2D image of the subject from the CCU 9 through the video signal processing circuit 12 (Step S101). Step S101 corresponds to the image acquisition step.

After Step S101, the coordinate calculation unit 183 calculates three-dimensional coordinates of all pixels in the 2D image (Step S102). Step S102 corresponds to the coordinate calculation step.

After Step S102, the image generation unit 186 generates a three-dimensional image (3D image) of the subject seen in the initial direction from the initial viewpoint on the basis of the three-dimensional coordinates calculated in Step S102. The display control unit 181 displays the 3D image (second image) on the display unit 5 (Step S103). Step S103 corresponds to the first display step. The initial viewpoint and the initial direction in Step S103 may be different from the viewpoint and the direction in Step S101, respectively. In a case in which the viewpoint in Step S101 and the viewpoint in Step S103 are different from each other, the viewpoint in Step S103 is defined as an initial viewpoint. In a case in which the direction in Step S101 and the direction in Step S103 are different from each other, the direction in Step S103 is defined as an initial direction.

After Step S103, the point setting unit 182 determines the position designated by a user as a reference point on the basis of the operation result of the operation unit 4 and sets a first reference point at the position. The display control unit 181 displays the first reference point on the 3D image displayed in Step S103 (Step S104).

After Step S104, the point setting unit 182 determines the position designated by a user as a reference point on the basis of the operation result of the operation unit 4 and sets a second reference point at the position. The display control unit 181 displays the second reference point on the 3D image displayed in Step S103 (Step S105). Step S104 and Step S105 correspond to the input step.

After Step S105, the reference figure calculation unit 184 calculates a reference line that passes through a point having three-dimensional coordinates of the first reference point and a point having three-dimensional coordinates of the second reference point. The display control unit 181 displays the reference line on the 3D image displayed in Step S103 (Step S106). Step S106 corresponds to the reference figure calculation step.

Figure 5:
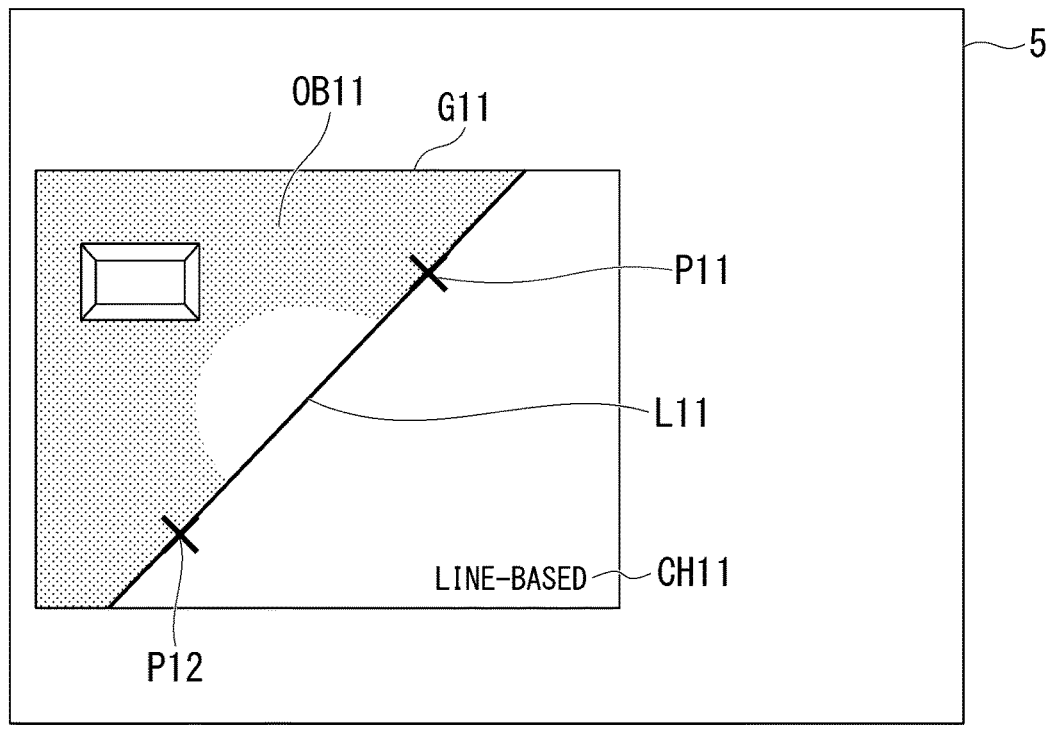
FIG. 5 is a diagram showing an example of an image displayed on a display unit according to the first embodiment of the present invention.

FIG. 5 shows an example of an image displayed on the display unit 5 in Step S106. A 3D image G11 is displayed on the display unit 5. The 3D image G11 is a 3D image of a subject OB11 seen in an initial direction from an initial viewpoint. Characters CH11 that represent a measurement mode is displayed on the 3D image G11. The characters CH11 represent that the measurement mode is the line-based measurement. A first reference point P11, a second reference point P12, and a reference line L11 are displayed on the 3D image G11. Each reference point is displayed as a mark that represents the position of the reference point. In the example shown in FIG. 5, the first reference point P11 and the second reference point P12 are set in the vicinity of the edge of the subject OB11.

After Step S106, the viewpoint calculation unit 185 calculates a viewpoint A (second viewpoint) and a direction A (second direction) on the basis of the reference line (Step S107). Step S107 corresponds to the viewpoint calculation step. The viewpoint calculation unit 185 calculates the viewpoint A and the direction A in Step S107 by using the method described below.

Figure 6:
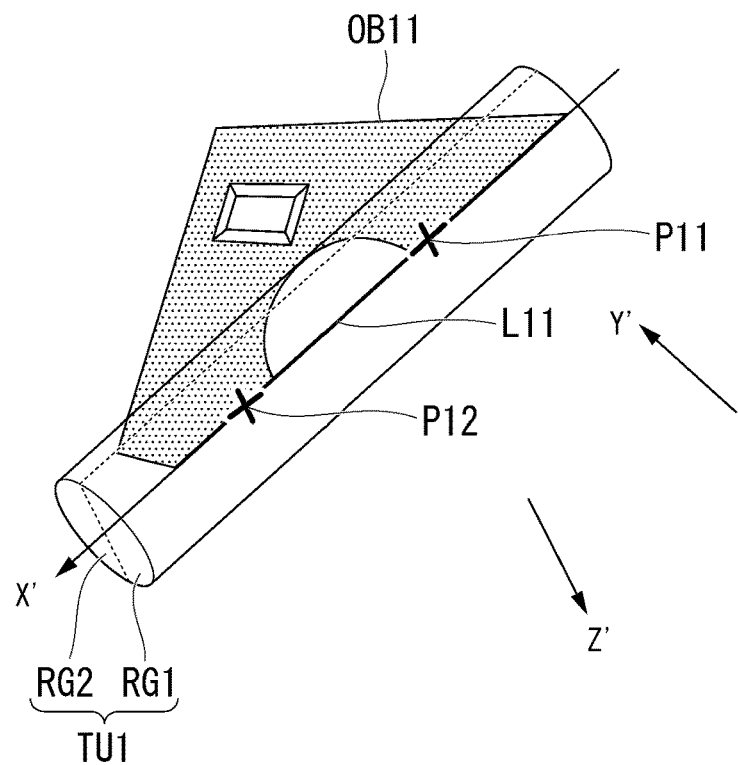
FIG. 6 is a diagram schematically showing a three-dimensional space including a subject in the first embodiment of the present invention.

FIG. 6 schematically shows three-dimensional space including the subject OB11. The subject OB11 in a range included in the 3D image G11 is shown in FIG. 6. The viewpoint calculation unit 185 sets an X' axis that extends in the same direction as that in which the reference line L11 extends. The X' axis matches the reference line L11. The viewpoint calculation unit 185 sets a Z' axis that extends in a direction perpendicular to the X' axis. The Z' axis passes through a camera position. The camera position is the optical center of an optical system within an optical adaptor mounted at the tip end 20 of the insertion unit 2. A stereo measurement adaptor used for stereo measurement includes two optical systems corresponding to two right and left viewpoints. When the stereo measurement adaptor is mounted at the tip end 20 of the insertion unit 2, the camera position is at the middle point of two optical centers of the two optical systems.

The viewpoint calculation unit 185 sets a Y' axis (straight line axis) that extends in a direction perpendicular to each of the X' axis and the Z' axis. The viewpoint calculation unit 185 sets a first region RG1 and a second region RG2 around the X' axis. The first region RG1 and the second region RG2 are included in a cylinder TU1 whose center is the X' axis. The boundary between the first region RG1 and the second region RG2 is the X'-Z' plane. The direction A is a direction from the first region RG1 to the second region RG2. The Y' axis passes through the first region RG1 and the second region RG2. The volume of the first region RG1 and the volume of the second region RG2 are the same. The volume of a subject included in the first region RG1 is less than the volume of the subject included in the second region RG2. In other words, the data number of three-dimensional coordinates of the subject OB11 in the first region RG1 is less than the data number of three-dimensional coordinates of the subject OB11 in the second region RG2. The viewpoint calculation unit 185 sets the direction from the first region RG1 to the second region RG2 to the positive direction of the Y' axis. The viewpoint calculation unit 185 sets the positive direction of each of the X' axis and the Z' axis on the basis of the positive direction of the Y' axis.

The viewpoint calculation unit 185 sets the direction A to the positive direction of the Y' axis. The viewpoint calculation unit 185 calculates the viewpoint A such that the subject OB11 falls within the visual field when the subject OB11 is seen in the direction A. For example, the Z' coordinate of the viewpoint A is 0. The X' coordinate of the viewpoint A is the average of the X' coordinate of the first reference point P11 and the X' coordinate of the second reference point P12. The Y' coordinate of the viewpoint A is a position at which the entire subject OB11 falls within the visual field. The Y' coordinate of the viewpoint A may be a position for which at least the first reference point P11 and the second reference point P12 fall within the visual field. For example, the Y' coordinate of the viewpoint A is a position at which the first reference point P11 and the second reference point P12 are displayed in the portion that occupies 80% of the length in the horizontal direction of the display region of the 3D image (third image).

The Z' axis passes through the camera position and is perpendicular to the reference line L11. The direction A is perpendicular to the Z' axis. Since the direction A is perpendicular to the direction of the visual line when the reference line L11 is vertically seen from the camera position, a user can easily understand the direction of the visual line in the image G12 by intuition.

After Step S107, the image generation unit 186 generates a three-dimensional image (3D image) of the subject seen in the direction A from the viewpoint A on the basis of the three-dimensional coordinates calculated in Step S102. At this time, the image generation unit 186 generates image data for displaying the 3D image by using perspective projection. The image generation unit 186 superimposes the reference line on the 3D image. The display control unit 181 displays the 3D image on which the reference line has been superimposed on the display unit 5 (Step S108). The 3D image (third image) displayed in Step S108 represents a state of the subject seen in the direction A from the viewpoint A. Step S108 corresponds to the image generation step and the second display step.

Figure 7:
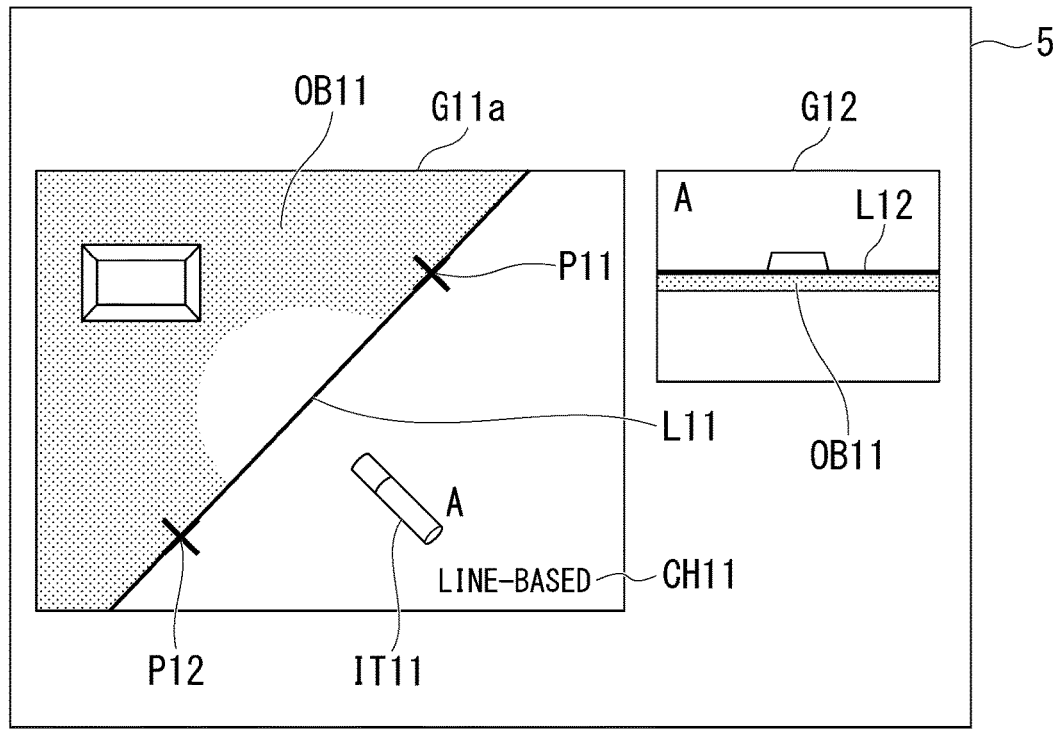
FIG. 7 is a diagram showing an example of an image displayed on the display unit according to the first embodiment of the present invention.

FIG. 7 shows an example of an image displayed on the display unit 5 in Step S108. A 3D image G11a and a 3D image G12 are displayed on the display unit 5. The display control unit 181 displays the 3D image G12 on the display unit 5 in Step S108 such that the 3D image G12 does not overlap the 3D image G11a. The 3D image G11a is a 3D image of a subject OB11 seen in an initial direction from an initial viewpoint. Characters CH11, a first reference point P11, a second reference point P12, a reference line L11, and an illustration IT11 are displayed on the 3D image G11a.

The 3D image G12 is a 3D image of the subject OB11 seen in a direction A from a viewpoint A. A reference line L12 is displayed on the 3D image G12. The reference line L12 represents a reference line seen in the direction A from the viewpoint A. The edge of the subject OB11 seen in the direction approximately parallel to the surface of the subject OB11 is seen in the 3D image G12.

A user determines whether or not the reference line is set on the edge of the subject OB11 on the basis of the 3D image G12. In this way, a user can confirm whether or not the positions of the two reference points are valid. Since the direction A is perpendicular to the reference line, a user can easily confirm whether or not the positions of the two reference points are valid. In the example shown in FIG. 7, the reference line L12 matches the edge of the subject OB11. For this reason, a user can confirm that the positions of the two reference points are valid. An operation for designating a position of a viewpoint and a direction of a visual line is unnecessary.

The display control unit 181 displays information that represents the viewpoint A and the direction A on the display unit 5. Specifically, the display control unit 181 displays the illustration IT11 of the tip end 20 of the insertion unit 2 on the display unit 5 in Step S108. Step S108 corresponds to a third display step. The illustration IT11 is displayed on the 3D image G11a. The illustration IT11 represents the tip end 20 of the insertion unit 2 disposed at the viewpoint A and facing in the direction A. For example, the illustration IT11 is a cylindrical figure. The tip end of the figure corresponds to the tip end 20 of the insertion unit 2. The direction of the center axis of the figure corresponds to the optical axis direction of the optical system of the endoscope device 1. When the illustration IT11 is displayed, the display control unit 181 causes the tip end of the figure to match the viewpoint A and causes the direction of the center axis of the figure to match the direction A. Since the illustration IT11 is displayed, a user can confirm the viewpoint A and the direction A.

There is a case in which the viewpoint A is not in the visual field in the 3D image G11a. In such a case, an arrow or the like that represents the direction A may be displayed on the 3D image G11a.

When the 3D image G12 is displayed on the display unit 5, the display control unit 181 may hide the 3D image G11a. In this way, the display control unit 181 can display the 3D image G12 large. The display control unit 181 may switch between a first state and a second state on the basis of an instruction from a user. In the first state, only the 3D image G11a is displayed on the display unit 5. In the second state, only the 3D image G12 is displayed on the display unit 5. After a user finishes confirmation of the positions of the two reference points, the user may cause the 3D image G11a and the 3D image G12 to be displayed by performing a predetermined operation.

Figure 8:
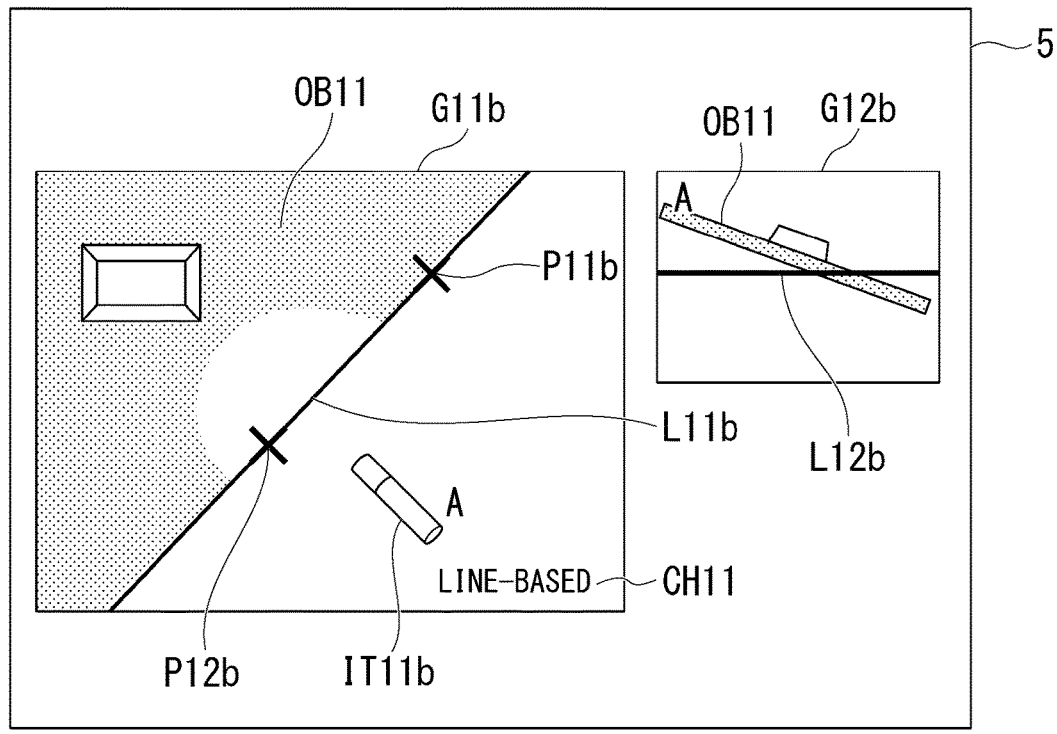
FIG. 8 is a diagram showing an example of an image displayed on the display unit according to the first embodiment of the present invention.

FIG. 8 shows another example of an image displayed on the display unit 5 in Step S108. A 3D image G11b and a 3D image G12b are displayed on the display unit 5. The 3D image G11b is a 3D image of a subject OB11 seen in an initial direction from an initial viewpoint. Characters CH11, a first reference point P11b, a second reference point P12b, a reference line L11b, and an illustration IT11b are displayed on the 3D image G11b. The first reference point P11b is set on the edge of the subject OB11. The second reference point P12b is set at a position that is not on the subject OB11.

The 3D image G12b is a 3D image of the subject OB11 seen in a direction A from a viewpoint A. A reference line L12b is displayed on the 3D image G12b. In the example shown in FIG. 8, the reference line L12b does not match the edge of the subject OB11. For this reason, a user can determine that the positions of the two reference points are not valid.

After Step S108, the point setting unit 182 determines the position designated by a user as a measurement point on the basis of the operation result of the operation unit 4 and sets the measurement point at the position. The display control unit 181 displays the measurement point on the 3D image displayed in Step S103 (Step S109).

After Step S109, the measurement unit 187 calculates the size of the subject on the basis of the reference line and the three-dimensional coordinates of the measurement point. Specifically, the measurement unit 187 calculates the three-dimensional distance between the reference line and a point having the three-dimensional coordinates of the measurement point (Step S110).

After Step S110, the display control unit 181 displays a measurement result on the display unit 5 (Step S111). When Step S111 is executed, the three-dimensional measurement is completed.

Figure 9:
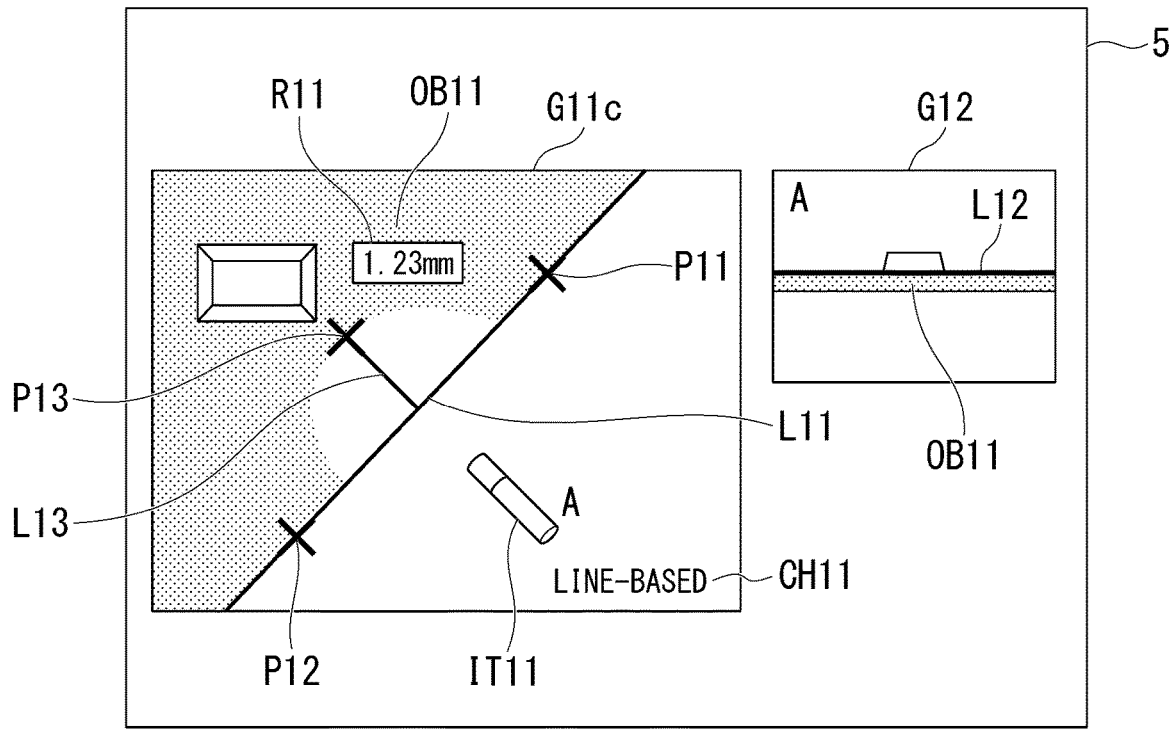
FIG. 9 is a diagram showing an example of an image displayed on the display unit according to the first embodiment of the present invention.

FIG. 9 shows an example of an image displayed on the display unit 5 in Step S111. A 3D image G11c and a 3D image G12 are displayed on the display unit 5. The 3D image G11c is a 3D image of a subject OB11 seen in an initial direction from an initial viewpoint. Characters CH11, a first reference point P11, a second reference point P12, a reference line L11, and an illustration IT11 are displayed on the 3D image G11c. Moreover, a measurement point P13, a measurement line L13, and a measurement result R11 are displayed on the 3D image G11c. The measurement point P13 is set at the deepest point of a chipped portion of the subject OB11. The measurement line L13 represents a straight line that passes through a measurement point and is perpendicular to a reference line. The reference figure calculation unit 184 calculates a reference line on the basis of the measurement point and the reference line in Step S108. The measurement result R11 represents the three-dimensional distance between the reference line and a point having the three-dimensional coordinates of the measurement point. The 3D image G12 is the same as the 3D image G12 shown in FIG. 6.

Display of the first reference point in Step S104, display of the second reference point in Step S105, and display of the measurement point in Step S109 are not essential. Display of the reference line in Step S106 is not essential.

After any one of Steps S109 to S111 is executed, Step S107 may be executed. After any one of Steps S109 to S111 is executed, Step S108 may be executed. In a case in which Step S108 is executed after Step S110 or Step S111 is executed, a user can confirm whether or not the positions of the two reference points that have been used for measurement are valid.

Each of Steps S109 to S111 is not essential. Each of Steps S109 to S111 may not be executed. For example, in order to inspect whether or not the shape of a subject is the desired shape, each of Steps S101 to S108 may be executed. For example, in order to inspect whether or not a portion of an inspection target is a straight line, a user designates two reference points on the portion on a 3D image. For example, the portion is the edge of the inspection target. A reference line passing through the two reference points is displayed on the 3D image.

A user confirms whether or not the reference line is displayed on the portion on the basis of the 3D image. In this way, a user confirms whether or not the positions of the two reference points are valid. After it is confirmed that the positions of the two reference points are valid, a user performs inspection by comparing the reference line with the shape of the portion.

In the first embodiment, a 3D image of a subject seen in a direction A from a viewpoint A is displayed on the display unit 5. For this reason, the endoscope device 1 can simplify determination of validity of a point designated on an image of a subject.

The coordinate calculation unit 183 calculates three-dimensional coordinates corresponding to each pixel of a 2D image acquired by the imaging device 28. The image generation unit 186 generates a 3D image including data corresponding to each of all three-dimensional coordinates on the surface of a subject. The image generation unit 186 may generate a 3D image including data corresponding to only some of the three-dimensional coordinates calculated by the coordinate calculation unit 183. For example, a user inputs position information of a reference point to the operation unit 4 by operating the operation unit 4. The operation unit 4 accepts the position information that is input to the operation unit 4 by a user and outputs the position information. The position information input to the operation unit 4 is input to the CPU 18 through the control interface 17.

The image generation unit 186 sets a region including a position represented by the position information in a 3D image displayed on the display unit 5. For example, the image generation unit 186 sets a region included in a sphere whose center is at each reference point. The radius of the sphere is a predetermined value. For example, the predetermined value is 3 mm. The image generation unit 186 generates a 3D image including three-dimensional coordinates corresponding to each pixel in a region within the sphere. Since two reference points are set, two 3D images are generated. Only part necessary for a user to designate a reference line is magnified and the part is displayed on the display unit 5. For this reason, a user can efficiently confirm whether or not a reference line is set on the edge of a subject.

Figure 10:
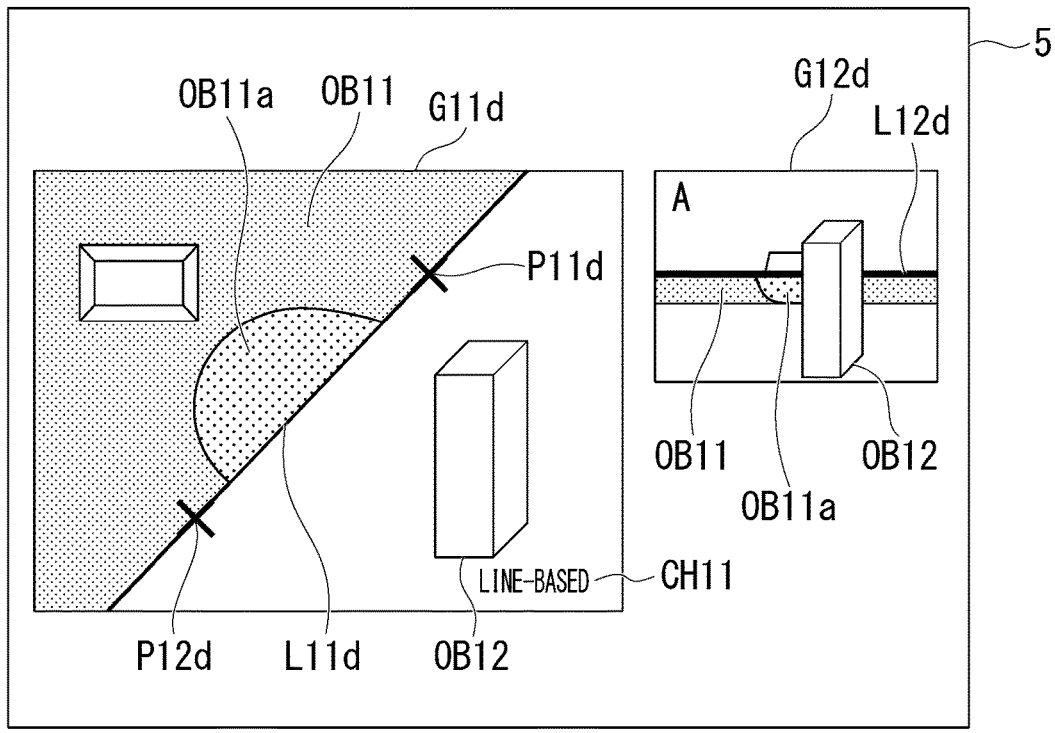
FIG. 10 is a diagram showing an example of an image displayed on the display unit according to the first embodiment of the present invention.

A 3D image displayed on the display unit 5 in a case in which an obstacle is present within a visual field will be described. FIG. 10 shows an example of an image displayed on the display unit 5 in Step S108. A 3D image G11d and a 3D image G12d are displayed on the display unit 5. The 3D image G11d is a 3D image of a subject OB11 seen in an initial direction from an initial viewpoint. A chipped portion of the subject OB11 is seen as a recessed portion OB11a in the 3D image G11d and the 3D image G12d. Characters CH11, a first reference point P11d, a second reference point P12d, and a reference line L11d are displayed on the 3D image G11d.

The 3D image G12d is a 3D image of the subject OB11 seen in a direction A from a viewpoint A. A reference line L12d is displayed on the 3D image G12d. The reference line L12d represents a reference line seen in the direction A from the viewpoint A. The edge of the subject OB11 seen in the direction approximately parallel to the surface of the subject OB11 is seen in the 3D image G12d. In the 3D image G12d, there is a subject OB12 in front of the subject OB11. For this reason, part of the subject OB11 is hidden behind the subject OB12 in the 3D image G12d. A user is unable to confirm whether or not part of the reference line L12d is set on the edge of the subject OB11.

The image generation unit 186 may generate a third image on the basis of three-dimensional coordinates of at least three points. The third image is a three-dimensional image of a subject seen in a second direction from a second viewpoint. Each of the at least three points is a point included in a plurality of points on a subject. The at least three points are on a plane that passes through a reference line and is perpendicular to a straight line axis. For example, the image generation unit 186 generates a 3D image of the X'-Z' plane including the reference line. Specifically, the image generation unit 186 extracts three-dimensional coordinates on the X'-Z' plane from all three-dimensional coordinates on the surface of a subject. The image generation unit 186 generates a 3D image for displaying each of the extracted three-dimensional coordinates as a point. This 3D image is the cross-section of a subject passing through the X'-Z' plane. The X' axis matches the reference line. The Y' axis is the straight line axis. The X'-Z' plane passes through the reference line and is perpendicular to the straight line axis.

Figure 11:
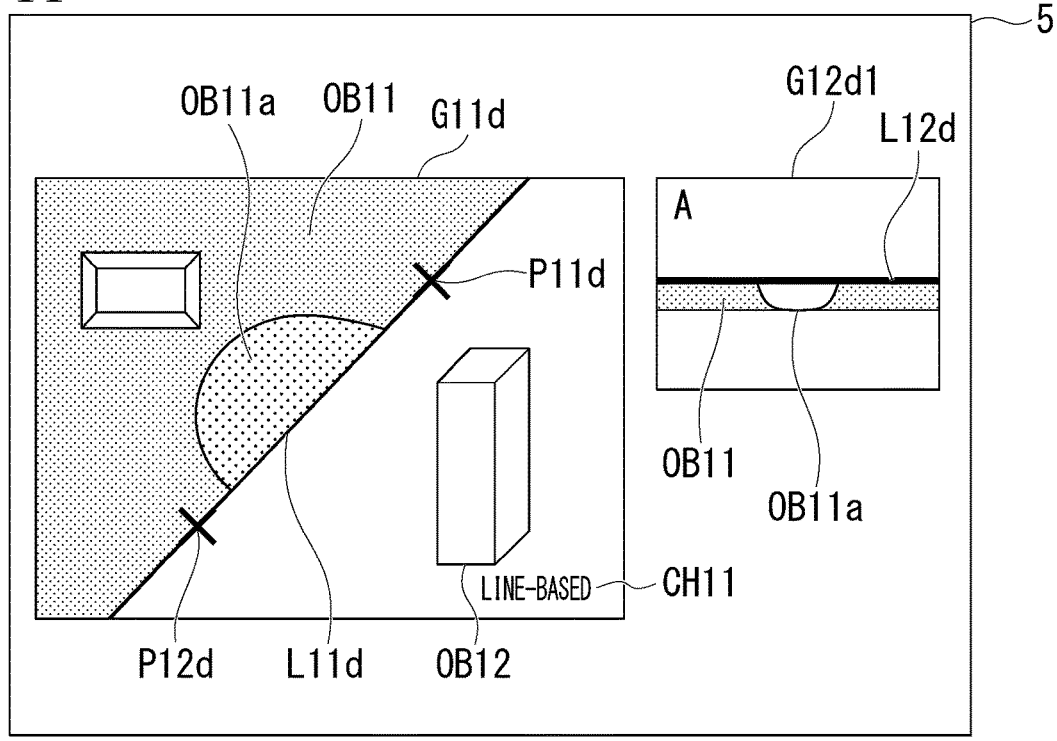
FIG. 11 is a diagram showing an example of an image displayed on the display unit according to the first embodiment of the present invention.

FIG. 11 shows an example of an image displayed on the display unit 5 in Step S108. A 3D image G11d and a 3D image G12d1 are displayed on the display unit 5. The 3D image G11d is the same as the 3D image G11d shown in FIG. 10. The 3D image G12d1 is a 3D image of a subject OB11 seen in a direction A from a viewpoint A. The cross-section of the subject OB11 on the X'-Z' plane is displayed on the 3D image G12d1. A reference line L12d is displayed on the 3D image G12d1. A subject OB12 is not on the X'-Z' plane. For this reason, the subject OB12 is not seen in the 3D image G12d1. A user can confirm whether or not the reference line L12d is set on the edge of the subject OB11.

A portion other than a region to which a user pays attention is not seen from the user. For this reason, the portion does not disturb the confirmation work by a user.

At least three points for generating a third image may be positioned on a second direction side of a plane that passes through a reference line and is perpendicular to a straight line axis. In other words, at least three points for generating a third image may be away from the plane in the second direction. For example, the image generation unit 186 generates a 3D image of a portion that includes a region on the back side of the reference line and does not include a region on the front side of the reference line. Specifically, the image generation unit 186 extracts three-dimensional coordinates in a region extending from the X'-Z' plane in the positive direction of the Y' axis from all three-dimensional coordinates on the surface of a subject. The image generation unit 186 generates a 3D image for displaying each of the extracted three-dimensional coordinates as a point. The X' axis matches the reference line. The Y' axis is the straight line axis. The X'-Z' plane passes through the reference line and is perpendicular to the straight line axis. The positive direction of the Y' axis is the second direction.

Figure 12:
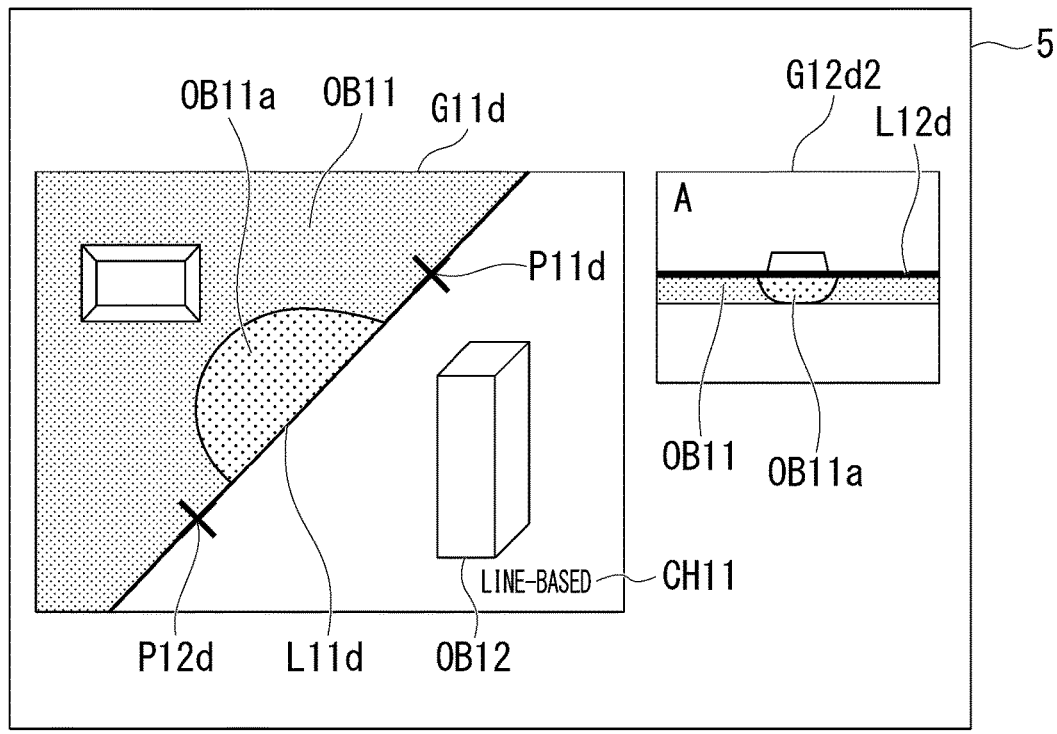
FIG. 12 is a diagram showing an example of an image displayed on the display unit according to the first embodiment of the present invention.

FIG. 12 shows an example of an image displayed on the display unit 5 in Step S108. A 3D image G11d and a 3D image G12d2 are displayed on the display unit 5. The 3D image G11d is the same as the 3D image G11d shown in FIG. 10. The 3D image G12d2 is a 3D image of a subject OB11 seen in a direction A from a viewpoint A. The subject OB11 on the back side of the X'-Z' plane is displayed on the 3D image G12d2. A reference line L12d is displayed on the 3D image G12d2. A subject OB12 is not on the X'-Z' plane. For this reason, the subject OB12 is not seen in the 3D image G12d2. A user can confirm whether or not the reference line L12d is set on the edge of the subject OB11.

A portion other than a region to which a user pays attention is not seen from the user. For this reason, the portion does not disturb the confirmation work by a user.

At least three points for generating a third image may be positioned in a region between a first plane and a second plane. The first plane passes through a reference line and is perpendicular to a straight line axis. The second plane is perpendicular to the straight line axis and is on a second direction side of the first plane. In other words, the second plane is perpendicular to the straight line axis and is away from the first plane in the second direction. For example, the image generation unit 186 generates a 3D image of a portion that includes a region in a predetermined range on the back side of the reference line and does not include a region on the front side of the reference line. Specifically, the first plane is the X'-Z' plane. The second plane is a predetermined distance away from the X'-Z' plane in the positive direction of the Y' axis. The image generation unit 186 extracts three-dimensional coordinates in a region between these two planes from all three-dimensional coordinates on the surface of a subject. The image generation unit 186 generates a 3D image for displaying each of the extracted three-dimensional coordinates as a point. The X' axis matches the reference line. The Y' axis is the straight line axis. The X'-Z' plane passes through the reference line and is perpendicular to the straight line axis. The positive direction of the Y' axis is the second direction.

A portion other than a region to which a user pays attention is not seen from the user. For this reason, the portion does not disturb the confirmation work by a user. Since only a portion near a region to which a user pays attention is seen from the user, the user can easily confirm whether or not a reference line is set on the edge of a subject.

After a 3D image is displayed in Step S108, the image generation unit 186 may slightly change a position of a viewpoint A and generate a 3D image of a subject seen in a direction A from the changed viewpoint A. The display control unit 181 may display the 3D image on the display unit 5. In this way, a user can confirm whether or not a reference line is set on the edge of a subject on the basis of an image of the subject seen from a plurality of viewpoints without performing an operation for changing a viewpoint. The position of a viewpoint may be sequentially changed a plurality of times.

The display control unit 181 may display a third image on the display unit 5 such that at least part of the third image overlaps a second image in Step S108. The third image is a three-dimensional image of a subject seen in a second direction from a second viewpoint. The second image is an image of a subject seen in a first direction from a first viewpoint.

Figure 13:
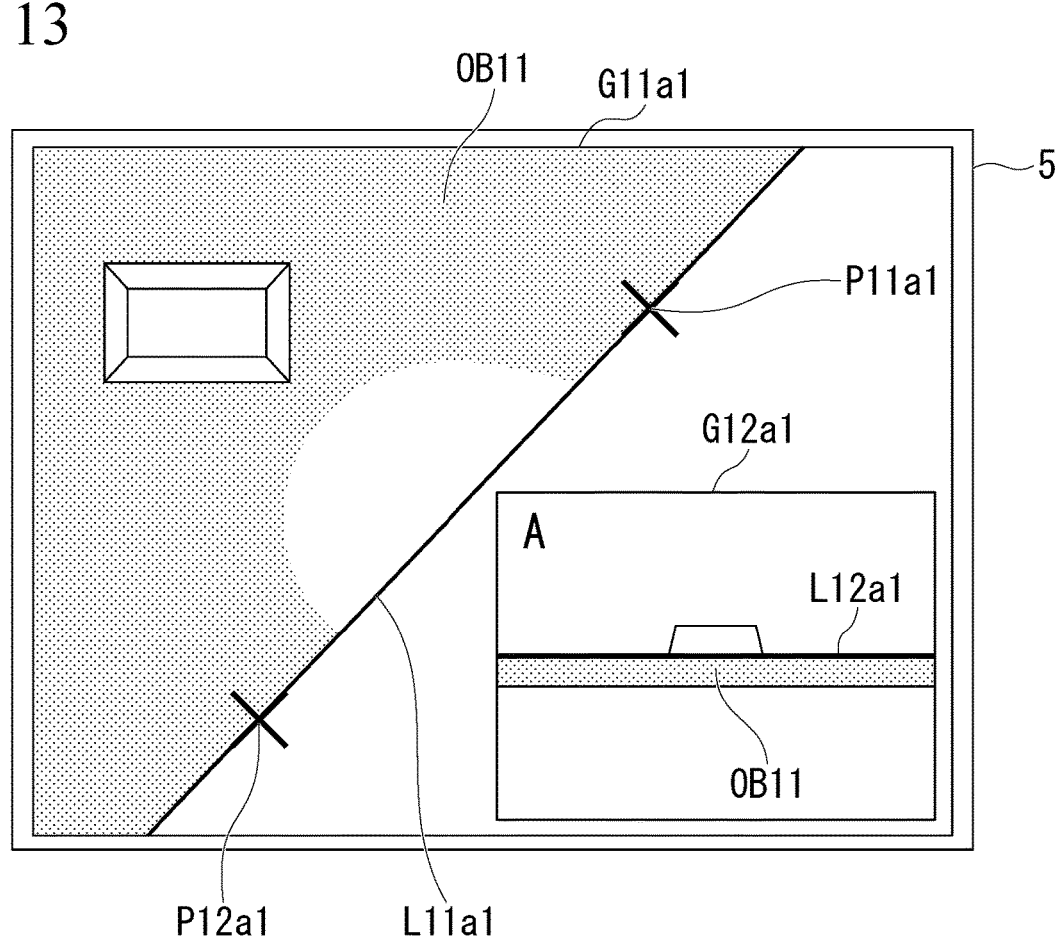
FIG. 13 is a diagram showing an example of an image displayed on the display unit according to the first embodiment of the present invention.

FIG. 13 shows an example of an image displayed on the display unit 5 in Step S108. A 3D image Glial and a 3D image G12a1 are displayed on the display unit 5. A first reference point P11a1, a second reference point P12a1, and a reference line L11a1 are displayed on the 3D image Glial. The 3D image G12a1 is displayed on the 3D image Glial. The 3D image G12a1 is a 3D image of a subject OB11 seen in a direction A from a viewpoint A. A reference line L11a1 is displayed on the 3D image G12a1. The display control unit 181 displays the 3D image G12a1 on the display unit 5 such that the 3D image G12a1 does not overlap any of points and lines on the 3D image Glial.

The region in which the 3D image Glial is displayed is larger than the region in which the 3D image G11a1 shown in FIG. 7 is displayed. The region in which the 3D image G12a1 is displayed is larger than the region in which the 3D image G12 shown in FIG. 7 is displayed. Even when the screen of the display unit 5 is small, a region necessary for displaying the 3D image G12a1 is secured. For this reason, the display control unit 181 can efficiently use the screen of the display unit 5. The display control unit 181 may display the 3D image G12a1 that has been magnified. A user can easily determine whether or not a reference line is set on the edge of the subject OB11. In other words, a user can easily confirm whether or not the positions of the two reference points are valid.

In an example shown in FIG. 13, the 3D image G12a1 is displayed on the 3D image G11a1. The 3D image G11a1 may be displayed on the 3D image G12a1. In such a case, only part of the 3D image G11a1 may overlap the 3D image G12a1.

When the operation unit 4 accepts input of a measurement point, the display control unit 181 may hide a 3D image of a subject seen in a direction A from a viewpoint A. A 3D image is not displayed when a user does not need to confirm a reference point. For this reason, a user is unlikely to be confused about operations or confirmation.

First Modified Example of First Embodiment

In a first modified example of the first embodiment of the present invention, two reference points and one measurement point are set on a 2D image.

Figure 14:
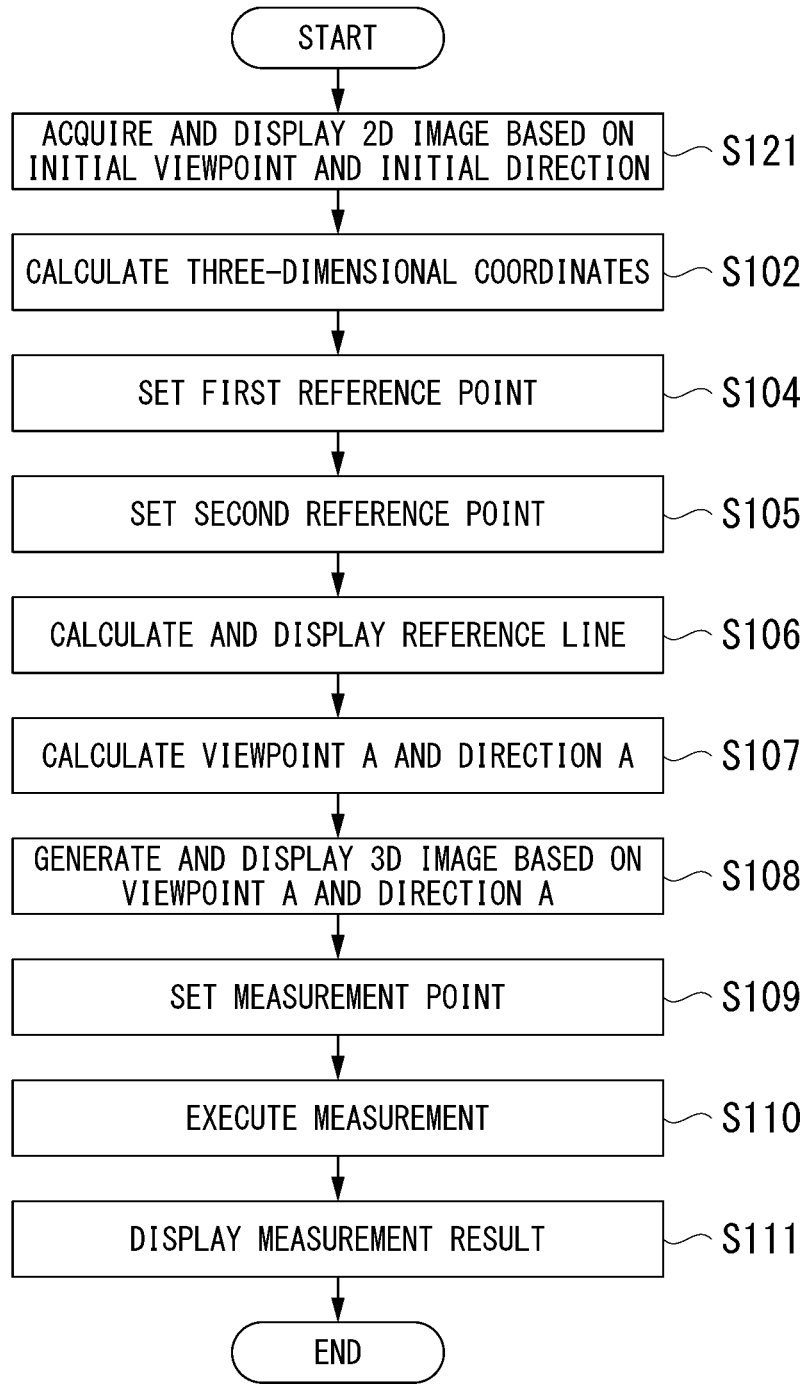
FIG. 14 is a flow chart showing a procedure of three-dimensional measurement in a first modified example of the first embodiment of the present invention.

Three-dimensional measurement in the first modified example of the first embodiment will be described by using FIG. 14. FIG. 14 shows a procedure of the three-dimensional measurement. The same processing as the processing shown in FIG. 4 will not be described.

The imaging device 28 acquires a 2D image of a subject by imaging the subject and generating an imaging signal. The acquired 2D image is a two-dimensional image of the subject seen in an initial direction from an initial viewpoint. The CPU 18 acquires the 2D image of the subject from the CCU 9 through the video signal processing circuit 12. The display control unit 181 displays the 2D image on the display unit 5 (Step S121). Step S121 corresponds to the image acquisition step.

After Step S121, Step S102 is executed. After Step S102, Step S104 is executed. The point setting unit 182 determines the position designated by a user as a reference point on the basis of the operation result of the operation unit 4 in Step S104. The point setting unit 182 sets a first reference point at the position designated by a user in the 2D image displayed on the display unit 5. The display control unit 181 displays the first reference point on the 2D image displayed on the display unit 5.

The point setting unit 182 determines the position designated by a user as a reference point on the basis of the operation result of the operation unit 4 in Step S105. The point setting unit 182 sets a second reference point at the position designated by a user in the 2D image displayed on the display unit 5. The display control unit 181 displays the second reference point on the 2D image displayed on the display unit 5.

The reference figure calculation unit 184 calculates a reference line that passes through a point having three-dimensional coordinates of the first reference point and a point having three-dimensional coordinates of the second reference point in Step S106. The display control unit 181 displays the reference line on the 2D image displayed on the display unit 5.

The point setting unit 182 determines the position designated by a user as a measurement point on the basis of the operation result of the operation unit 4 in Step S109. The point setting unit 182 sets the measurement point at the position designated by a user in the 2D image displayed on the display unit 5. The display control unit 181 displays the measurement point on the 2D image displayed on the display unit 5.

After any one of Steps S104 to S106 is executed, Step S102 may be executed. In a case in which Step S102 is executed after Step S106 is executed, three-dimensional coordinates corresponding to each of at least two reference points need to be calculated in Step S106.

Second Modified Example of First Embodiment

In a second modified example of the first embodiment of the present invention, the endoscope device 1 has a function of correcting a reference point. The operation unit 4 accepts input of at least one corrected reference point. At least one of two reference points that were previously set is replaced with the corrected reference point. The reference figure calculation unit 184 calculates a reference line on the basis of three-dimensional coordinates of two reference points including at least one corrected reference point.

Figure 15:
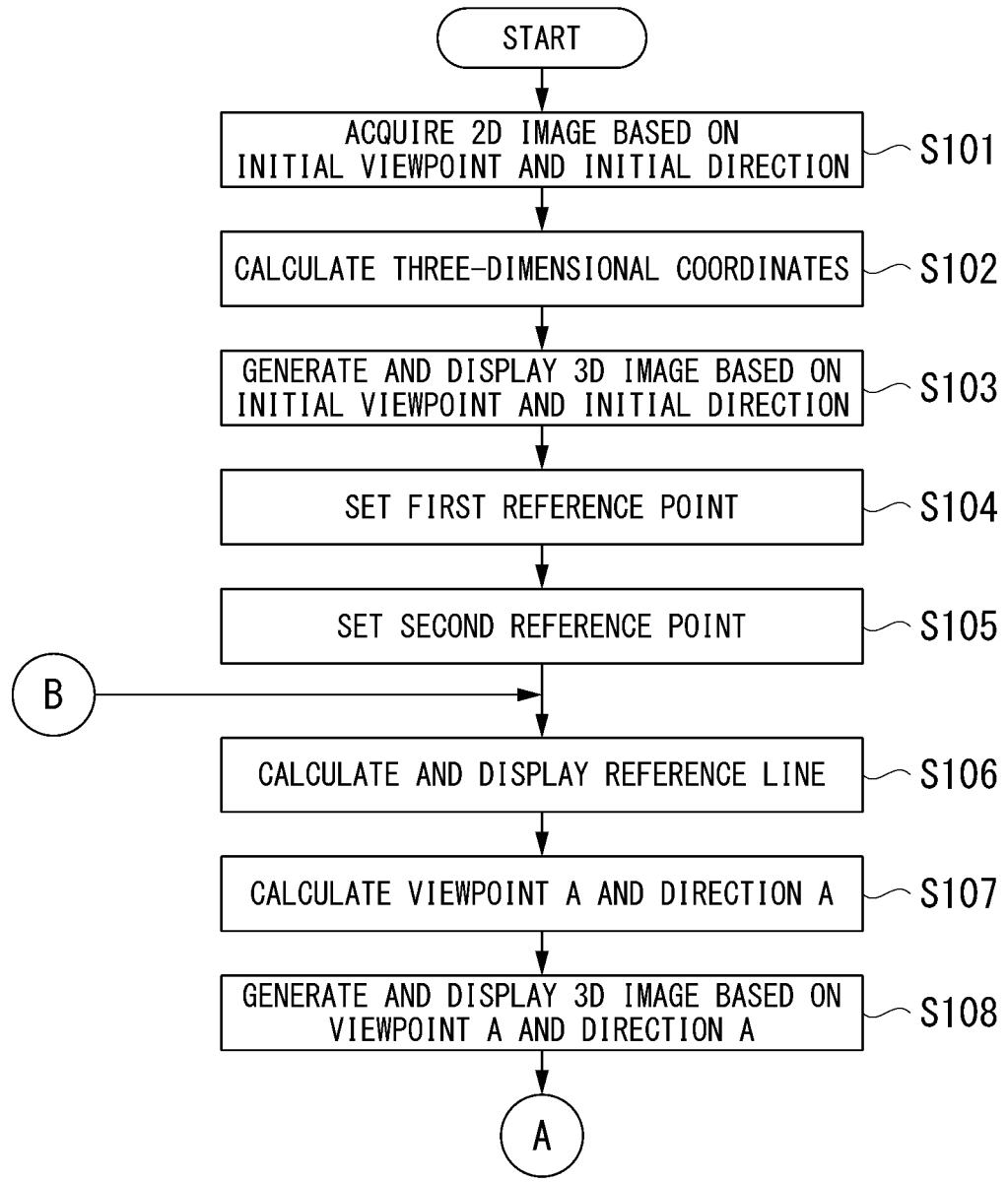
FIG. 15 is a flow chart showing a procedure of three-dimensional measurement in a second modified example of the first embodiment of the present invention.
Figure 16:
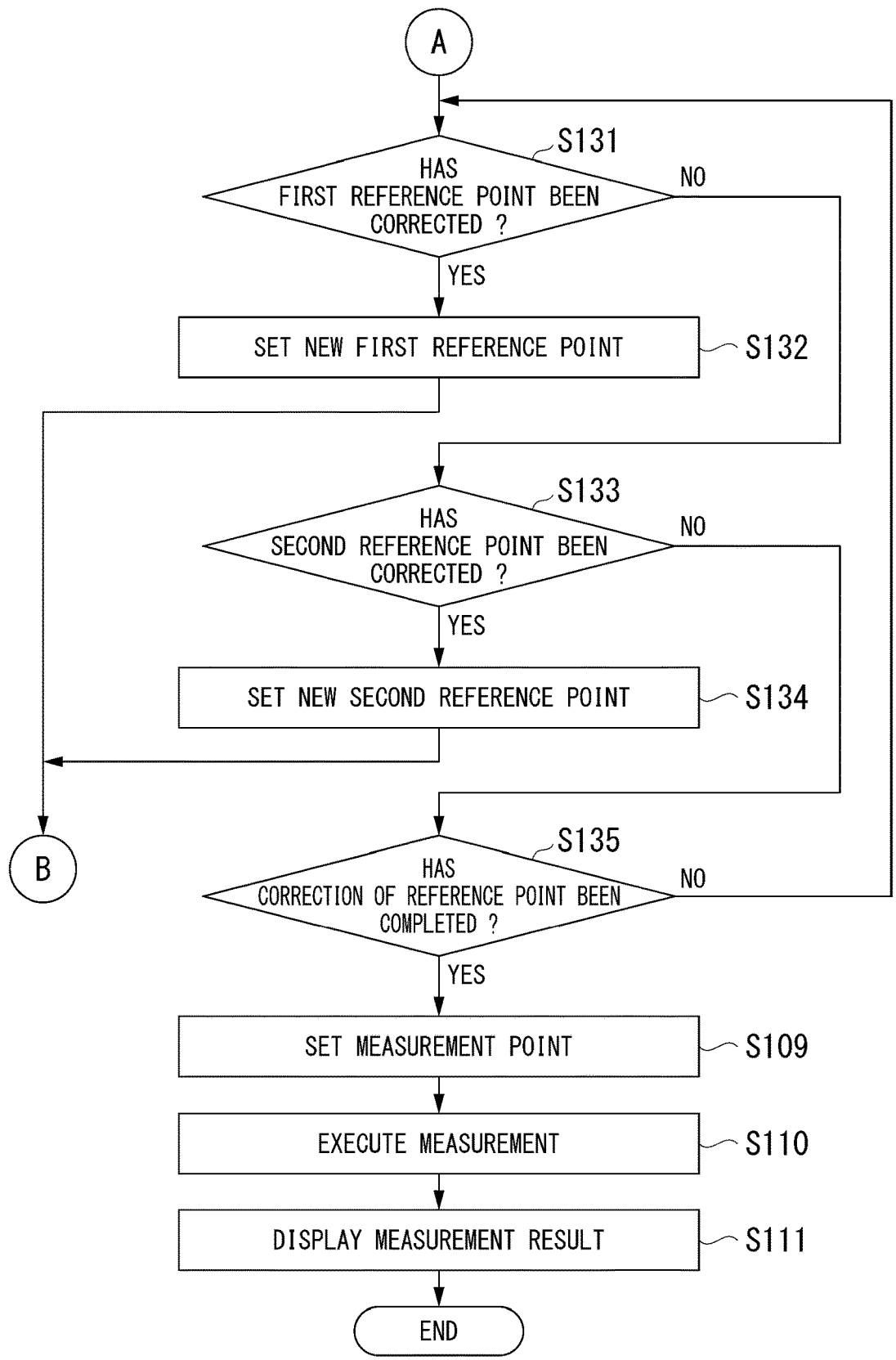
FIG. 16 is a flow chart showing a procedure of three-dimensional measurement in the second modified example of the first embodiment of the present invention.

Three-dimensional measurement in the second modified example of the first embodiment will be described by using FIG. 15 and FIG. 16. FIG. 15 and FIG. 16 show a procedure of the three-dimensional measurement. The same processing as the processing shown in FIG. 4 will not be described.

After Step S108, the control unit 180 determines whether or not the first reference point set in Step S104 has been corrected (Step S131). For example, the display unit 5 is a touch panel. A user is able to move the first reference point on a 3D image through a drag operation. When a user has moved the first reference point, the control unit 180 determines that the first reference point has been corrected. When a user has not moved the first reference point, the control unit 180 determines that the first reference point has not been corrected. A menu for starting correction of a reference point may be displayed on the display unit 5. When a user selects correction of a reference point from the menu and has corrected the first reference point on a 3D image, the control unit 180 determines that the first reference point has been corrected.

When the control unit 180 determines that the first reference point has been corrected in Step S131, the point setting unit 182 determines a position at which movement of the first reference point has been completed and sets a new first reference point at the position. At this time, the first reference point that was previously set is canceled. The display control unit 181 displays the first reference point on the 3D image displayed in Step S103 (Step S132). After Step S132, Step S106 is executed.

When the control unit 180 determines that the first reference point has not been corrected in Step S131, the control unit 180 determines whether or not the second reference point set in Step S105 has been corrected (Step S133). The method of determination in Step S133 is the same as the method of determination in Step S131.

When the control unit 180 determines that the second reference point has been corrected in Step S133, the point setting unit 182 determines a position at which movement of the second reference point is completed and sets a new second reference point at the position. At this time, the second reference point that was previously set is canceled. The display control unit 181 displays the second reference point on the 3D image displayed in Step S103 (Step S134). After Step S134, Step S106 is executed.

When the control unit 180 determines that the second reference point has not been corrected in Step S133, the control unit 180 determines whether or not correction of a reference point has been completed (Step S135). For example, the display unit 5 is a touch panel and a button for completing correction of a reference point is displayed on the display unit 5. When a user has touched the button, the control unit 180 determines that correction of a reference point has been completed. When a user has not touched the button, the control unit 180 determines that correction of a reference point has not been completed.

When the control unit 180 determines that correction of a reference point has been completed in Step S135, Step S109 is executed. When the control unit 180 determines that correction of a reference point has not been completed in Step S135, Step S131 is executed.

Figure 17:
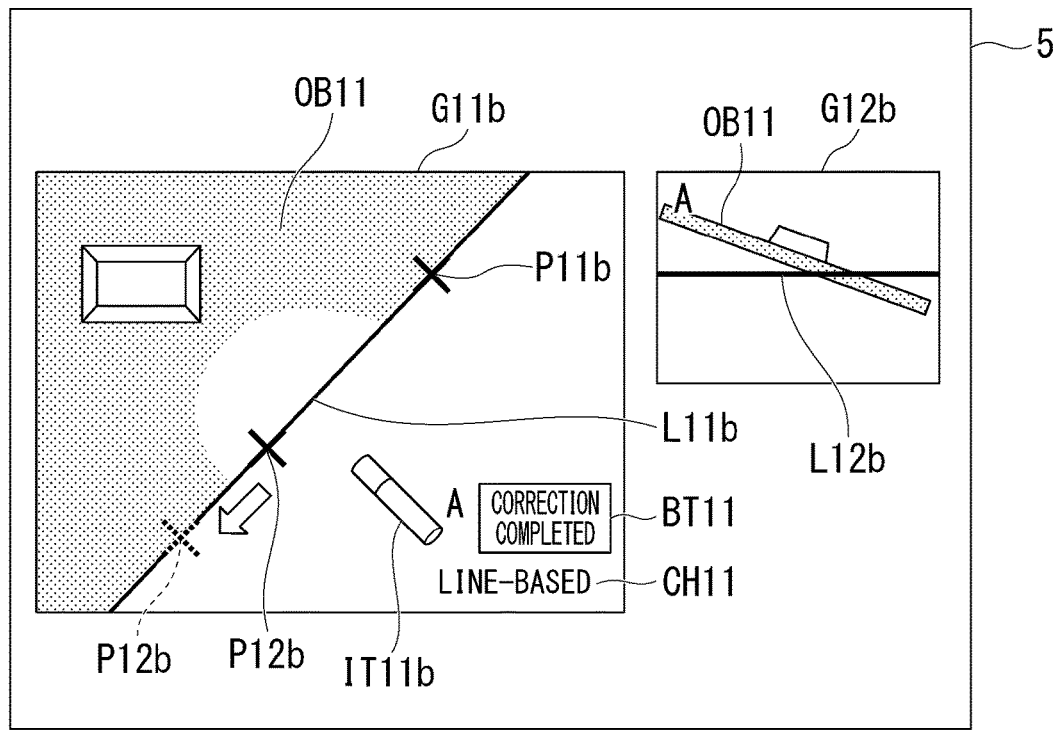
FIG. 17 is a diagram showing an example of an image displayed on a display unit according to the second modified example of the first embodiment of the present invention.

FIG. 17 shows an example of an image displayed on the display unit 5 in Step S108. A 3D image G11*b* and a 3D image G12*b* are displayed on the display unit 5. The 3D image G11*b* is the same as the 3D image G11*b* shown in FIG. 8. The 3D image G12*b* is the same as the 3D image G12*b* shown in FIG. 8. A first reference point P11*b* is set on the edge of a subject OB11. A second reference point P12*b* is set at a position that is not on the edge of the subject OB11.

A reference line L12*b* is displayed on the 3D image G12*b*. In the example shown in FIG. 17, the reference line L12*b* does not match the edge of the subject OB11. For this reason, a user can determine that the positions of the two reference points are not valid. A user can correct at least one of the two reference points on the 3D image G11*b*. In the example shown in FIG. 17, a user determines that the second reference point P12*b* is to be corrected.

Figure 18:
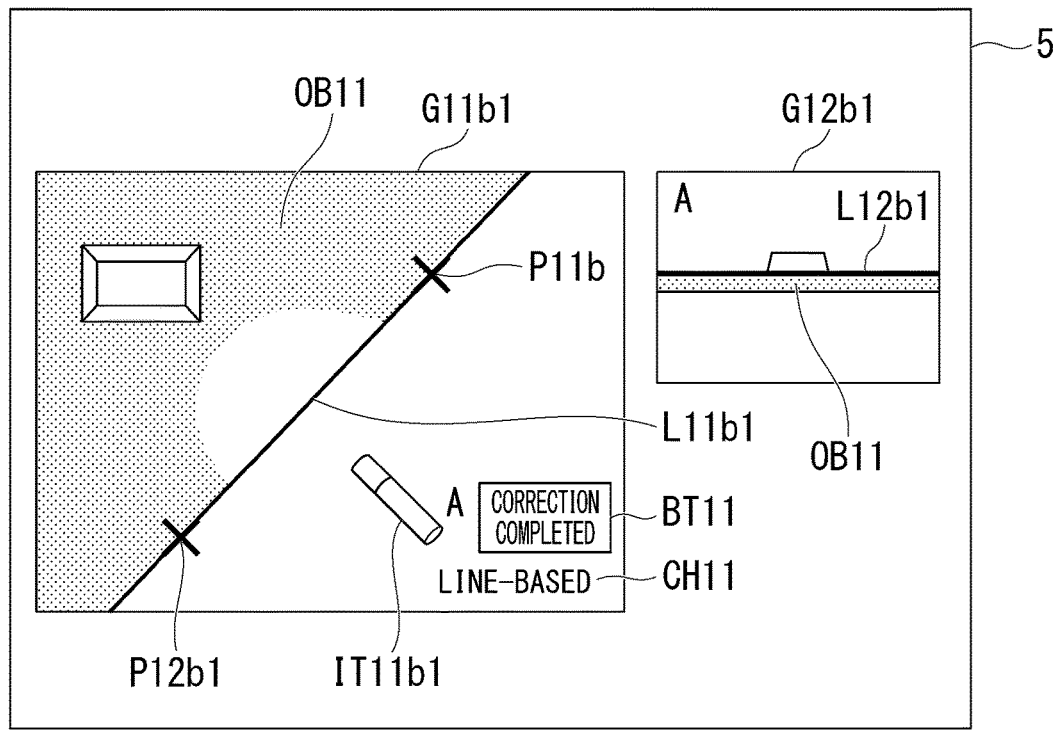
FIG. 18 is a diagram showing an example of an image displayed on the display unit according to the second modified example of the first embodiment of the present invention.

FIG. 18 shows an example of an image displayed on the display unit 5 in Step S108 after the second reference point P12*b* is corrected. A 3D image G11*b*1 and a 3D image G12*b*1 are displayed on the display unit 5. Instead of the second reference point P12*b* shown in FIG. 17, a second reference point P12*b*1 is set on the edge of the subject OB11 on the 3D image G11*b*1. After the second reference point P12*b* is corrected, a reference line is calculated on the basis of the first reference point P11*b* and the corrected second reference point P12*b*1 in Step S106. Instead of the reference line L11*b* shown in FIG. 17, a reference line L11*b*1 is displayed on the 3D image G11*b*1.

After the reference line is calculated, a viewpoint A and a direction A are calculated in Step S107. The 3D image G12*b*1 of the subject OB11 seen in the direction A from the viewpoint A is displayed on the display unit 5 in Step S108. A reference line L12*b*1 is displayed on the 3D image G12*b*1. In the example shown in FIG. 18, the reference line L12*b*1 matches the edge of the subject OB11. For this reason, a user can determine that the positions of the two reference points are valid. Instead of the illustration IT11*b* shown in FIG. 17, an illustration IT11*b*1 is displayed on the 3D image G11*b*1.

A user notifies the endoscope device 1 of completion of correcting a reference point by touching a button BT11. When the button BT11 is touched, the control unit 180 determines that correction of a reference point has been completed in Step S135. The control unit 180 may determine that correction of a reference point has been completed by using another method. For example, the control unit 180 may determine that correction of a reference point has been completed and a user has instructed to set a measurement point when a user touches a position other than a reference point. In such a case, the point setting unit 182 may set a measurement point at the position touched by a user.

In the second modified example of the first embodiment, the endoscope device 1 can correct at least one of two reference points. In a case in which a position of a reference point is different from a position intended by a user, the user can easily instruct the endoscope device 1 to correct the reference point. A user can examine the position of a reference point on the basis of a 3D image of a subject seen in a direction A from a viewpoint A. For this reason, the endoscope device 1 can simplify determination of validity of a reference point.

Third Modified Example of First Embodiment

In a third modified example of the first embodiment of the present invention, the endoscope device 1 has a function of correcting a reference point. A user can correct a reference point on a 3D image seen in a direction A from a viewpoint A.

Three-dimensional measurement in the third modified example of the first embodiment will be described. Processing different from the processing in the second modified example of the first embodiment will be described.

The image generation unit 186 generates a 3D image of a subject seen in a direction A from a viewpoint A. The image generation unit 186 superimposes a reference line, a first reference point, and a second reference point on the 3D image. The display control unit 181 displays the 3D image on which the reference line, the first reference point, and the second reference point have been superimposed on the display unit 5.

A user can move two reference points on a first 3D image. The first 3D image is a 3D image of a subject seen in an initial direction from an initial viewpoint. In addition, a user can move two reference points on a second 3D image. The second 3D image is a 3D image of a subject seen in a direction A from a viewpoint A.

The control unit 180 determines whether or not a first reference point on one of the two 3D images has been corrected. When the first reference point on the first 3D image has been corrected, processing similar to the processing in the second modified example of the first embodiment is executed and the first reference point is corrected.

When the first reference point on the second 3D image has been corrected, the point setting unit 182 determines a position at which movement of the first reference point has been completed and sets a new first reference point at the position. At this time, the first reference point that was previously set is canceled. The new first reference point is set on each of the first 3D image and the second 3D image. Three-dimensional coordinates of the new first reference point are included in the three-dimensional coordinates calculated by the coordinate calculation unit 183. The display control unit 181 displays the new first reference point on the second 3D image. In addition, the display control unit 181 displays the new first reference point on the first 3D image.

The control unit 180 determines whether or not a second reference point on one of the two 3D images has been corrected. When the second reference point on the first 3D image has been corrected, processing similar to the processing in the second modified example of the first embodiment is executed and the second reference point is corrected. When the second reference point on the second 3D image has been corrected, processing similar to the processing for correcting the first reference point is executed.

Figure 19:
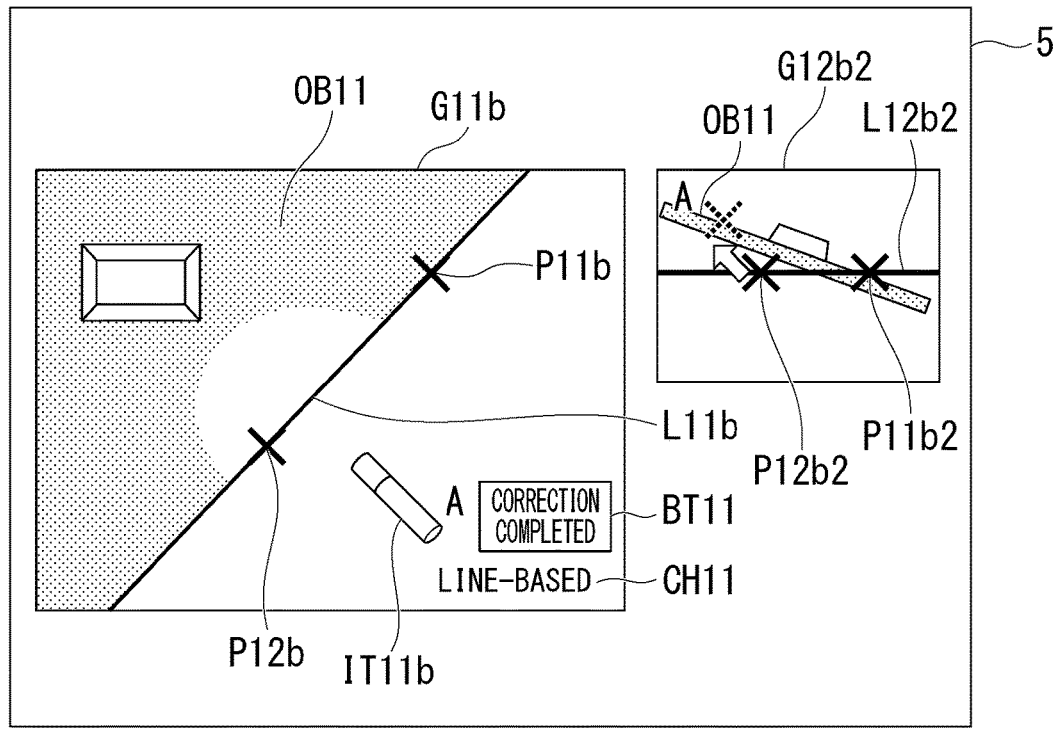
FIG. 19 is a diagram showing an example of an image displayed on a display unit according to a third modified example of the first embodiment of the present invention.

FIG. 19 shows an example of an image displayed on the display unit 5 in Step S108. A 3D image G11*b* and a 3D image G12*b*2 are displayed on the display unit 5. The 3D image G11*b* is the same as the 3D image G11*b* shown in FIG. 8. A first reference point P11*b* is set on the edge of a subject OB11. A second reference point P12*b* is set at a position that is not on the edge of the subject OB11.

The 3D image G12*b*2 is a 3D image of the subject OB11 seen in a direction A from a viewpoint A. A first reference point P11*b*2, a second reference point P12*b*2, and a reference line L12*b*2 are displayed on the 3D image G12*b*2. In the example shown in FIG. 19, the reference line L12*b*2 does not match the edge of the subject OB11. For this reason, a user can determine that the positions of the two reference points are not valid. A user can correct at least one of the two reference points on the 3D image G12*b*2. In the example shown in FIG. 19, a user determines that the second reference point P12*b*2 is to be corrected.

Figure 20:
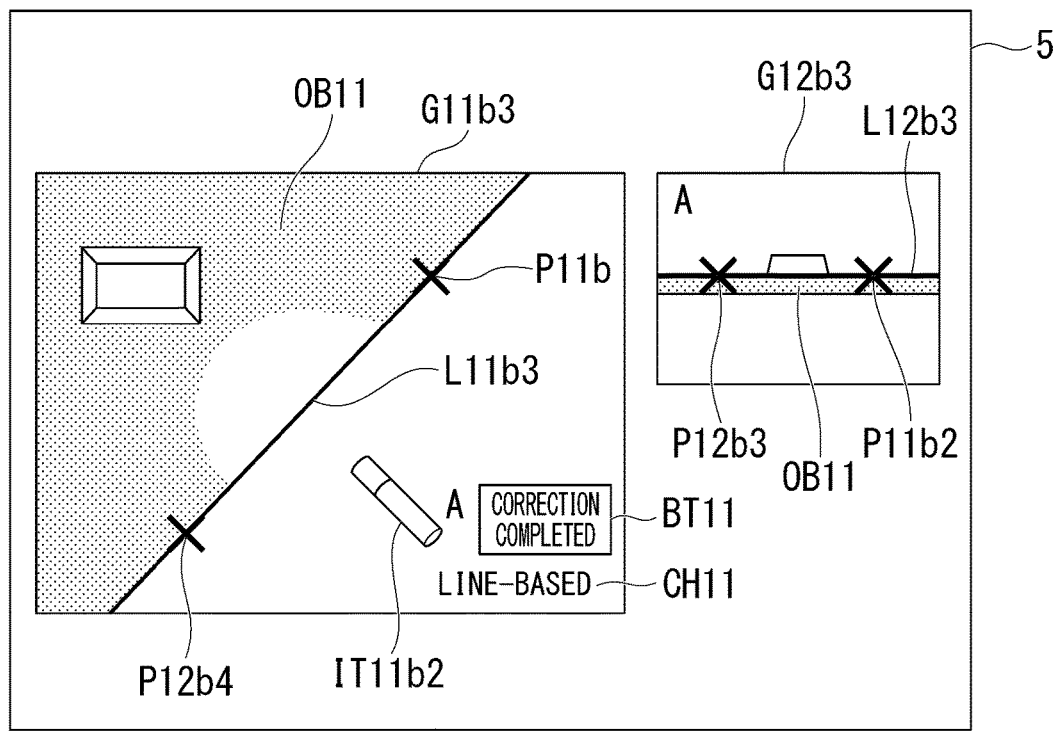
FIG. 20 is a diagram showing an example of an image displayed on the display unit according to the third modified example of the first embodiment of the present invention.

FIG. 20 shows an example of an image displayed on the display unit 5 after the second reference point P12*b*2 is corrected. A 3D image G11*b*3 and a 3D image G12*b*3 are displayed on the display unit 5. Instead of the second reference point P12*b*2 shown in FIG. 19, a second reference point P12*b*3 is set on the edge of the subject OB11 on the 3D image G12*b*3. Instead of the second reference point P12*b* shown in FIG. 19, a second reference point P12*b*4 is displayed on the 3D image G11*b*3. After the second reference point P12*b*2 is corrected, a reference line is calculated on the basis of the first reference point P11*b* and the corrected second reference point P12*b*4. Instead of the reference line L11*b* shown in FIG. 19, a reference line L11*b*3 is displayed on the 3D image G11*b*3.

The 3D image G12*b*3 is a 3D image of the subject OB11 seen in the direction A from the viewpoint A. The first reference point P11*b*2, a second reference point P12*b*3, and a reference line L12*b*3 are displayed on the 3D image G12*b*3. In the example shown in FIG. 20, the reference line L12*b*3 matches the edge of the subject OB11. For this reason, a user can determine that the positions of the two reference points are valid. Instead of the illustration IT11*b* shown in FIG. 19, an illustration IT11*b*2 is displayed on the 3D image G11*b*3.

Second Embodiment

A second embodiment of the present invention will be described. In the second embodiment, a reference figure is a straight line (reference line). The viewpoint calculation unit 185 calculates an approximate plane on the basis of three-dimensional coordinates of at least three points. The approximate plane is a plane that approximates the surface of a subject. Each of the at least three points is one of a plurality of points on the subject. Each of the at least three points is near the reference figure or on the reference figure. A straight line axis defining a second viewpoint and a second direction is parallel to the approximate plane.

Two three-dimensional images for confirmation of positions of two reference points are displayed on the display unit 5. One of the three-dimensional images is a third image of a subject seen in a second direction from a second viewpoint. The viewpoint calculation unit 185 further calculates a third direction and a third viewpoint on the basis of a reference figure. The third direction is different from any of a first direction and the second direction. The third direction is perpendicular to the second direction. The third viewpoint is different from any of a first viewpoint and the second viewpoint. The image generation unit 186 further generates a fourth image on the basis of three-dimensional coordinates of a plurality of points. The fourth image is a three-dimensional image of a subject seen in the third direction from the third viewpoint. The display control unit 181 further displays the fourth image on which information representing the position of the reference figure has been superimposed on the display unit 5.

The second direction and the second viewpoint are set on the basis of a first straight line axis. The first straight line axis is parallel to the approximate plane and perpendicular to the reference figure. The third direction and the third viewpoint are set on the basis of a second straight line axis. The second straight line axis is perpendicular to the above-described approximate plane.

The first straight line axis defining the second viewpoint and the second direction may be perpendicular to the above-described approximate plane. The second straight line axis defining the third viewpoint and the third direction may be parallel to the approximate plane.

Figure 21:
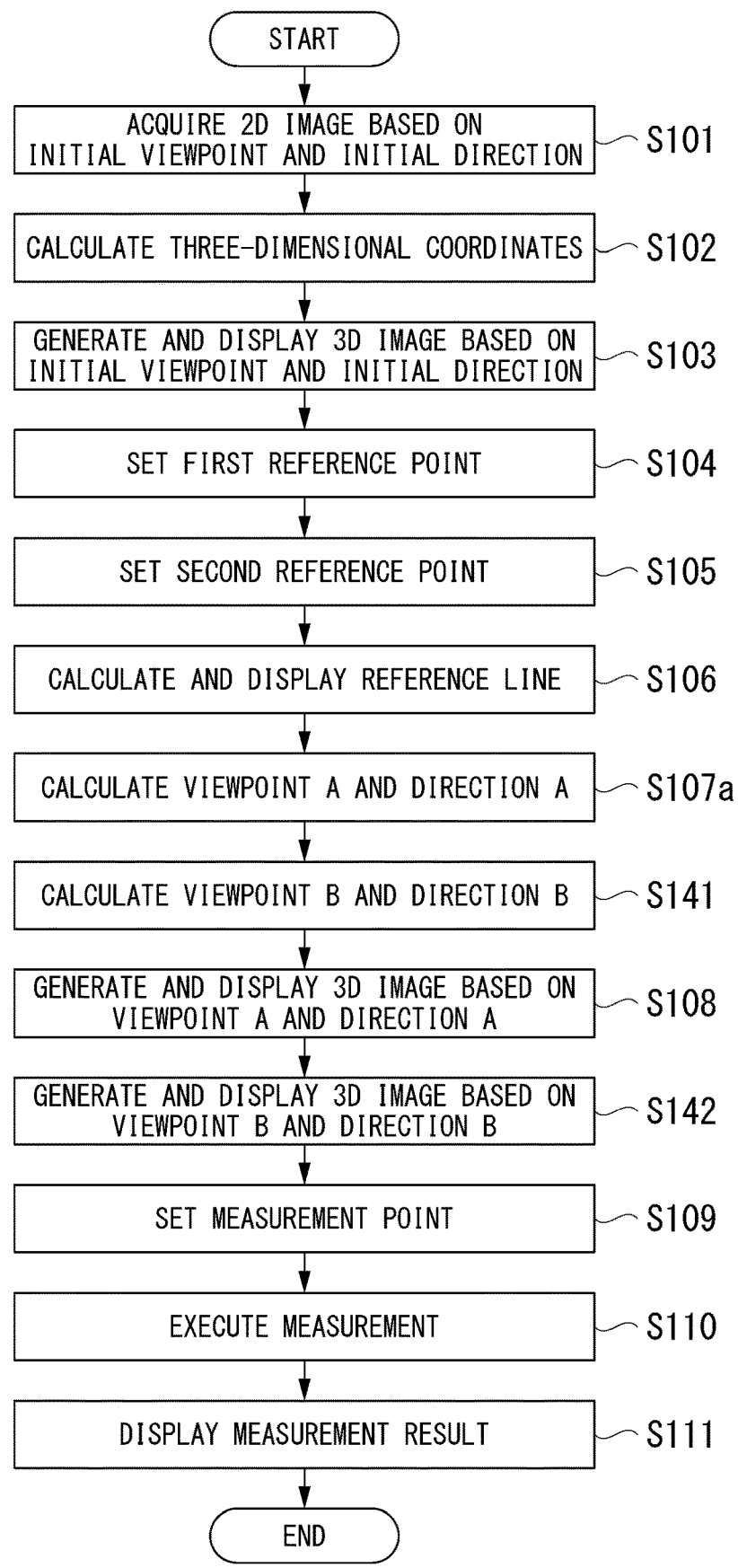
FIG. 21 is a flow chart showing a procedure of three-dimensional measurement in a second embodiment of the present invention.

Three-dimensional measurement in the second embodiment will be described by using FIG. 21. FIG. 21 shows a procedure of the three-dimensional measurement. The same processing as the processing shown in FIG. 4 will not be described.

After Step S106, the viewpoint calculation unit 185 calculates a viewpoint A (second viewpoint) and a direction A (second direction) on the basis of a reference line (Step S107a). Step S107a corresponds to the viewpoint calculation step. The viewpoint calculation unit 185 calculates the viewpoint A and the direction A in Step S107a by using the method described below.

The viewpoint calculation unit 185 sets an X' axis that extends in the same direction as that in which a reference line extends. The X' axis matches the reference line. The viewpoint calculation unit 185 calculates an approximate plane on the basis of three-dimensional coordinates of at least three points around the reference line. For example, the viewpoint calculation unit 185 calculates the approximate plane by using the least squares method. For example, the viewpoint calculation unit 185 calculates the approximate plane on the basis of three-dimensional coordinates of the at least three points that are within a predetermined distance from the reference line. The at least three points are near the reference line. The at least three points may include at least one of two reference points. The at least three points may not include two reference points. In a case in which the at least three points include at least one reference point, the at least three points include a point on the reference line. The viewpoint calculation unit 185 sets a Y' axis (first straight line axis) that extends in a direction that is parallel to the approximate plane and is perpendicular to the X' axis.

The viewpoint calculation unit 185 sets the direction from a first region in which the data number of three-dimensional coordinates of a subject is small to a second region in which the data number of three-dimensional coordinates of the subject is large to the positive direction of the Y' axis. The first region and the second region are set around the Y' axis. The viewpoint calculation unit 185 sets a Z' axis that extends in a direction perpendicular to each of the X' axis and the Y' axis. The Z' axis passes through a camera position.

The viewpoint calculation unit 185 sets the direction A to the positive direction of the Y' axis. The viewpoint calculation unit 185 calculates the viewpoint A such that the subject falls within the visual field when the subject is seen in the direction A. Specifically, the viewpoint calculation unit 185 calculates a position at which the visual line proceeding in the direction A from the viewpoint A passes through. For example, the Z' coordinate of the viewpoint A is 0. The X' coordinate of the viewpoint A is the average of the X' coordinate of a first reference point and the X' coordinate of a second reference point. The Y' coordinate of the viewpoint A is a position at which the entire subject falls within the visual field. The Y' coordinate of the viewpoint A may be a position for which at least the first reference point and the second reference point fall within the visual field.

The direction A may not be parallel to the above-described approximate plane. The direction A may be slightly tilted away from the direction parallel to the approximate plane. For example, the direction A may be slightly tilted away from the direction parallel to the approximate plane by 5 degrees. In this way, a user can obtain three-dimensional sense.

After Step S107a, the viewpoint calculation unit 185 calculates a viewpoint B (third viewpoint) and a direction B (third direction) on the basis of the reference line (Step S141). Step S141 corresponds to the viewpoint calculation step. The viewpoint calculation unit 185 calculates the viewpoint B and the direction B in Step S141 by using the method described below.

The viewpoint calculation unit 185 sets the direction B to the positive direction of the Z' axis (second straight line). The direction B is perpendicular to the direction A. The viewpoint calculation unit 185 sets the viewpoint B on the Z' axis. For example, the viewpoint calculation unit 185 sets the Z' coordinate of the viewpoint B on the basis of the magnification of a 3D image.

After Step S141, Step S108 is executed. After Step S108, the image generation unit 186 generates a three-dimensional image (3D image) of the subject seen in the direction B from the viewpoint B on the basis of the three-dimensional coordinates calculated in Step S102. At this time, the image generation unit 186 generates image data for displaying the 3D image by using perspective projection. The image generation unit 186 superimposes the reference line on the 3D image. The display control unit 181 displays the 3D image on which the reference line has been superimposed on the display unit 5 (Step S142). The 3D image (fourth image) displayed in Step S142 represents a state of the subject seen in the direction B from the viewpoint B. Step S142 corresponds to the image generation step and the second display step. After Step S142, Step S109 is executed.

Figure 22:
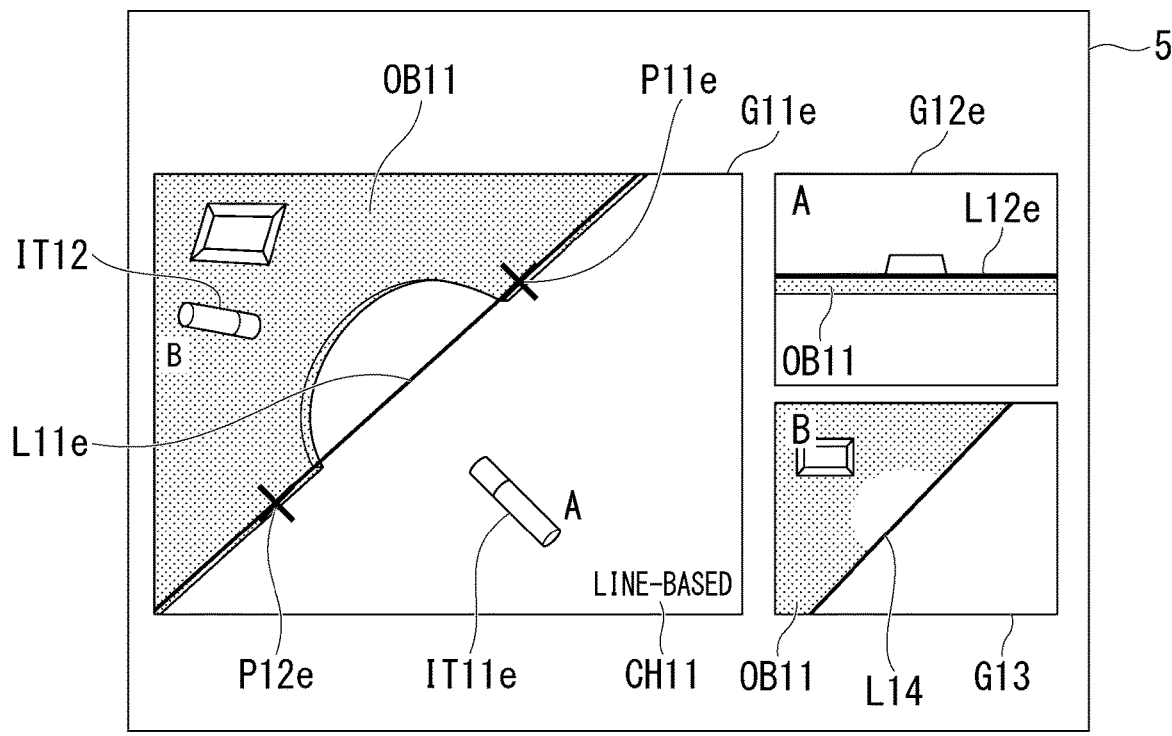
FIG. 22 is a diagram showing an example of an image displayed on a display unit according to the second embodiment of the present invention.

FIG. 22 shows an example of an image displayed on the display unit 5 in Step S142. A 3D image G11e, a 3D image G12e, and a 3D image G13 are displayed on the display unit 5. The display control unit 181 displays the 3D image G13 on the display unit 5 in Step S142 such that the 3D image G13 does not overlap any of the 3D image G11e and the 3D image G12e. The 3D image G11e is a 3D image of a subject OB11 seen in an initial direction from an initial viewpoint. Characters CH11, a first reference point P11e, a second reference point P12e, a reference line L11e, an illustration IT11e, and an illustration IT12 are displayed on the 3D image G11e.

In FIG. 22, the state in which the surface of the subject OB11 is tilted is shown. The upper part of the subject OB11 is tilted backward in the visual field, compared to the lower part of the subject OB11 in the 3D image G11e.

The 3D image G12e is a 3D image of the subject OB11 seen in a direction A from a viewpoint A. A reference line L12e is displayed on the 3D image G12e. The reference line L12e represents a reference line seen in the direction A from the viewpoint A. The edge of the subject OB11 seen in the direction parallel to the surface of the subject OB11 is seen in the 3D image G12e.

The 3D image G13 is a three-dimensional image of the subject OB11 seen in a direction B from a viewpoint B. A reference line L14 is displayed on the 3D image G13. The reference line L14 represents a reference line seen in the direction B from the viewpoint B. The subject OB11 seen in the direction perpendicular to the surface of the subject OB11 is seen in the 3D image G13.

A user determines whether or not the reference line is set on the edge of the subject OB11 on the basis of the 3D image G12e and the 3D image G13. In this way, a user can confirm whether or not the positions of the two reference points are valid on the basis of the two images of the subject seen from the two viewpoints. In the example shown in FIG. 22, the reference line L12e and the reference line L14 match the edge of the subject OB11. For this reason, a user can confirm that the positions of the two reference points are valid. An operation for designating a position of a viewpoint and a direction of a visual line is unnecessary.

The display control unit 181 displays the illustration IT12 of the tip end 20 of the insertion unit 2 on the display unit 5 in Step S142. Step S142 corresponds to the third display step. The illustration IT12 is displayed on the 3D image G11e. The illustration IT12 represents the tip end 20 of the insertion unit 2 disposed at the viewpoint B and facing in the direction B. Since the illustration IT12 is displayed, a user can confirm the viewpoint B and the direction B.

When the 3D image G12e and the 3D image G13 are displayed on the display unit 5, the display control unit 181 may hide the 3D image G11e. In this way, the display control unit 181 can display the 3D image G12e and the 3D image G13 large. The display control unit 181 may switch between a first state and a second state on the basis of an instruction from a user. In the first state, only the 3D image G11e is displayed on the display unit 5. In the second state, only the 3D image G12e and the 3D image G13 are displayed on the display unit 5. After a user finishes confirmation of the positions of the two reference points, the user may cause the 3D image G11e, the 3D image G12e, and the 3D image G13 to be displayed by performing a predetermined operation. The display control unit 181 may display the 3D image G13 on the display unit 5 such that at least part of the 3D image G13 overlaps at least one of the 3D image G11e and the 3D image G12e.

Figure 23:
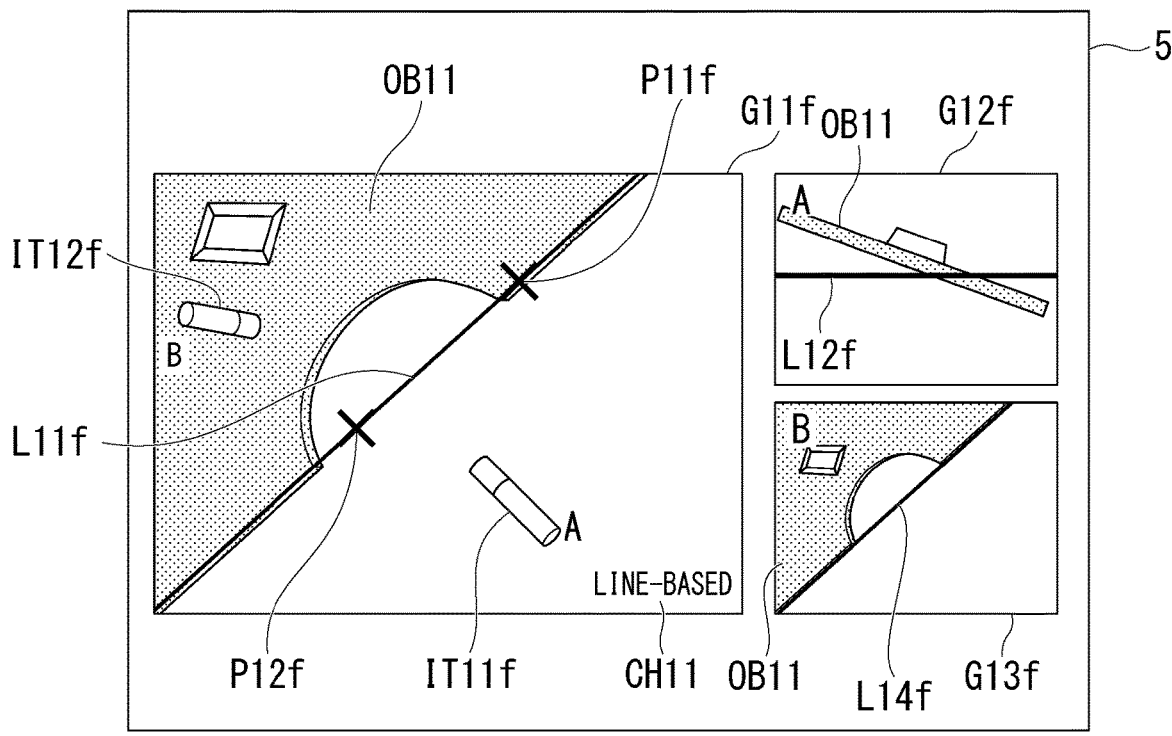
FIG. 23 is a diagram showing an example of an image displayed on the display unit according to the second embodiment of the present invention.

FIG. 23 shows another example of an image displayed on the display unit 5 in Step S142. A 3D image G11f, a 3D image G12f, and a 3D image G13f are displayed on the display unit 5. The 3D image G11f is a 3D image of a subject OB11 seen in an initial direction from an initial viewpoint. Characters CH11, a first reference point P11f, a second reference point P12f, a reference line L11f, an illustration IT11f, and an illustration IT12f are displayed on the 3D image G11f. The first reference point P11f is set on the edge of the subject OB11. The second reference point P12f is set at a position that is not on the subject OB11.

The 3D image G12f is a 3D image of the subject OB11 seen in a direction A from a viewpoint A. A reference line L12f is displayed on the 3D image G12f. The 3D image G13f is a 3D image of the subject OB11 seen in a direction B from a viewpoint B. A reference line L14f is displayed on the 3D image G13f. In the example shown in FIG. 23, the reference line L12f does not match the edge of the subject OB11. For this reason, a user can determine that the positions of the two reference points are not valid.

In fact, the reference line L14f does not match the edge of the subject OB11 in the 3D image G13f. It is difficult for a user to understand that. Since 3D images of a subject seen from a plurality of viewpoints are displayed, the possibility that a user misses the state in which the positions of the two reference points are not valid is reduced.

Figure 24:
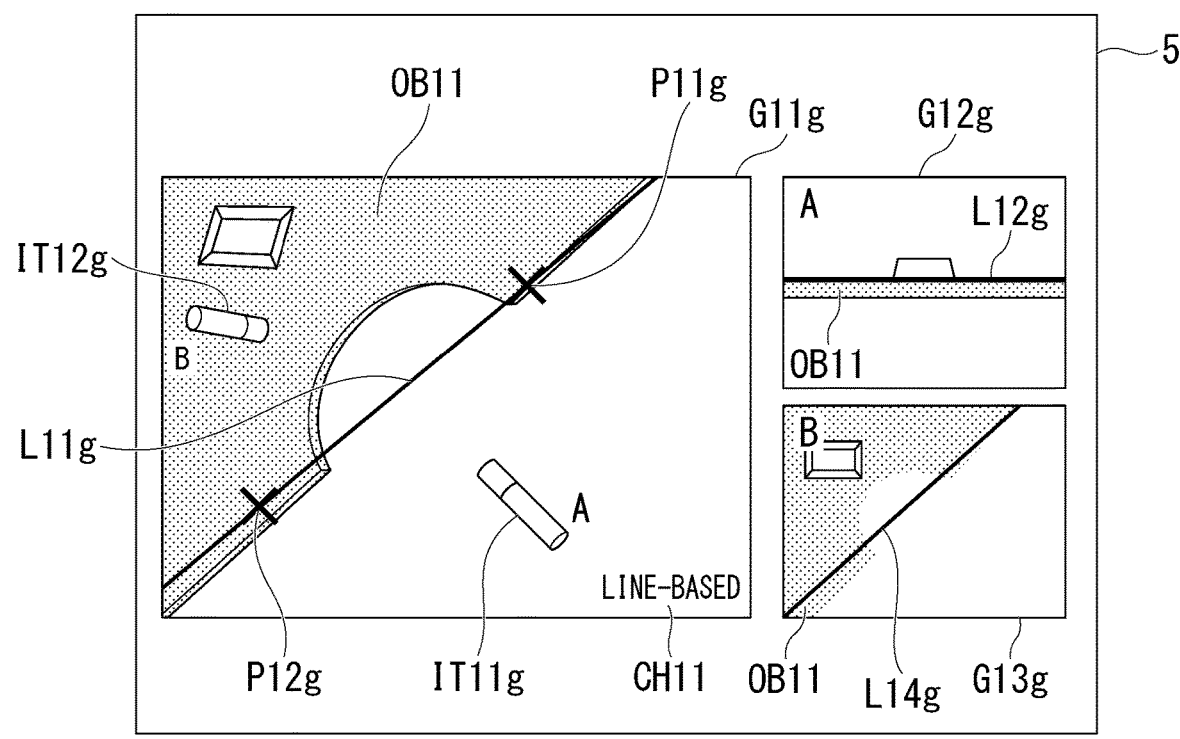
FIG. 24 is a diagram showing an example of an image displayed on the display unit according to the second embodiment of the present invention.

FIG. 24 shows another example of an image displayed on the display unit 5 in Step S142. A 3D image G11g, a 3D image G12g, and a 3D image G13g are displayed on the display unit 5. The 3D image G11g is a 3D image of a subject OB11 seen in an initial direction from an initial viewpoint. Characters CH11, a first reference point P11g, a second reference point P12g, a reference line L11g, an illustration IT11g, and an illustration IT12g are displayed on the 3D image G11g. The first reference point P11g is set on the edge of the subject OB11. The second reference point P12g is set near the edge of the subject OB11.

The 3D image G12g is a 3D image of the subject OB11 seen in a direction A from a viewpoint A. A reference line L12g is displayed on the 3D image G12g. The 3D image G13g is a 3D image of the subject OB11 seen in a direction B from a viewpoint B. A reference line L14g is displayed on the 3D image G13g. In the example shown in FIG. 24, the reference line L14g does not match the edge of the subject OB11. For this reason, a user can determine that the positions of the two reference points are not valid.

Since the surface of the subject OB11 is tilted in the 3D image G11g, the amount of shift between the edge of the subject OB11 and the reference line L11g looks smaller than the actual amount of the shift. It is difficult for a user to notice the shift. The subject OB11 seen in the direction perpendicular to the surface of the subject OB11 is seen in the 3D image G13g. For this reason, it is easy for a user to understand the shift between the edge of the subject OB11 and the reference line L14g.

Step S141 may be executed before Step S107a is executed. Step S142 may be executed before Step S108 is executed. Step S141 and Step S142 may be executed before Step S107a is executed. Step S141 may be executed after Step S108 is executed.

Step S141 may be executed after one of Steps S109 to S111 is executed. Step S142 may be executed after one of Steps S109 to S111 is executed. In a case in which Step S142 is executed after Step S110 or Step S111 is executed, a user can confirm whether or not the positions of the two reference points that have been used for measurement are valid.

Only one of a 3D image of a subject seen in a direction A from a viewpoint A and a 3D image of the subject seen in a direction B from a viewpoint B may be displayed on the display unit 5.

Step S107a may be changed to Step S107 shown in FIG. 4. In other words, the viewpoint calculation unit 185 may set the X' axis, the Y' axis, and the Z' axis by using the same method as the method described in the first embodiment. The viewpoint calculation unit 185 may set a direction A to the positive direction of the Y' axis similarly to the first embodiment and set a viewpoint A on the Y' axis similarly to the first embodiment. The viewpoint calculation unit 185 may set a direction B to the positive direction of the Z' axis and set a viewpoint B on the Z' axis in Step S141.

In the second embodiment, a 3D image of a subject seen in a direction A from a viewpoint A and a 3D image of the subject seen in a direction B from a viewpoint B are displayed on the display unit 5. For this reason, the endoscope device 1 can simplify determination of validity of a point designated on an image of a subject.

The display control unit 181 displays a 3D image of a subject seen in a direction A parallel to a plane approximating the surface of the subject on the display unit 5. In addition, the display control unit 181 displays a 3D image of a subject seen in a direction B perpendicular to a plane approximating the surface of the subject on the display unit 5. A user can easily determine whether or not a reference line is set on the edge of the subject OB11. In other words, a user can easily confirm whether or not the positions of the two reference points are valid.

Third Embodiment

A third embodiment of the present invention will be described. Two three-dimensional images for confirmation of positions of two reference points are displayed on the display unit 5. One three-dimensional image is a third image of a subject seen in a second direction from a second viewpoint. The other three-dimensional image is a fourth image of a subject seen in a third direction from a third viewpoint.

In the third embodiment, a reference figure is a straight line (reference line). The second direction and the second viewpoint are set on the basis of a first straight line axis. The third direction and the third viewpoint are set on the basis of a second straight line axis. The first straight line axis is parallel to an approximate plane that approximates the surface of a subject and perpendicular to the reference figure. The second straight line axis is parallel to the approximate plane and is parallel to the reference figure.

The first straight line axis may be parallel to the above-described approximate plane and may be parallel to the reference figure. The second straight line axis may be parallel to the approximate plane and may be perpendicular to the reference figure.

Figure 25:
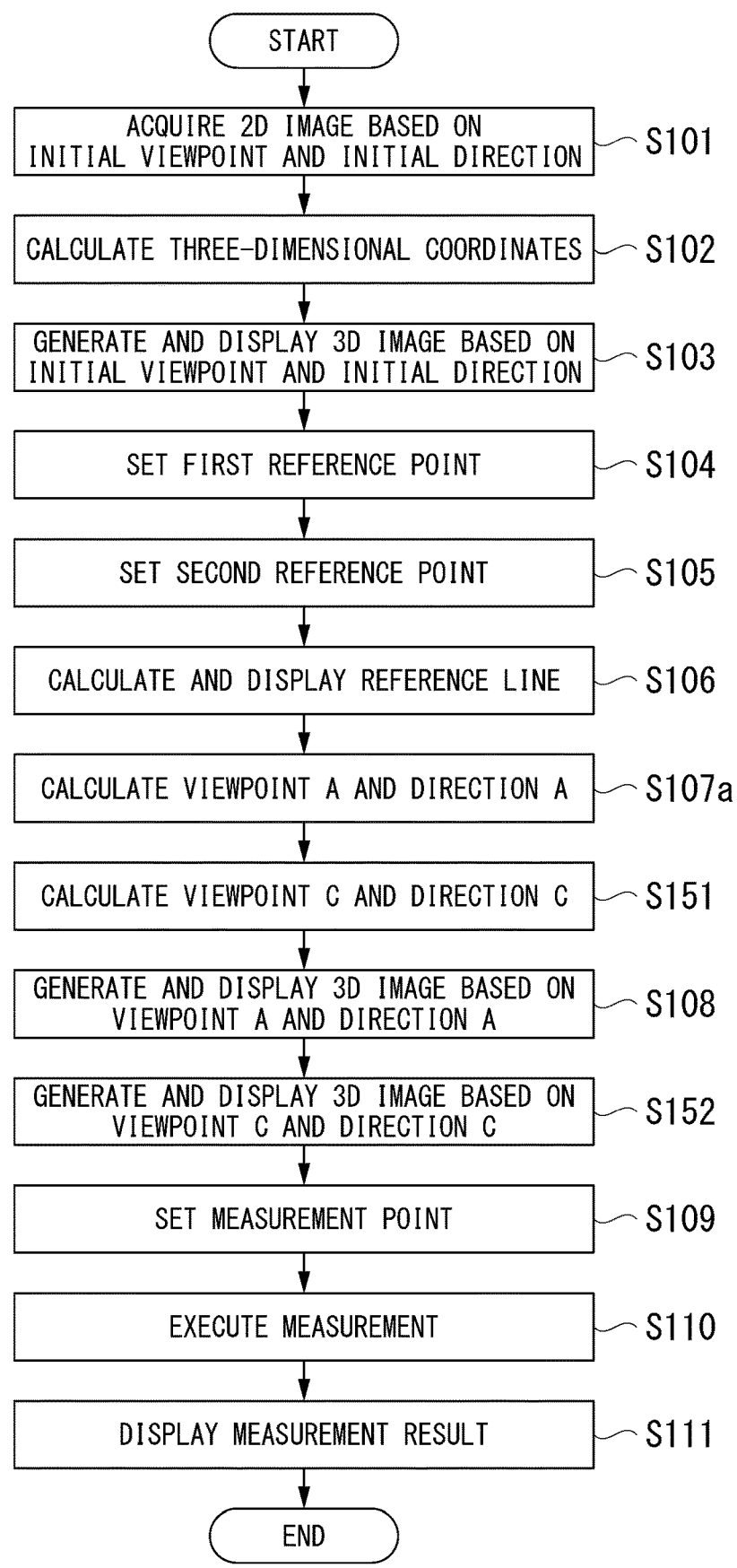
FIG. 25 is a flow chart showing a procedure of three-dimensional measurement in a third embodiment of the present invention.

Three-dimensional measurement in the third embodiment will be described by using FIG. 25. FIG. 25 shows a procedure of the three-dimensional measurement. The same processing as the processing shown in FIG. 21 will not be described.

After Step S107a, the viewpoint calculation unit 185 calculates a viewpoint C (third viewpoint) and a direction C (third direction) on the basis of the reference line (Step S151). Step S151 corresponds to the viewpoint calculation step. The viewpoint calculation unit 185 calculates the viewpoint C and the direction C in Step S151 by using the method described below.

In Step S107a, the X' axis (second straight line axis), the Y' axis, and the Z' axis are set. The viewpoint calculation unit 185 sets the direction C to the positive direction of the X' axis. The direction C is perpendicular to the direction A. The viewpoint calculation unit 185 sets the viewpoint C on the X' axis. For example, the viewpoint calculation unit 185 sets the X' coordinate of the viewpoint C on the basis of the magnification of a 3D image.

After Step S151, Step S108 is executed. After Step S108, the image generation unit 186 generates a three-dimensional image (3D image) of the subject seen in the direction C from the viewpoint C on the basis of the three-dimensional coordinates calculated in Step S102. At this time, the image generation unit 186 generates image data for displaying the 3D image by using perspective projection. The image generation unit 186 superimposes the reference line on the 3D image. The display control unit 181 displays the 3D image on which the reference line has been superimposed on the display unit 5 (Step S152). The 3D image (fourth image) displayed in Step S152 represents a state of the subject seen in the direction C from the viewpoint C. Step S152 corresponds to the image generation step and the second display step. After Step S152, Step S109 is executed.

Figure 26:
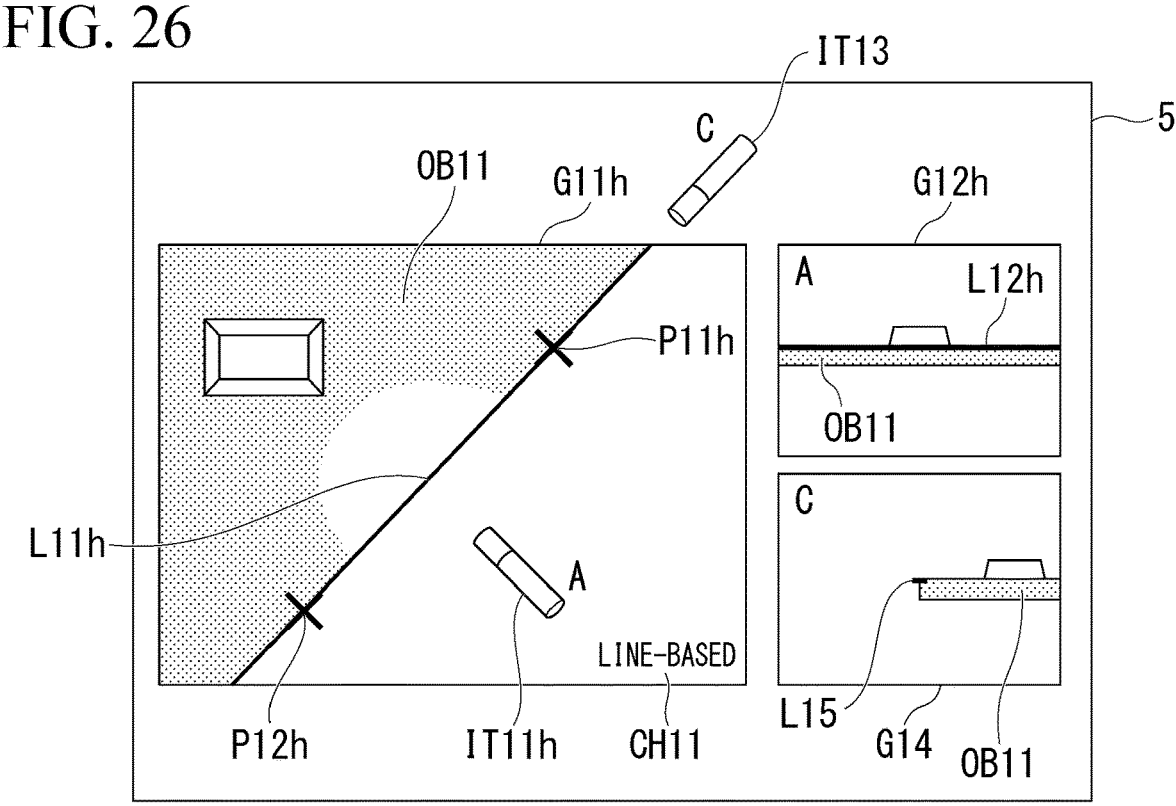
FIG. 26 is a diagram showing an example of an image displayed on a display unit according to the third embodiment of the present invention.

FIG. 26 shows an example of an image displayed on the display unit 5 in Step S152. A 3D image G11h, a 3D image G12h, and a 3D image G14 are displayed on the display unit 5. The display control unit 181 displays the 3D image G14 on the display unit 5 in Step S152 such that the 3D image G14 does not overlap any of the 3D image G11h and the 3D image G12h.

The 3D image G11h is a three-dimensional image of a subject OB11 seen in an initial direction from an initial viewpoint. Characters CH11, a first reference point P11h, a second reference point P12h, a reference line L11h, and an illustration IT11h are displayed on the 3D image G11h. The 3D image G12h is a 3D image of the subject OB11 seen in a direction A from a viewpoint A. A reference line L12h is displayed on the 3D image G12h. The 3D image G14 is a 3D image of the subject OB11 seen in a direction C from a viewpoint C. A reference line L15 is displayed on the 3D image G14. The reference line L15 represents a reference line seen in the direction C from the viewpoint C. The subject OB11 seen in the direction in which the reference line extends is seen in the 3D image G14. In a case in which the reference line L15 matches the edge of the subject OB11, the reference line L15 has a point shape.

A user determines whether or not the reference line is set on the edge of the subject OB11 on the basis of the 3D image G12h and the 3D image G14. In this way, a user can confirm whether or not the positions of the two reference points are valid on the basis of the two images of the subject seen from the two viewpoints. In the example shown in FIG. 26, the reference line L12h and the reference line L15 match the edge of the subject OB11. For this reason, a user can confirm that the positions of the two reference points are valid. An operation for designating a position of a viewpoint and a direction of a visual line is unnecessary.

The display control unit 181 displays the illustration IT13 of the tip end 20 of the insertion unit 2 on the display unit 5 in Step S152. Step S152 corresponds to the third display step. The illustration IT13 represents the tip end 20 of the insertion unit 2 disposed at the viewpoint C and facing in the direction C. Since the illustration IT13 is displayed, a user can confirm the viewpoint C and the direction C.

When the 3D image G12h and the 3D image G14 are displayed on the display unit 5, the display control unit 181 may hide the 3D image G11h. In this way, the display control unit 181 can display the 3D image G12h and the 3D image G14 large. The display control unit 181 may switch between a first state and a second state on the basis of an instruction from a user. In the first state, only the 3D image G11*h* is displayed on the display unit 5. In the second state, only the 3D image G12*h* and the 3D image G14 are displayed on the display unit 5. After a user finishes confirmation of the positions of the two reference points, the user may cause the 3D image G11*h*, the 3D image G12*h*, and the 3D image G14 to be displayed by performing a predetermined operation. The display control unit 181 may display the 3D image G14 on the display unit 5 such that at least part of the 3D image G14 overlaps at least one of the 3D image G11*h* and the 3D image G12*h*.

Figure 27:
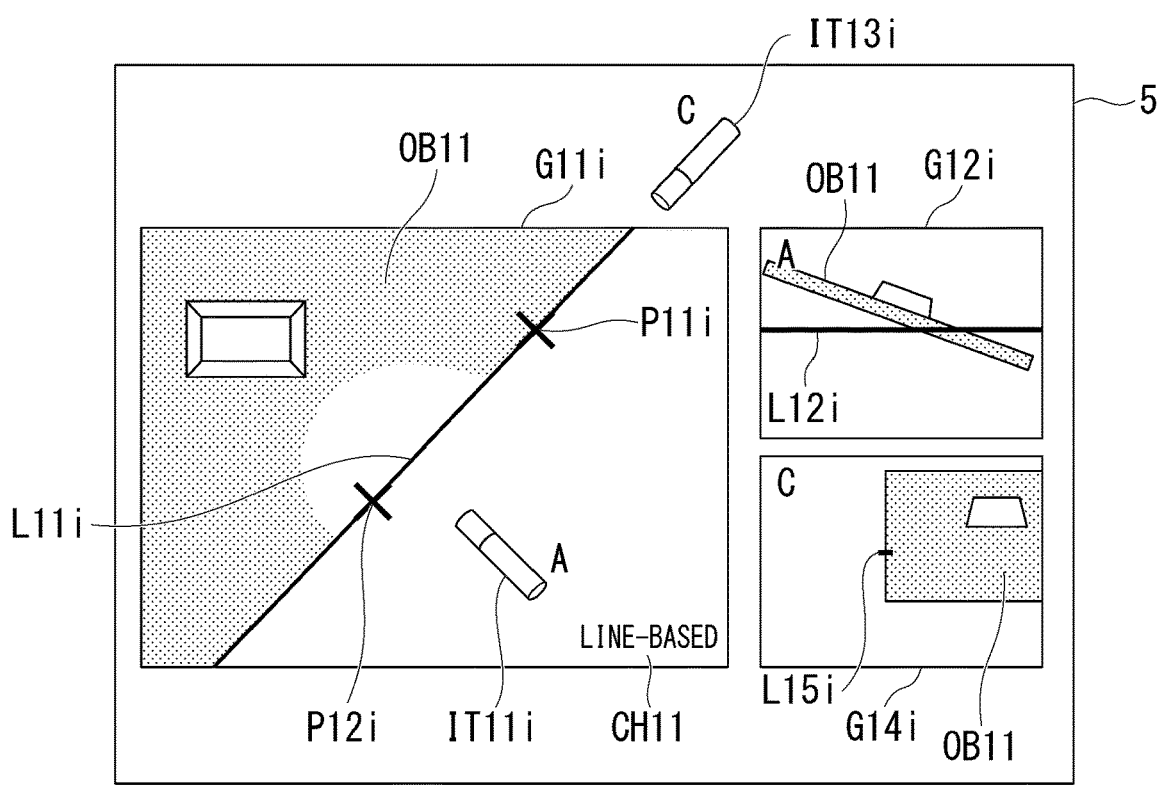
FIG. 27 is a diagram showing an example of an image displayed on the display unit according to the third embodiment of the present invention.

FIG. 27 shows another example of an image displayed on the display unit 5 in Step S152. A 3D image G11*i*, a 3D image G12*i*, a 3D image G14*i*, and an illustration IT13*i* are displayed on the display unit 5. The 3D image G11*i* is a 3D image of a subject OB11 seen in an initial direction from an initial viewpoint. Characters CH11, a first reference point P11*i*, a second reference point P12*i*, a reference line L11*i*, and an illustration IT11*i* are displayed on the 3D image G11*i*. The first reference point P11*i* is set on the edge of the subject OB11. The second reference point P12*i* is set at a position that is not on the subject OB11.

The 3D image G12*i* is a 3D image of the subject OB11 seen in a direction A from a viewpoint A. A reference line L12*i* is displayed on the 3D image G12*i*. The 3D image G14*i* is a 3D image of the subject OB11 seen in a direction C from a viewpoint C. A reference line L15*i* is displayed on the 3D image G14*i*. In the example shown in FIG. 27, the reference line L12*i* does not match the edge of the subject OB11. For this reason, a user can determine that the positions of the two reference points are not valid. In the 3D image G12*i*, it is shown that the subject OB11 is tilted with respect to the reference line L12*i*. In this case, the subject OB11 is long in the vertical direction in the 3D image G14*i*. For this reason, a user can confirm that the positions of the two reference points are not valid.

Figure 28:
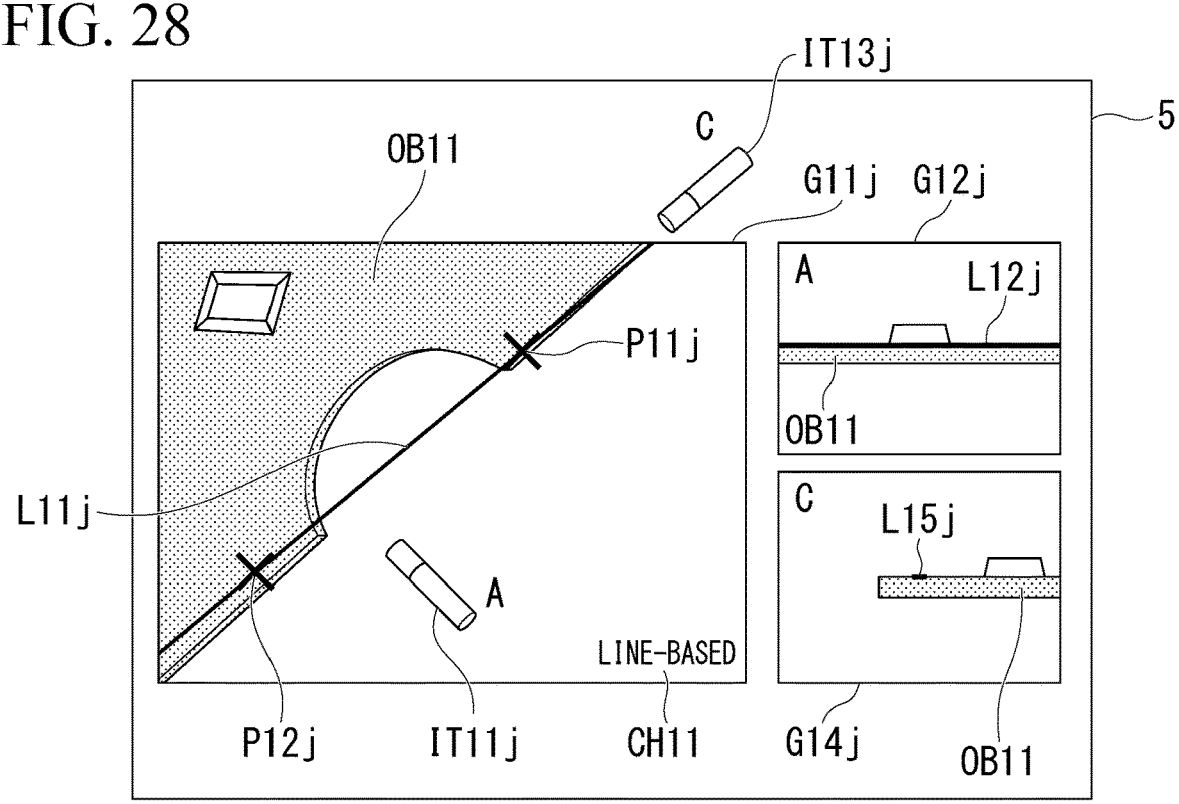
FIG. 28 is a diagram showing an example of an image displayed on the display unit according to the third embodiment of the present invention.

FIG. 28 shows another example of an image displayed on the display unit 5 in Step S152. A 3D image G11*j*, a 3D image G12*j*, a 3D image G14*j*, and an illustration IT13*j* are displayed on the display unit 5. The 3D image G11*j* is a 3D image of a subject OB11 seen in an initial direction from an initial viewpoint. Characters CH11, a first reference point P11*j*, a second reference point P12*j*, a reference line L11*j*, and an illustration IT11*j* are displayed on the 3D image G11*j*. The first reference point P11*j* is set on the edge of the subject OB11. The second reference point P12*j* is set near the edge of the subject OB11.

The 3D image G12*j* is a 3D image of the subject OB11 seen in a direction A from a viewpoint A. A reference line L12*j* is displayed on the 3D image G12*j*. The 3D image G14*j* is a 3D image of the subject OB11 seen in a direction C from a viewpoint C. A reference line L15*j* is displayed on the 3D image G14*j*. The reference line L15*j* does not match the edge of the subject OB11. For this reason, a user can determine that the positions of the two reference points are not valid.

Since the surface of the subject OB11 is tilted in the 3D image G11*j*, the amount of shift between the edge of the subject OB11 and the reference line L11*j* looks smaller than the actual amount of the shift. It is difficult for a user to notice the shift. The subject OB11 seen in the direction in which the reference line extends is seen in the 3D image G14*j*. The subject OB11 extends to the left side of the reference line L15*j*. For this reason, a user can determine that the reference line L15*j* does not match the edge of the subject OB11.

Step S151 may be executed before Step S107*a* is executed. Step S152 may be executed before Step S108 is executed. Step S151 and Step S152 may be executed before Step S107*a* is executed. Step S151 may be executed after Step S108 is executed.

Step S151 may be executed after one of Steps S109 to S111 is executed. Step S152 may be executed after one of Steps S109 to S111 is executed. In a case in which Step S152 is executed after Step S110 or Step S111 is executed, a user can confirm whether or not the positions of the two reference points that have been used for measurement are valid.

Only one of a 3D image of a subject seen in a direction A from a viewpoint A and a 3D image of the subject seen in a direction C from a viewpoint C may be displayed on the display unit 5.

Step S107*a* may be changed to Step S107 shown in FIG. 4. In other words, the viewpoint calculation unit 185 may set the X' axis, the Y' axis, and the Z' axis by using the same method as the method described in the first embodiment. The viewpoint calculation unit 185 may set a direction A to the positive direction of the Y' axis similarly to the first embodiment and set a viewpoint A on the Y' axis similarly to the first embodiment. The viewpoint calculation unit 185 may set a direction C to the positive direction of the X' axis and set a viewpoint C on the X' axis in Step S151.

In the third embodiment, a 3D image of a subject seen in a direction A from a viewpoint A and a 3D image of the subject seen in a direction C from a viewpoint C are displayed on the display unit 5. For this reason, the endoscope device 1 can simplify determination of validity of a point designated on an image of a subject.

Modified Example of Third Embodiment

In the modified example of the third embodiment of the present invention, a 3D image of a subject seen from each of three viewpoints is displayed on the display unit 5.

The viewpoint calculation unit 185 calculates a viewpoint A and a direction A on the basis of a reference line. The method of calculating the viewpoint A and the direction A is the same as the method described in the second embodiment. The image generation unit 186 generates a 3D image of a subject seen in the direction A from the viewpoint A and superimposes the reference line on the 3D image. The display control unit 181 displays the 3D image on which the reference line has been superimposed on the display unit 5.

The viewpoint calculation unit 185 calculates a viewpoint B and a direction B on the basis of the reference line. The method of calculating the viewpoint B and the direction B is the same as the method described in the second embodiment. The image generation unit 186 generates a 3D image of the subject seen in the direction B from the viewpoint B and superimposes the reference line on the 3D image. The display control unit 181 displays the 3D image on which the reference line has been superimposed on the display unit 5.

The viewpoint calculation unit 185 calculates a viewpoint C and a direction C on the basis of the reference line. The method of calculating the viewpoint C and the direction C is the same as the method described in the third embodiment. The image generation unit 186 generates a 3D image of the subject seen in the direction C from the viewpoint C and superimposes the reference line on the 3D image. The display control unit 181 displays the 3D image on which the reference line has been superimposed on the display unit 5.

Figure 29:
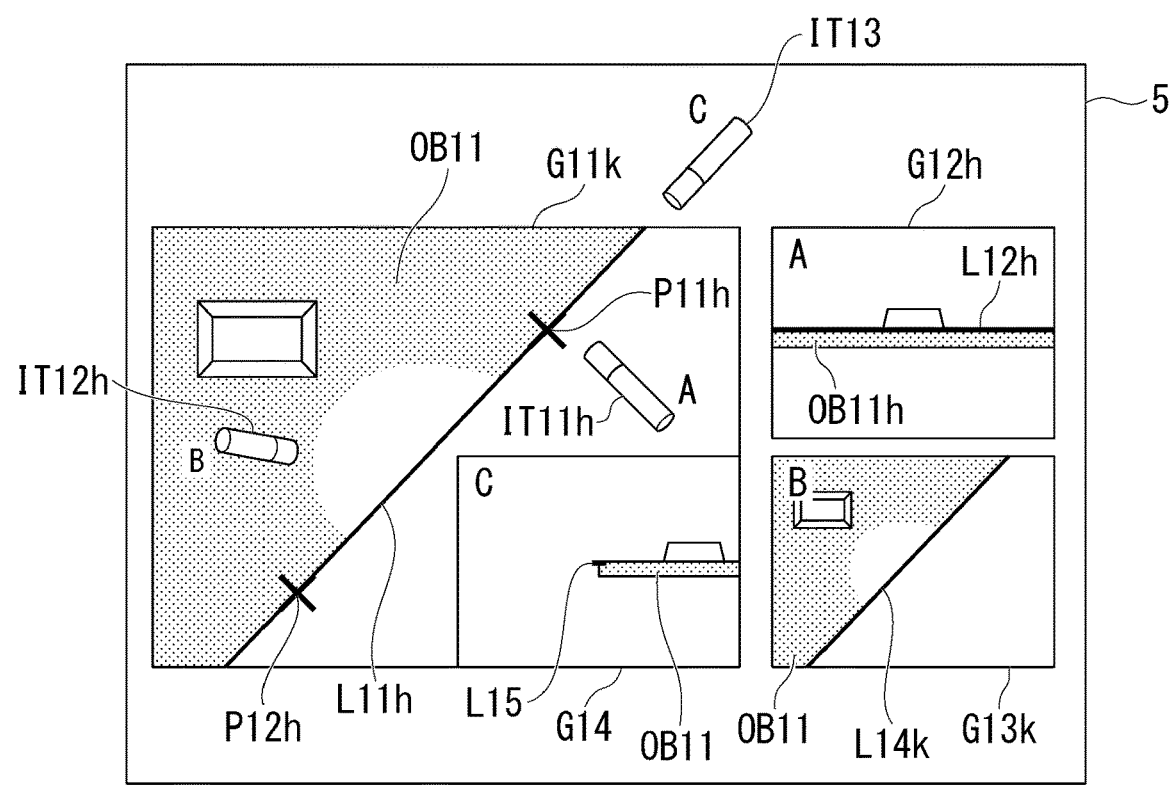
FIG. 29 is a diagram showing an example of an image displayed on a display unit according to a modified example of the third embodiment of the present invention.

FIG. 29 shows an example of an image displayed on the display unit 5. A 3D image G11*k*, a 3D image G12*h*, a 3D image G13*k*, a 3D image G14, and an illustration IT13 are displayed on the display unit 5. The 3D image G11*k* is a 3D image of a subject OB11 seen in an initial direction from an initial viewpoint. A first reference point P11h, a second reference point P12h, a reference line L11h, an illustration IT11h, and an illustration IT12h are displayed on the 3D image G11h. The 3D image G12h is the same as the 3D image G12h shown in FIG. 26. The 3D image G13k is a 3D image of the subject OB11 seen in a direction B from a viewpoint B. A reference line L14k is displayed on the 3D image G13k. The 3D image G14 is the same as the 3D image G14 shown in FIG. 26. The 3D image G14 is displayed on the 3D image G11k.

The 3D image G12h, the 3D image G13k, and the 3D image G14 may be displayed by using a third angle projection method or a first angle projection method. In a case in which a user is used to a machine drawing, it is easy for a user to instinctively understand a drawing. The 3D image G12h, the 3D image G13k, and the 3D image G14 may be displayed by using parallel projection. In a case in which a 3D image is displayed by using parallel projection, it is easy for a user to compare the 3D image with a machine drawing.

A user determines whether or not the reference line is set on the edge of the subject OB11 on the basis of the 3D image G12h, the 3D image G13k, and the 3D image G14. In this way, a user can confirm whether or not the positions of the two reference points are valid in detail. In the example shown in FIG. 29, the reference line L12h matches the edge of the subject OB11, the reference line L14k matches the edge of the subject OB11, and the reference line L15 matches the edge of the subject OB11. For this reason, a user can confirm that the positions of the two reference points are valid.

It may be possible for a user to simultaneously change viewpoints of three 3D images. For example, when a user changes a viewpoint of one 3D image, a viewpoint of each of the other two 3D images is changed. For example, the display unit 5 is a touch panel. A user can change a position of a viewpoint and a direction of a visual line through the swipe operation.

When a direction A and a viewpoint A that are based on a subject are changed, the image generation unit 186 further generates a second image again on the basis of the changed direction A and the changed viewpoint A. When the viewpoint A that is based on the subject is changed, a viewpoint B (viewpoint C) that is based on the subject is changed such that the relative relationship between the viewpoint A and the viewpoint B (viewpoint C) is maintained. When the direction A that is based on the subject is changed, a direction B (direction C) that is based on the subject is changed such that the relative relationship between the direction A and the direction B (direction C) is maintained. The image generation unit 186 further generates a fourth image again on the basis of the changed direction B (direction C) and the changed viewpoint B (viewpoint C). The display control unit 181 further displays the second image generated again and the fourth image generated again on the display unit 5.

For example, a user performs the swipe operation on the 3D image G12h. The coordinate calculation unit 183 changes each of all three-dimensional coordinates on the surface of a subject on the basis of the swipe operation. The X' axis, the Y' axis, and the Z' axis are not changed. The viewpoint A, the viewpoint B, and the viewpoint C in the coordinate system defined by the X' axis, the Y' axis, and the Z' axis are not changed. The relative relationship between these viewpoints is maintained. The distance between arbitrary two points among these viewpoints is not changed. The direction A, the direction B, and the direction C in the coordinate system defined by the X' axis, the Y' axis, and the Z' axis are not changed. The relative relationship between these directions is maintained. The angle between arbitrary two directions among these directions is not changed.

In the three-dimensional space defined by the X' axis, the Y' axis, and the Z' axis, the subject rotates on the basis of the swipe operation. The image generation unit 186 generates a 3D image of the subject seen in the direction A from the viewpoint A and superimposes the reference line on the 3D image. The display control unit 181 displays the 3D image on which the reference line has been superimposed on the display unit 5. In this way, the 3D image G12h is changed.

The image generation unit 186 generates a 3D image of the subject seen in the direction B from the viewpoint B and superimposes the reference line on the 3D image. The display control unit 181 displays the 3D image on which the reference line has been superimposed on the display unit 5. In this way, the 3D image G13k is changed. The image generation unit 186 generates a 3D image of the subject seen in the direction C from the viewpoint C and superimposes the reference line on the 3D image. The display control unit 181 displays the 3D image on which the reference line has been superimposed on the display unit 5. In this way, the 3D image G14 is changed.

When the subject rotates, the position of each viewpoint seen from each position on the subject is changed. For this reason, the position of each viewpoint that is based on the subject is changed. When the subject rotates, the angle when each viewpoint is seen from each position on the subject is changed. For this reason, each direction that is based on the subject is changed.

Coordinates of each of the viewpoint A, the viewpoint B, and the viewpoint C may be changed without rotating the subject. Coordinates of each viewpoint are changed such that the relative relationship between the respective coordinates is maintained. Each direction may be changed following the change of each viewpoint. Each direction is changed such that the relative relationship between the respective directions is maintained.

When a direction B (direction C) and a viewpoint B (viewpoint C) that are based on a subject are changed, the image generation unit 186 may further generate a fourth image again on the basis of the changed direction B (direction C) and the changed viewpoint B (viewpoint C). When the viewpoint B (viewpoint C) that is based on the subject is changed, a viewpoint A that is based on the subject is changed such that the relative relationship between the viewpoint A and the viewpoint B (viewpoint C) is maintained. When the direction B (direction C) that is based on the subject is changed, a direction A that is based on the subject is changed such that the relative relationship between the direction A and the direction B (direction C) is maintained. The image generation unit 186 further generates a second image again on the basis of the changed direction A and the changed viewpoint A. The display control unit 181 further displays the second image generated again and the fourth image generated again on the display unit 5.

For example, a user performs the swipe operation on the 3D image G13k. The coordinate calculation unit 183 changes each of all three-dimensional coordinates on the surface of a subject on the basis of the swipe operation. In the three-dimensional space defined by the X' axis, the Y' axis, and the Z' axis, the subject rotates on the basis of the swipe operation. The image generation unit 186 generates a 3D image of the subject seen in the direction B from the viewpoint B and superimposes the reference line on the 3D image. The display control unit 181 displays the 3D image on which the reference line has been superimposed on the display unit 5. In this way, the 3D image G13*k* is changed.

The image generation unit 186 generates a 3D image of the subject seen in the direction A from the viewpoint A and superimposes the reference line on the 3D image. The display control unit 181 displays the 3D image on which the reference line has been superimposed on the display unit 5. In this way, the 3D image G12*h* is changed. The image generation unit 186 generates a 3D image of the subject seen in the direction C from the viewpoint C and superimposes the reference line on the 3D image. The display control unit 181 displays the 3D image on which the reference line has been superimposed on the display unit 5. In this way, the 3D image G14 is changed.

A 3D image of a subject seen from each viewpoint is changed with the relative relationship between the viewpoint A, the viewpoint B, and the viewpoint C being maintained. A user can confirm whether or not the positions of the two reference points are valid on the basis of images of a subject seen in various directions.

Fourth Embodiment

A fourth embodiment of the present invention will be described. Two three-dimensional images for confirmation of positions of two reference points are displayed on the display unit 5. One three-dimensional image is a third image of a subject seen in a second direction from a second viewpoint. The other three-dimensional image is a fourth image of a subject seen in a third direction from a third viewpoint.

In the fourth embodiment, a reference figure is a straight line (reference line). The second direction and the second viewpoint are set on the basis of a first straight line axis. The third direction and the third viewpoint are set on the basis of a second straight line axis. The first straight line axis and the second straight line axis are perpendicular to the reference figure. Similarly to the first embodiment, the second viewpoint is a viewpoint A, the second direction is a direction A, and the first straight line axis is a Y' axis.

Figure 30:
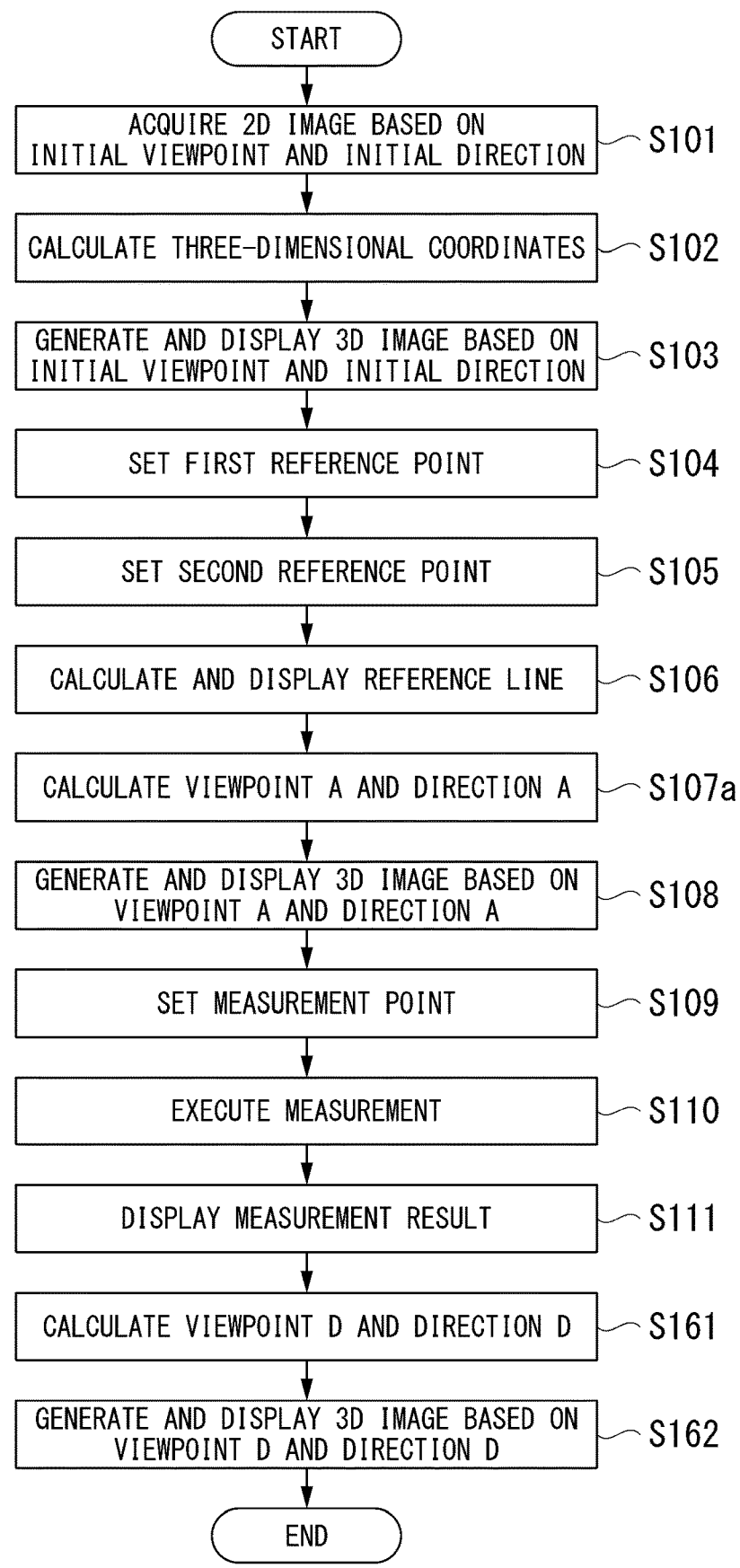
FIG. 30 is a flow chart showing a procedure of three-dimensional measurement in a fourth embodiment of the present invention.

Three-dimensional measurement in the fourth embodiment will be described by using FIG. 30. FIG. 30 shows a procedure of the three-dimensional measurement. The same processing as the processing shown in FIG. 21 will not be described.

After Step S111, the viewpoint calculation unit 185 calculates a viewpoint D (third viewpoint) and a direction D (third direction) on the basis of the reference line (Step S161). Step S161 corresponds to the viewpoint calculation step. The viewpoint calculation unit 185 calculates the viewpoint D and the direction D in Step S161 by using the method described below.

The viewpoint calculation unit 185 sets a Z" axis (second straight line axis) that extends in a direction perpendicular to the reference line and a measurement line. The measurement line is a line segment joining two endpoints. One of the two endpoints is a measurement point. The other of the two endpoints is a point on the reference line. The Z" axis passes through a camera position.

When a Z axis rotates around an X axis by a first rotation amount and the Z axis rotates around a Y axis by a second rotation amount, the Z axis matches the Z" axis. The viewpoint calculation unit 185 calculates the first rotation amount and the second rotation amount. The X axis, the Y axis, and the Z axis are coordinate axes that define an initial viewpoint and an initial direction. For example, the Z axis extends in the optical axis direction of the optical system of the endoscope device 1. The X axis extends in a direction perpendicular to the optical axis direction and the Y axis extends in another direction perpendicular to the optical axis direction.

The viewpoint calculation unit 185 obtains an X" axis by rotating the X axis around the Y axis by the second rotation amount. The viewpoint calculation unit 185 obtains a Y" axis by rotating the Y axis around the X axis by the first rotation amount. In this way, the X" axis similar to the X axis is obtained and the Y" axis similar to the Y axis is obtained. It is easy for a user to understand the viewpoint D and the direction D. The viewpoint calculation unit 185 sets the positive direction of the X" axis similarly to the positive direction of the X axis. The viewpoint calculation unit 185 sets the positive direction of the Y" axis similarly to the positive direction of the Y axis. The viewpoint calculation unit 185 sets the positive direction of the Z" axis similarly to the positive direction of the Z axis.

The viewpoint calculation unit 185 sets the direction D to the positive direction of the Z" axis. The viewpoint calculation unit 185 calculates the viewpoint D such that the subject falls within the visual field when the subject is seen in the direction D. Specifically, the viewpoint calculation unit 185 calculates a position at which the visual line proceeding in the direction D from the viewpoint D passes through. For example, the Y" coordinate of the viewpoint D is 0. The X" coordinate of the viewpoint D is the average of the X" coordinate of a first reference point, the X" coordinate of a second reference point, and the X" coordinate of a third reference point. The Z" coordinate of the viewpoint D is a position at which the entire subject falls within the visual field. The Z" coordinate of the viewpoint D may be a position for which at least the first reference point, the second reference point, and the third reference point fall within the visual field.

After Step S161, the image generation unit 186 generates a three-dimensional image (3D image) of the subject seen in the direction D from the viewpoint D on the basis of the three-dimensional coordinates calculated in Step S102. At this time, the image generation unit 186 generates image data for displaying the 3D image by using perspective projection. The image generation unit 186 superimposes the reference line and the measurement line on the 3D image. The display control unit 181 displays the 3D image on which the reference line and the measurement line are superimposed on the display unit 5 (Step S162). The 3D image (fourth image) displayed in Step S162 represents a state of the subject seen in the direction D from the viewpoint D. Step S162 corresponds to the image generation step and the second display step. When Step S162 is executed, the three-dimensional measurement is completed.

Figure 31:
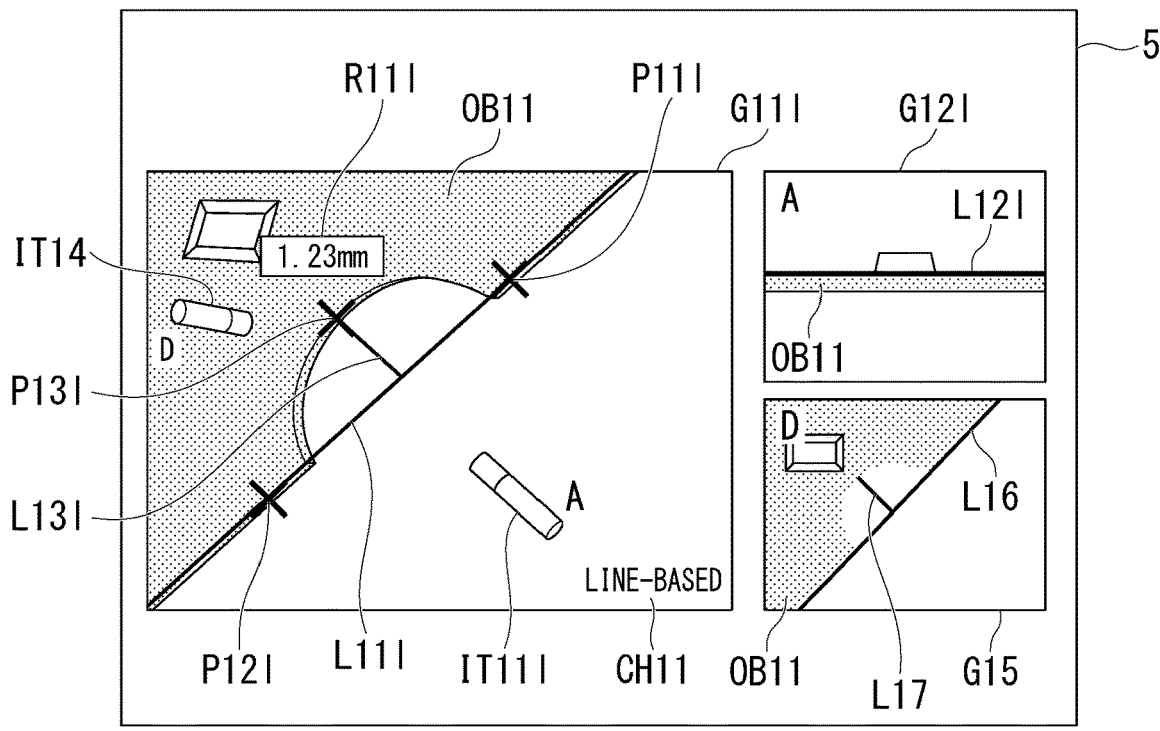
FIG. 31 is a diagram showing an example of an image displayed on a display unit according to the fourth embodiment of the present invention.

FIG. 31 shows an example of an image displayed on the display unit 5 in Step S162. A 3D image G111, a 3D image G121, and a 3D image G15 are displayed on the display unit 5. The display control unit 181 displays the 3D image G15 on the display unit 5 in Step S162 such that the 3D image G15 does not overlap any of the 3D image G111 and the 3D image G121.

The 3D image G111 is a 3D image of a subject OB11 seen in an initial direction from an initial viewpoint. Characters CH11, a first reference point P111, a second reference point P121, a reference line L111, an illustration IT111, and an illustration IT141 are displayed on the 3D image G111. Moreover, a measurement point P131, a measurement line L131, and a measurement result R111 are displayed on the 3D image G111. The 3D image G121 is a 3D image of the subject OB11 seen in a direction A from a viewpoint A. A reference line L121 is displayed on the 3D image G121.

The 3D image G15 is a 3D image of the subject OB11 seen in a direction D from a viewpoint D. A reference line L16 and a measurement line L17 are displayed on the 3D image G15. The reference line L16 represents a reference line seen in the direction D from the viewpoint D. The measurement line L17 represents a measurement line seen in the direction D from the viewpoint D. The subject OB11 seen in the direction perpendicular to the reference line and the measurement line is seen in the 3D image G15. The direction D is considered to be a direction for which a user confirms the position of the measurement line most easily.

A user determines whether or not the measurement point is set at the deepest point of a chipped portion of the subject OB11 on the basis of the 3D image G15. In this way, a user can confirm whether or not the position of the measurement point is valid. In the example shown in FIG. 31, the endpoint of the measurement line L17 matches the deepest point of the chipped portion of the subject OB11. For this reason, a user can confirm that the position of the measurement point is valid. An operation for designating a position of a viewpoint and a direction of a visual line is unnecessary.

The display control unit 181 displays the illustration IT14 of the tip end 20 of the insertion unit 2 on the display unit 5 in Step S162. Step S162 corresponds to the third display step. The illustration IT14 represents the tip end 20 of the insertion unit 2 disposed at the viewpoint D and facing in the direction D. Since the illustration IT14 is displayed, a user can confirm the viewpoint D and the direction D.

When the 3D image G121 and the 3D image G15 are displayed on the display unit 5, the display control unit 181 may hide the 3D image G111. In this way, the display control unit 181 can display the 3D image G121 and the 3D image G15 large. The display control unit 181 may switch between a first state and a second state on the basis of an instruction from a user. In the first state, only the 3D image G111 is displayed on the display unit 5. In the second state, only the 3D image G121 and the 3D image G15 are displayed on the display unit 5. After a user finishes confirmation of the positions of the two reference points and the position of the measurement point, the user may cause the 3D image G111, the 3D image G121, and the 3D image G15 to be displayed by performing a predetermined operation. The display control unit 181 may display the 3D image G15 on the display unit 5 such that at least part of the 3D image G15 overlaps at least one of the 3D image G111 and the 3D image G121.

Step S161 may be executed before Step S110 or Step S111 is executed. Step S162 may be executed before Step S110 or Step S111 is executed.

Step S107a may be changed to Step S107 shown in FIG. 4. In other words, the viewpoint calculation unit 185 may set the X' axis, the Y' axis, and the Z' axis by using the same method as the method described in the first embodiment. The viewpoint calculation unit 185 may set a direction A to the positive direction of the Y' axis similarly to the first embodiment and set a viewpoint A on the Y' axis similarly to the first embodiment.

The viewpoint D and the direction D may be changed as follows. The direction D may be parallel to the reference line. Since the measurement line is perpendicular to the reference line, the direction D is perpendicular to the measurement line. For example, the viewpoint D is set on a straight line that passes through the center of the measurement line and extends in the direction D.

In Step S107a, the X' axis, the Y' axis, and the Z' axis are set. For example, the viewpoint calculation unit 185 sets the direction D to the positive direction of the X' axis. The viewpoint calculation unit 185 sets the viewpoint D on an axis that is parallel to the X' axis and passes through the middle point of the measurement line.

Figure 32:
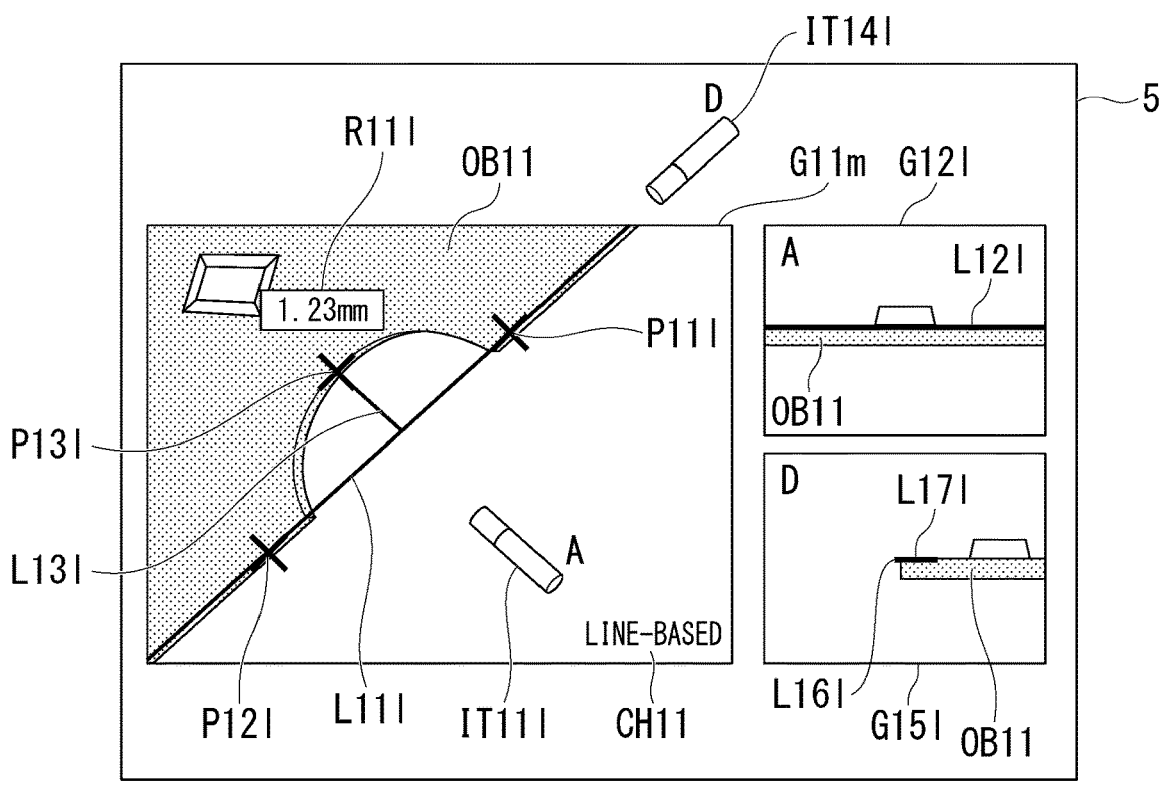
FIG. 32 is a diagram showing an example of an image displayed on the display unit according to the fourth embodiment of the present invention.

FIG. 32 shows an example of an image displayed on the display unit 5 in Step S162. A 3D image G11m, a 3D image G121, and a 3D image G151 are displayed on the display unit 5. The 3D image G11m is a 3D image of a subject OB11 seen in an initial direction from an initial viewpoint. Characters CH11, a first reference point P111, a second reference point P121, a measurement point P131, a reference line L111, a measurement line L131, a measurement result R111, and an illustration IT111 are displayed on the 3D image G11m. An illustration IT141 is displayed on the display unit 5. The 3D image G121 is the same as the 3D image G121 shown in FIG. 31.

The 3D image G151 is a three-dimensional image of the subject OB11 seen in a direction D from a viewpoint D. A reference line L161 and a measurement line L171 are displayed on the 3D image G151. The reference line L161 and the measurement line L171 are integrated.

In the fourth embodiment, a 3D image of a subject seen in a direction A from a viewpoint A and a 3D image of the subject seen in a direction D from a viewpoint D are displayed on the display unit 5. For this reason, the endoscope device 1 can simplify determination of validity of a point designated on an image of a subject.

Fifth Embodiment

A fifth embodiment of the present invention will be described. The operation unit 4 accepts input of at least three reference points. A reference figure is a plane. A second direction is parallel to a straight line axis. The straight line axis is parallel to the reference figure. A second viewpoint is on the straight line axis.

The endoscope device 1 according to the fifth embodiment has a plane-based measurement function. Three reference points and one measurement point are designated by a user. Each of the three reference points represents a reference position for calculating a reference plane in plane-based measurement. The measurement point represents a position for measuring the size of a subject.

The reference figure calculation unit 184 calculates a reference figure on the basis of three-dimensional coordinates of three reference points. A reference plane is the reference figure in the fifth embodiment. The reference plane is a plane on the three-dimensional space and passes through points each having the three-dimensional coordinates of each of the three reference points.

The measurement unit 187 executes three-dimensional measurement of a subject by using a reference plane in the fifth embodiment. Specifically, the measurement unit 187 calculates the three-dimensional distance between a three-dimensional reference plane and a point having three-dimensional coordinates of a measurement point.

Figure 33:
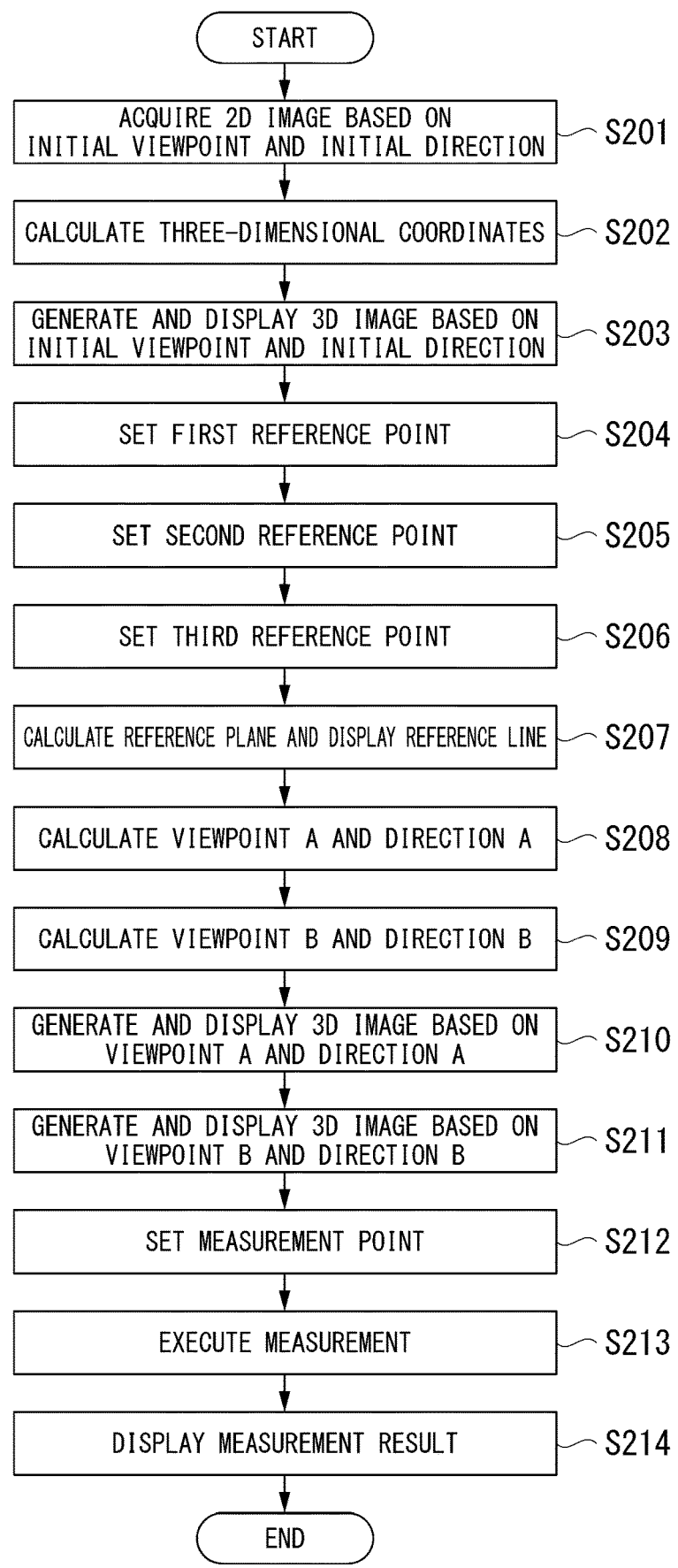
FIG. 33 is a flow chart showing a procedure of three-dimensional measurement in a fifth embodiment of the present invention.

Three-dimensional measurement in the fifth embodiment will be described by using FIG. 33. FIG. 33 shows a procedure of the three-dimensional measurement.

The imaging device 28 acquires a 2D image of a subject by imaging the subject and generating an imaging signal. The acquired 2D image (first image) is a two-dimensional image of the subject seen in an initial direction from an initial viewpoint. The CPU 18 acquires the 2D image of the subject from the CCU 9 through the video signal processing circuit 12 (Step S201). Step S201 corresponds to the image acquisition step.

After Step S201, the coordinate calculation unit 183 calculates three-dimensional coordinates of all pixels in the 2D image (Step S202). Step S202 corresponds to the coordinate calculation step.

After Step S202, the image generation unit 186 generates a three-dimensional image (3D image) of the subject seen in the initial direction from the initial viewpoint on the basis of the three-dimensional coordinates calculated in Step S202. The display control unit 181 displays the 3D image (second image) on the display unit 5 (Step S203). Step S203 corresponds to the first display step.

After Step S203, the point setting unit 182 determines the position designated by a user as a reference point on the basis of the operation result of the operation unit 4 and sets a first reference point at the position. The display control unit 181 displays the first reference point on the 3D image displayed in Step S203 (Step S204).

After Step S204, the point setting unit 182 determines the position designated by a user as a reference point on the basis of the operation result of the operation unit 4 and sets a second reference point at the position. The display control unit 181 displays the second reference point on the 3D image displayed in Step S203 (Step S205).

After Step S205, the point setting unit 182 determines the position designated by a user as a reference point on the basis of the operation result of the operation unit 4 and sets a third reference point at the position. The display control unit 181 displays the third reference point on the 3D image displayed in Step S203 (Step S206). Step S204, Step S205, and Step S206 correspond to the input step.

After Step S206, the reference figure calculation unit 184 calculates a reference plane that passes through a point having three-dimensional coordinates of the first reference point, a point having three-dimensional coordinates of the second reference point, and a point having three-dimensional coordinates of the third reference point. The reference figure calculation unit 184 calculates three reference lines. One of the three reference lines joins a point having the three-dimensional coordinates of the first reference point and a point having the three-dimensional coordinates of the second reference point. Another one of the three reference lines joins a point having the three-dimensional coordinates of the second reference point and a point having the three-dimensional coordinates of the third reference point. The other one of the three reference lines joins a point having the three-dimensional coordinates of the third reference point and a point having the three-dimensional coordinates of the first reference point. The display control unit 181 displays the three reference lines on the 3D image displayed in Step S203 (Step S207). Step S207 corresponds to the reference figure calculation step.

Figure 34:
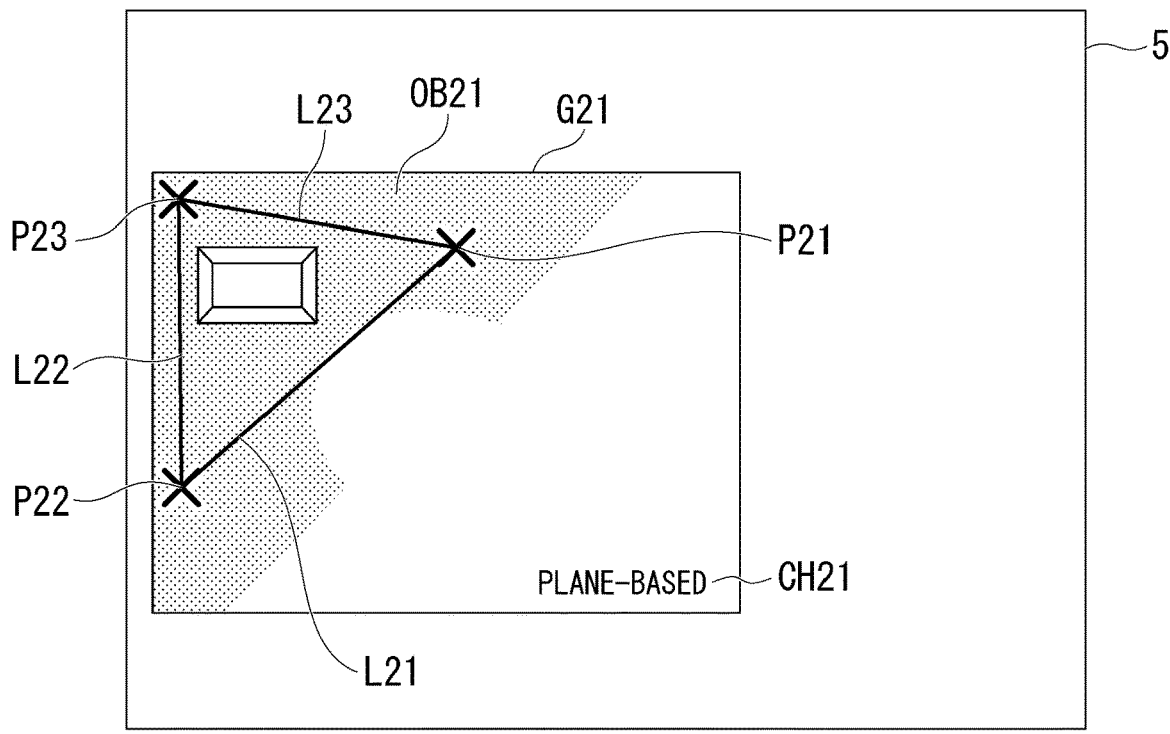
FIG. 34 is a diagram showing an example of an image displayed on a display unit according to the fifth embodiment of the present invention.

FIG. 34 shows an example of an image displayed on the display unit 5 in Step S207. A 3D image G21 is displayed on the display unit 5. The 3D image G21 is a 3D image of a subject OB21 seen in an initial direction from an initial viewpoint. Characters CH21 that represent a measurement mode is displayed on the 3D image G21. The characters CH21 represent that the measurement mode is the plane-based measurement. A first reference point P21, a second reference point P22, and a third reference point P23 are displayed on the 3D image G21. Each reference point is displayed as a mark that represents the position of the reference point. A reference line L21, a reference line L22, and a reference line L23 are displayed on the 3D image G21. The reference line L21 joins the first reference point P21 and the second reference point P22. The reference line L22 joins the second reference point P22 and the third reference point P23. The reference line L23 joins the third reference point P23 and the first reference point P21.

After Step S207, the viewpoint calculation unit 185 calculates a viewpoint A (second viewpoint) and a direction A (second direction) on the basis of the reference plane (Step S208). Step S208 corresponds to the viewpoint calculation step. The viewpoint calculation unit 185 calculates the viewpoint A and the direction A in Step S208 by using the method described below.

The viewpoint calculation unit 185 sets a Z' axis perpendicular to the reference plane. The Z' axis passes through a camera position. When a Z axis rotates around an X axis by a first rotation amount and the Z axis rotates around a Y axis by a second rotation amount, the Z axis matches the Z' axis. The viewpoint calculation unit 185 calculates the first rotation amount and the second rotation amount. The X axis, the Y axis, and the Z axis are coordinate axes that define an initial viewpoint and an initial direction. For example, the Z axis extends in the optical axis direction of the optical system of the endoscope device 1. The X axis extends in a direction perpendicular to the optical axis direction and the Y axis extends in another direction perpendicular to the optical axis direction.

The viewpoint calculation unit 185 obtains an X' axis by rotating the X axis around the Y axis by the second rotation amount. The viewpoint calculation unit 185 obtains a Y' axis by rotating the Y axis around the X axis by the first rotation amount. In this way, the X' axis similar to the X axis is obtained and the Y' axis similar to the Y axis is obtained. It is easy for a user to understand the viewpoint A and the direction A.

Since the X axis, the Y axis, and the Z axis are orthogonal to each other, the X' axis, the Y' axis, and the Z' axis are orthogonal to each other. The Z' axis is perpendicular to the reference plane. The viewpoint calculation unit 185 moves the X' axis obtained by rotating the X axis in a direction parallel to the Z' axis. The viewpoint calculation unit 185 sets the X' axis on the reference plane. The viewpoint calculation unit 185 moves the Y' axis obtained by rotating the Y axis in a direction parallel to the Z' axis. The viewpoint calculation unit 185 sets the positive direction of the X' axis similarly to the positive direction of the X axis. The viewpoint calculation unit 185 sets the Y' axis on the reference plane. The viewpoint calculation unit 185 sets the positive direction of the Y' axis similarly to the positive direction of the Y axis. The viewpoint calculation unit 185 sets the positive direction of the Z' axis similarly to the positive direction of the Z axis.

The viewpoint calculation unit 185 sets the direction A to the positive direction of the Y' axis. The viewpoint calculation unit 185 calculates the viewpoint A such that the subject OB21 falls within the visual field when the subject OB21 is seen in the direction A. For example, the Z' coordinate of the viewpoint A is 0. The X' coordinate of the viewpoint A is the average of the X' coordinate of the first reference point P21, the X' coordinate of the second reference point P22, and the X' coordinate of the third reference point P23. The Y' coordinate of the viewpoint A is a position at which the entire subject OB21 falls within the visual field. The Y' coordinate of the viewpoint A may be a position for which at least the first reference point P21, the second reference point P22, and the third reference point P23 fall within the visual field.

The direction A may not be parallel to the reference plane. The direction A may be slightly tilted away from the direction parallel to the reference plane. For example, the direction A may be slightly tilted away from the direction parallel to the reference plane by 5 degrees. In this way, a user can obtain three-dimensional sense.

After Step S208, the viewpoint calculation unit 185 calculates a viewpoint B (third viewpoint) and a direction B (third direction) on the basis of the reference plane (Step S209). Step S209 corresponds to the viewpoint calculation step. The viewpoint calculation unit 185 calculates the viewpoint B and the direction B in Step S209 by using the method described below.

In Step S208, the X' axis, the Y' axis, and the Z' axis are set. The viewpoint calculation unit 185 sets the direction B to the positive direction of the X' axis. The direction B is perpendicular to the direction A. The viewpoint calculation unit 185 calculates the viewpoint B such that the subject OB21 falls within the visual field when the subject OB21 is seen in the direction B. For example, the Z' coordinate of the viewpoint B is 0. The Y' coordinate of the viewpoint B is the average of the Y' coordinate of the first reference point P21, the Y' coordinate of the second reference point P22, and the Y' coordinate of the third reference point P23. The X' coordinate of the viewpoint B is a position at which the entire subject OB21 falls within the visual field. The X' coordinate of the viewpoint B may be a position for which at least the first reference point P21, the second reference point P22, and the third reference point P23 fall within the visual field.

The direction B may not be parallel to the reference plane. The direction B may be slightly tilted away from the direction parallel to the reference plane. For example, the direction B may be slightly tilted away from the direction parallel to the reference plane by 5 degrees. In this way, a user can obtain three-dimensional sense.

After Step S209, the image generation unit 186 generates a three-dimensional image (3D image) of the subject seen in the direction A from the viewpoint A on the basis of the three-dimensional coordinates calculated in Step S202. At this time, the image generation unit 186 generates image data for displaying the 3D image by using perspective projection. The image generation unit 186 superimposes the reference plane on the 3D image. The three reference lines calculated in Step S207 are on the reference plane. For example, the image generation unit 186 superimposes the reference plane on the 3D image by superimposing the three reference lines on the 3D image. The display control unit 181 displays the 3D image on which the reference plane has been superimposed on the display unit 5 (Step S210). The 3D image (third image) displayed in Step S210 represents a state of the subject seen in the direction A from the viewpoint A. Step S210 corresponds to the image generation step and the second display step.

After Step S210, the image generation unit 186 generates a three-dimensional image (3D image) of the subject seen in the direction B from the viewpoint B on the basis of the three-dimensional coordinates calculated in Step S202. At this time, the image generation unit 186 generates image data for displaying the 3D image by using perspective projection. The image generation unit 186 superimposes the reference plane on the 3D image. For example, the image generation unit 186 superimposes the reference plane on the 3D image by superimposing the three reference lines calculated in Step S207 on the 3D image. The display control unit 181 displays the 3D image on which the reference plane has been superimposed on the display unit 5 (Step S211). The 3D image (fourth image) displayed in Step S211 represents a state of the subject seen in the direction B from the viewpoint B. Step S211 corresponds to the image generation step and the second display step.

Figure 35:
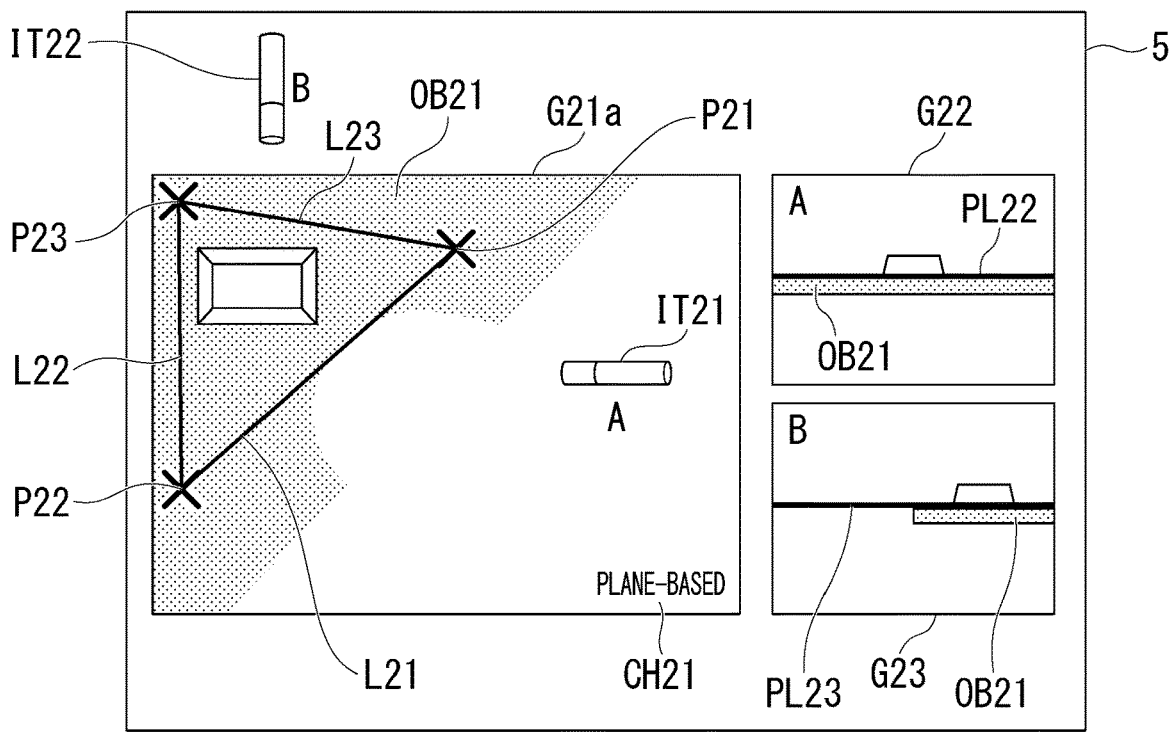
FIG. 35 is a diagram showing an example of an image displayed on the display unit according to the fifth embodiment of the present invention.

FIG. 35 shows an example of an image displayed on the display unit 5 in Step S210 and Step S211. A 3D image G21a, a 3D image G22, a 3D image G23, and an illustration IT22 are displayed on the display unit 5. The display control unit 181 displays the 3D image G22 on the display unit 5 in Step S210 such that the 3D image G22 does not overlap the 3D image G21a. The display control unit 181 displays the 3D image G23 on the display unit 5 in Step S211 such that the 3D image G23 does not overlap any of the 3D image G21a and the 3D image G22.

The 3D image G21a is a 3D image of a subject OB21 seen in an initial direction from an initial viewpoint. Characters CH21, a first reference point P21, a second reference point P22, a third reference point P23, a reference line L21, a reference line L22, a reference line L23, and an illustration IT21 are displayed on the 3D image G21a. The 3D image G22 is a 3D image of the subject OB21 seen in a direction A from a viewpoint A. A reference plane PL22 is displayed on the 3D image G22. The reference plane PL22 represents a reference plane seen in the direction A from the viewpoint A. When the reference plane is seen in the direction parallel to the reference plane, the reference plane looks to be a straight line. The edge of the subject OB21 seen in the direction parallel to the surface of the subject OB21 is seen in the 3D image G22.

The 3D image G23 is a 3D image of the subject OB21 seen in a direction B from a viewpoint B. A reference plane PL23 is displayed on the 3D image G23. The reference plane PL23 represents a reference plane seen in the direction B from the viewpoint B. The edge of the subject OB21 seen in the direction parallel to the surface of the subject OB21 is seen in the 3D image G23.

A user determines whether or not the reference plane is set on the edge of the subject OB21 on the basis of the 3D image G22 and the 3D image G23. In a case in which the reference plane is set on the edge of the subject OB21, the reference plane approximates the surface of the subject OB21 at high precision. In this way, a user can confirm whether or not the positions of the three reference points are valid. In the example shown in FIG. 35, the reference plane PL22 and the reference plane PL23 match the edge of the subject OB21. For this reason, a user can confirm that the positions of the three reference points are valid. An operation for designating a position of a viewpoint and a direction of a visual line is unnecessary.

The display control unit 181 displays information that represents the viewpoint A and the direction A and information that represents the viewpoint B and the direction B on the display unit 5. Specifically, the display control unit 181 displays the illustration IT21 of the tip end 20 of the insertion unit 2 on the display unit 5 in Step S210 and displays the illustration IT22 of the tip end 20 of the insertion unit 2 on the display unit 5 in Step S211. The illustration IT21 is displayed on the 3D image G21a. The illustration IT21 represents the tip end 20 of the insertion unit 2 disposed at the viewpoint A and facing in the direction A. Since the illustration IT21 is displayed, a user can confirm the viewpoint A and the direction A. The illustration IT22 represents the tip end 20 of the insertion unit 2 disposed at the viewpoint B and facing in the direction B. Since the illustration IT22 is displayed, a user can confirm the viewpoint B and the direction B.

When the 3D image G22 and the 3D image G23 are displayed on the display unit 5, the display control unit 181 may hide the 3D image G21a. In this way, the display control unit 181 can display the 3D image G22 and the 3D image G23 large. The display control unit 181 may switch between a first state and a second state on the basis of an instruction from a user. In the first state, only the 3D image G21a is displayed on the display unit 5. In the second state, only the 3D image G22 and the 3D image G23 are displayed on the display unit 5. After a user finishes confirmation of the positions of the three reference points, the user may cause the 3D image G21a, the 3D image G22, and the 3D image G23 to be displayed by performing a predetermined operation.

The display control unit 181 may display the 3D image G22 on the display unit 5 such that at least part of the 3D image G22 overlaps the 3D image G21a. The display control unit 181 may display the 3D image G23 on the display unit 5 such that at least part of the 3D image G23 overlaps at least one of the 3D image G21a and the 3D image G22.

Figure 36:
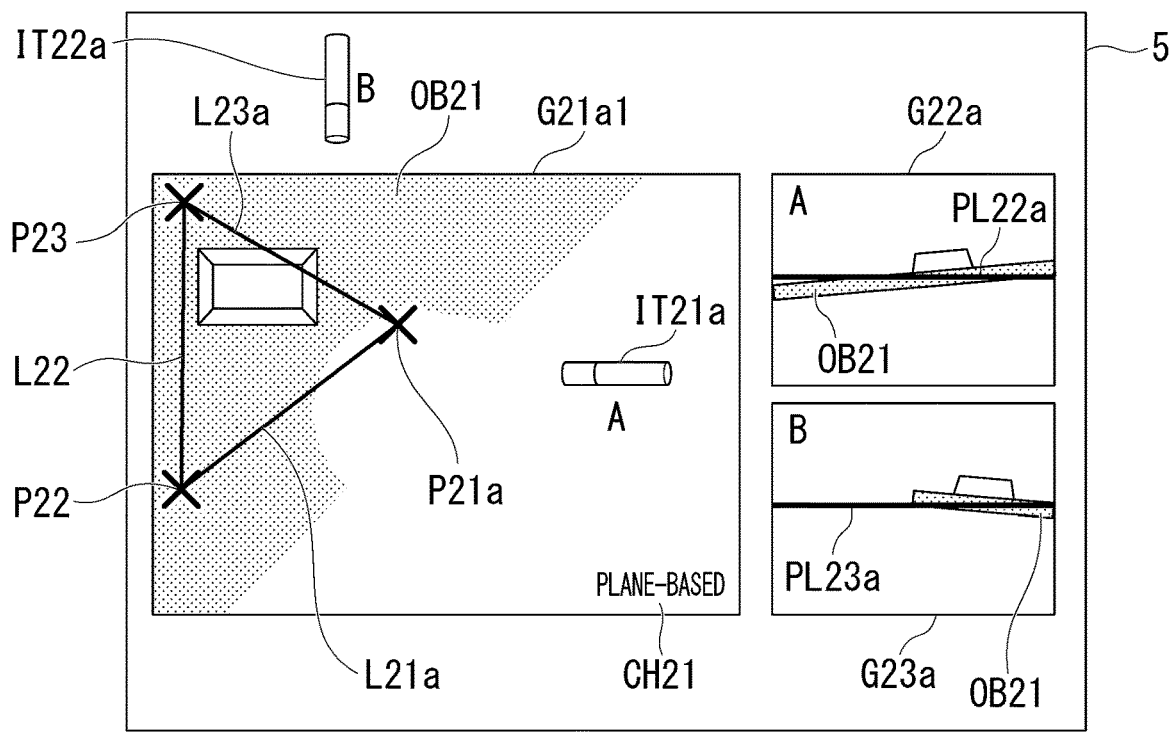
FIG. 36 is a diagram showing an example of an image displayed on the display unit according to the fifth embodiment of the present invention.

FIG. 36 shows another example of an image displayed on the display unit 5 in Step S210 and Step S211. A 3D image G21a1, a 3D image G22a, a 3D image G23a, and an illustration IT22a are displayed on the display unit 5. The 3D image G21a1 is a 3D image of a subject OB21 seen in an initial direction from an initial viewpoint. Characters CH21, a first reference point P21a, a second reference point P22, a third reference point P23, a reference line L21a, a reference line L22, a reference line L23a, and an illustration IT21a are displayed on the 3D image G21a1. The second reference point P22 and the third reference point P23 are set on the surface of the subject OB21. The first reference point P21a is set at a position that is not on the surface of the subject OB21.

The 3D image G22a is a 3D image of the subject OB21 seen in a direction A from a viewpoint A. A reference plane PL22a is displayed on the 3D image G22a. The 3D image G23a is a 3D image of the subject OB21 seen in a direction B from a viewpoint B. A reference plane PL23a is displayed on the 3D image G23a. In the example shown in FIG. 36, the reference plane PL22a and the reference plane PL23a do not match the edge of the subject OB21. For this reason, a user can determine that the positions of the three reference points are not valid.

After Step S211, the point setting unit 182 determines the position designated by a user as a measurement point on the basis of the operation result of the operation unit 4 and sets the measurement point at the position. The display control unit 181 displays the measurement point on the 3D image displayed in Step S203 (Step S212).

After Step S212, the measurement unit 187 calculates the size of the subject on the basis of the reference plane and the three-dimensional coordinates of the measurement point. Specifically, the measurement unit 187 calculates the three-dimensional distance between the reference plane and a point having the three-dimensional coordinates of the measurement point (Step S213).

After Step S213, the display control unit 181 displays a measurement result on the display unit 5 (Step S214). When Step S214 is executed, the three-dimensional measurement is completed.

Figure 37:
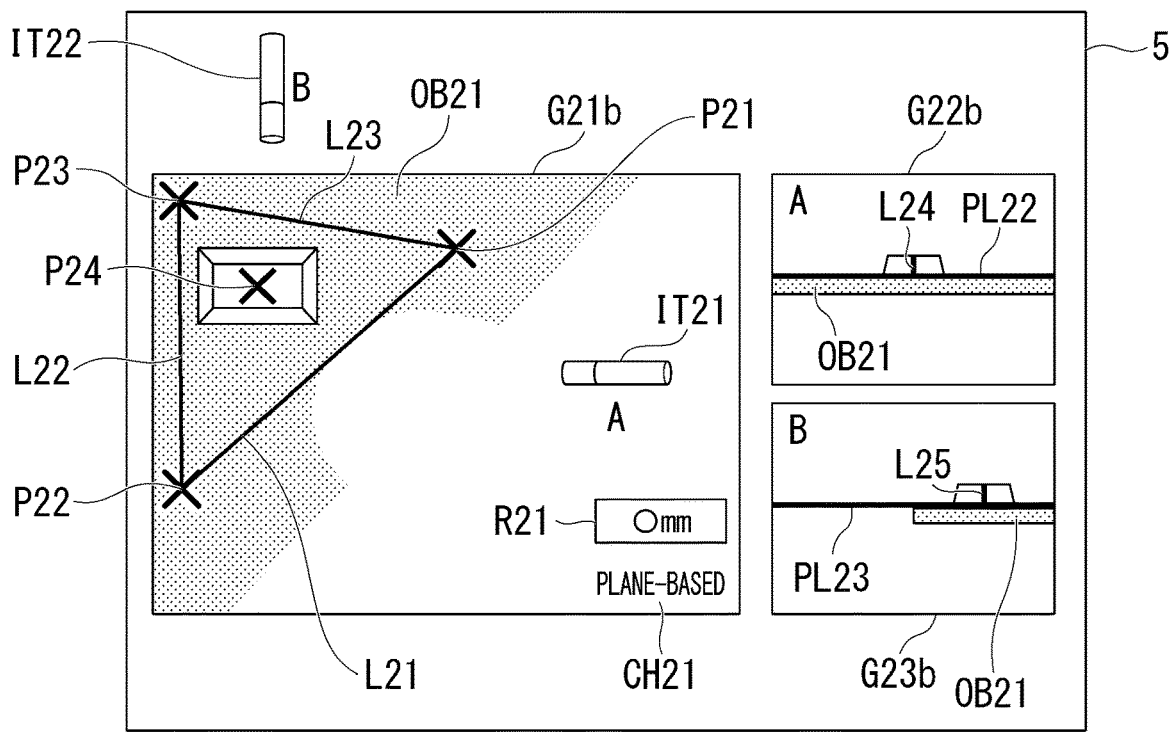
FIG. 37 is a diagram showing an example of an image displayed on the display unit according to the fifth embodiment of the present invention.

FIG. 37 shows an example of an image displayed on the display unit 5 in Step S214. A 3D image G21b, a 3D image G22b, a 3D image G23b, and an illustration IT22 are displayed on the display unit 5. Characters CH21, a first reference point P21, a second reference point P22, a third reference point P23, a reference line L21, a reference line L22, a reference line L23, and an illustration IT21 are displayed on the 3D image G21b. Moreover, a measurement point P24 and a measurement result R21 are displayed on the 3D image G21b. The measurement point P24 is set on a projection portion of the subject OB21. The measurement result R21 represents the three-dimensional distance between the reference plane and a point having the three-dimensional coordinates of the measurement point.

The 3D image G22b is a 3D image of the subject OB21 seen in a direction A from a viewpoint A. A reference plane PL22 and a measurement line L24 are displayed on the 3D image G22b. The measurement line L24 represents a measurement line seen in the direction A from the viewpoint A. The 3D image G23b is a 3D image of the subject OB21 seen in a direction B from a viewpoint B. A reference plane PL23 and a measurement line L25 are displayed on the 3D image G23b. The measurement line L25 represents a measurement line seen in the direction B from the viewpoint B.

In Step S203, instead of a 3D image, a 2D image of a subject seen in an initial direction from an initial viewpoint may be displayed on the display unit 5. The first reference point, the second reference point, and the third reference point may be set on the 2D image.

Display of the first reference point in Step S204, display of the second reference point in Step S205, display of the third reference point in Step S206, and display of the measurement point in Step S212 are not essential. Display of the reference line in Step S207 is not essential.

After any one of Steps S212 to S214 is executed, Step S208 may be executed. After any one of Steps S212 to S214 is executed, Step S210 may be executed. In a case in which Step S210 is executed after Step S213 or Step S214 is executed, a user can confirm whether or not the positions of the three reference points that have been used for measurement are valid.

After any one of Steps S212 to S214 is executed, Step S209 may be executed. After any one of Steps S212 to S214 is executed, Step S211 may be executed. In a case in which Step S211 is executed after Step S213 is executed, a user can confirm whether or not the positions of the three reference points that have been used for measurement are valid.

Each of Steps S212 to S214 is not essential. Each of Steps S212 to S214 may not be executed. For example, in order to inspect whether or not the shape of a subject is the desired shape, each of Steps S201 to S211 may be executed. For example, in order to inspect whether or not a portion of an inspection target is a plane, a user designates three reference points on the portion on a 3D image. For example, the portion is the surface of the inspection target. A reference plane that are based on the three reference points is displayed on the 3D image.

A user confirms whether or not the reference plane is displayed on the portion on the basis of the 3D image. In this way, a user confirms whether or not the positions of the three reference points are valid. After it is confirmed that the positions of the three reference points are valid, a user performs inspection by comparing the reference plane with the shape of the portion.

Only any one of a 3D image of a subject seen in the direction A from the viewpoint A and a 3D image of the subject seen in the direction B from the viewpoint B may be displayed on the display unit 5.

It may be possible for a user to simultaneously change viewpoints of two 3D images. For example, when a user changes a viewpoint of one 3D image, a viewpoint of the other 3D image is changed. The method of changing a viewpoint is similar to the method described in the modified example of the third embodiment.

The endoscope device 1 according to the fifth embodiment may have a function of correcting a reference point. The operation unit 4 may accept input of at least one corrected reference point. At least one of three reference points that were previously set may be replaced with the corrected reference point. The reference figure calculation unit 184 may calculate a reference plane on the basis of three-dimensional coordinates of three reference points including at least one corrected reference point.

In the fifth embodiment, a 3D image of a subject seen in a direction A from a viewpoint A and a 3D image of the subject seen in a direction B from a viewpoint B are displayed on the display unit 5. For this reason, the endoscope device 1 can simplify determination of validity of a point designated on an image of a subject.

Sixth Embodiment

A sixth embodiment of the present invention will be described. The endoscope device 1 according to the sixth embodiment has a function of distance between two points measurement. Two measurement points are designated by a user. Each of the two measurement points represents a position for measuring the size of a subject. In addition, each of the two measurement points represents a reference position for calculating a reference figure used for confirmation of the positions of the measurement points. Therefore, each of the two measurement points corresponds to a reference point of each aspect of the present invention.

In the sixth embodiment, a reference figure is a line segment. A straight line axis defining a second viewpoint and a second direction is perpendicular to the reference figure.

The reference figure calculation unit 184 calculates a measurement line on the basis of three-dimensional coordinates of the two measurement points. The measurement line is the reference figure in the sixth embodiment. The measurement line is a line segment on the three-dimensional space and joins points each having three-dimensional coordinates of each of the two measurement points. The two measurement points are two endpoints of the measurement line. In the sixth embodiment, the measurement unit 187 calculates the three-dimensional distance between two points each having the three-dimensional coordinates of each of the two measurement points.

Figure 38:
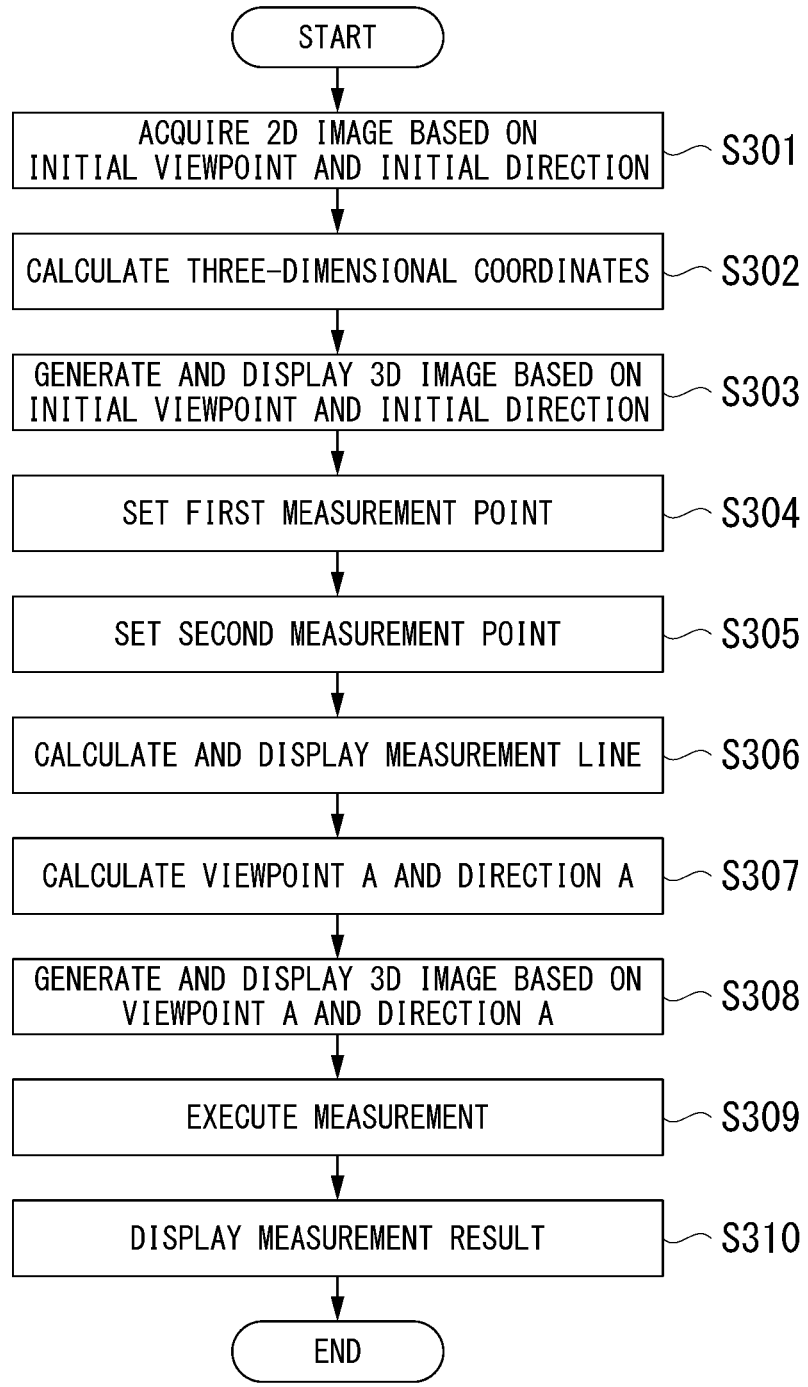
FIG. 38 is a flow chart showing a procedure of three-dimensional measurement in a sixth embodiment of the present invention.

Three-dimensional measurement in the sixth embodiment will be described by using FIG. 38. FIG. 38 shows a procedure of the three-dimensional measurement.

The imaging device 28 acquires a 2D image of a subject by imaging the subject and generating an imaging signal. The acquired 2D image (first image) is a two-dimensional image of the subject seen in an initial direction from an initial viewpoint. The CPU 18 acquires the 2D image of the subject from the CCU 9 through the video signal processing circuit 12 (Step S301). Step S301 corresponds to the image acquisition step.

After Step S301, the coordinate calculation unit 183 calculates three-dimensional coordinates of all pixels in the 2D image (Step S302). Step S302 corresponds to the coordinate calculation step.

After Step S302, the image generation unit 186 generates a three-dimensional image (3D image) of the subject seen in the initial direction from the initial viewpoint on the basis of the three-dimensional coordinates calculated in Step S302. The display control unit 181 displays the 3D image (second image) on the display unit 5 (Step S303). Step S303 corresponds to the first display step.

After Step S303, the point setting unit 182 determines the position designated by a user as a measurement point on the basis of the operation result of the operation unit 4 and sets a first measurement point at the position. The display control unit 181 displays the first measurement point on the 3D image displayed in Step S303 (Step S304).

After Step S304, the point setting unit 182 determines the position designated by a user as a measurement point on the basis of the operation result of the operation unit 4 and sets a second measurement point at the position. The display control unit 181 displays the second measurement point on the 3D image displayed in Step S303 (Step S305).

After Step S305, the reference figure calculation unit 184 calculates a measurement line that passes through a point having three-dimensional coordinates of the first measurement point and a point having three-dimensional coordinates of the second measurement point. The display control unit 181 displays the measurement line on the 3D image displayed in Step S303 (Step S306). Step S306 corresponds to the reference figure calculation step.

Figure 39:
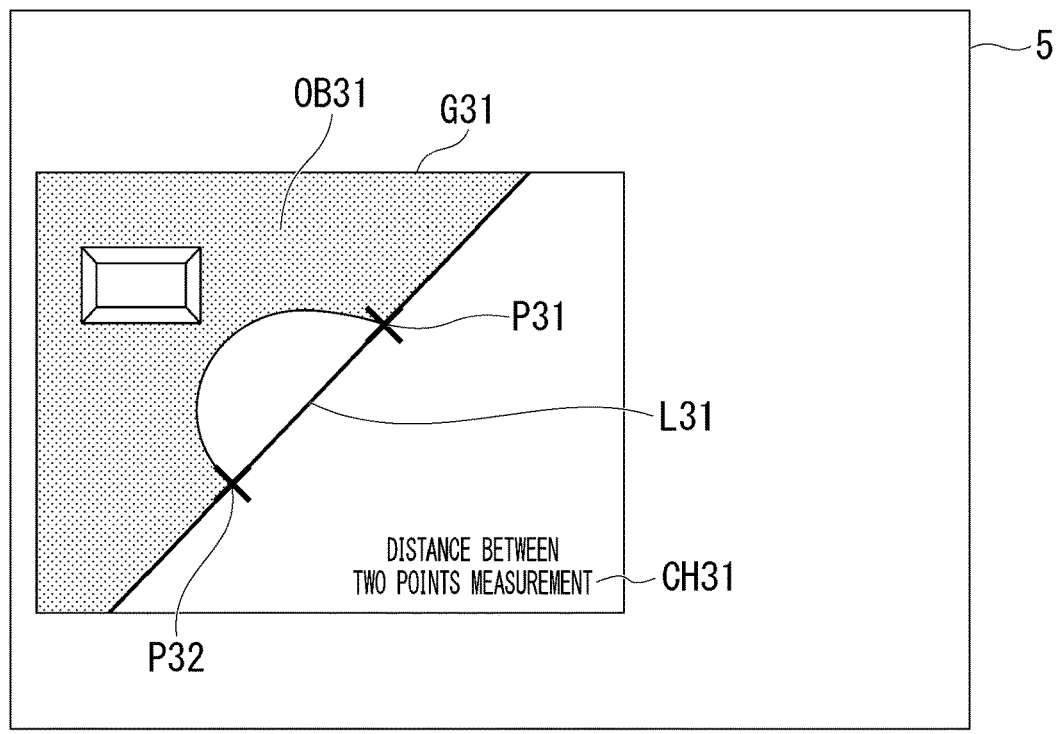
FIG. 39 is a diagram showing an example of an image displayed on a display unit according to the sixth embodiment of the present invention.

FIG. 39 shows an example of an image displayed on the display unit 5 in Step S306. A 3D image G31 is displayed on the display unit 5. The 3D image G31 is a 3D image of a subject OB31 seen in an initial direction from an initial viewpoint. Characters CH31 that represent a measurement mode is displayed on the 3D image G31. The characters CH31 represent that the measurement mode is the distance between two points measurement. A first measurement point P31, a second measurement point P32, and a measurement line L31 are displayed on the 3D image G31. Each measurement point is displayed as a mark that represents the position of the measurement point. In the example shown in FIG. 39, the first measurement point P31 and the second measurement point P32 are set at the two endpoints of a chipped portion of the subject OB31.

After Step S306, the viewpoint calculation unit 185 calculates a viewpoint A (second viewpoint) and a direction A (second direction) on the basis of the measurement line (Step S307). Step S307 corresponds to the viewpoint calculation step. The viewpoint calculation unit 185 calculates the viewpoint A and the direction A in Step S307 by using the method described below.

The viewpoint calculation unit 185 sets an X' axis that extends in the same direction as that in which the measurement line extends. The X' axis matches the measurement line. The viewpoint calculation unit 185 sets a Z' axis that extends in a direction perpendicular to the X' axis. The Z' axis passes through a camera position. The viewpoint calculation unit 185 sets a Y' axis (straight line axis) that extends in a direction perpendicular to each of the X' axis and the Z' axis.

The viewpoint calculation unit 185 sets a first region and a second region around the Y' axis. The direction A is a direction from the first region to the second region. The Y' axis passes through the first region and the second region. The volume of the first region and the volume of the second region are the same. The volume of a subject included in the first region is less than the volume of the subject included in the second region. In other words, the data number of three-dimensional coordinates of the subject OB31 in the first region is less than the data number of three-dimensional coordinates of the subject OB31 in the second region. The viewpoint calculation unit 185 sets the direction from the first region to the second region to the positive direction of the Y' axis. The viewpoint calculation unit 185 sets the positive direction of each of the X' axis and the Z' axis on the basis of the positive direction of the Y' axis.

The viewpoint calculation unit 185 sets the direction A to the positive direction of the Y' axis. The viewpoint calculation unit 185 calculates the viewpoint A such that the subject OB31 falls within the visual field when the subject OB31 is seen in the direction A. For example, the Z' coordinate of the viewpoint A is 0. The X' coordinate of the viewpoint A is the average of the X' coordinate of the first measurement point P31 and the X' coordinate of the second measurement point P32. The Y' coordinate of the viewpoint A is a position at which the entire subject OB31 falls within the visual field. The Y' coordinate of the viewpoint A may be a position for which at least the first measurement point P31 and the second measurement point P32 fall within the visual field.

After Step S307, the image generation unit 186 generates a three-dimensional image (3D image) of the subject seen in the direction A from the viewpoint A on the basis of the three-dimensional coordinates calculated in Step S302. At this time, the image generation unit 186 generates image data for displaying the 3D image by using perspective projection. The image generation unit 186 superimposes the measurement line on the 3D image. The display control unit 181 displays the 3D image on which the measurement line has been superimposed on the display unit 5 (Step S308). The 3D image (third image) displayed in Step S308 represents a state of the subject seen in the direction A from the viewpoint A. Step S308 corresponds to the image generation step and the second display step.

Figure 40:
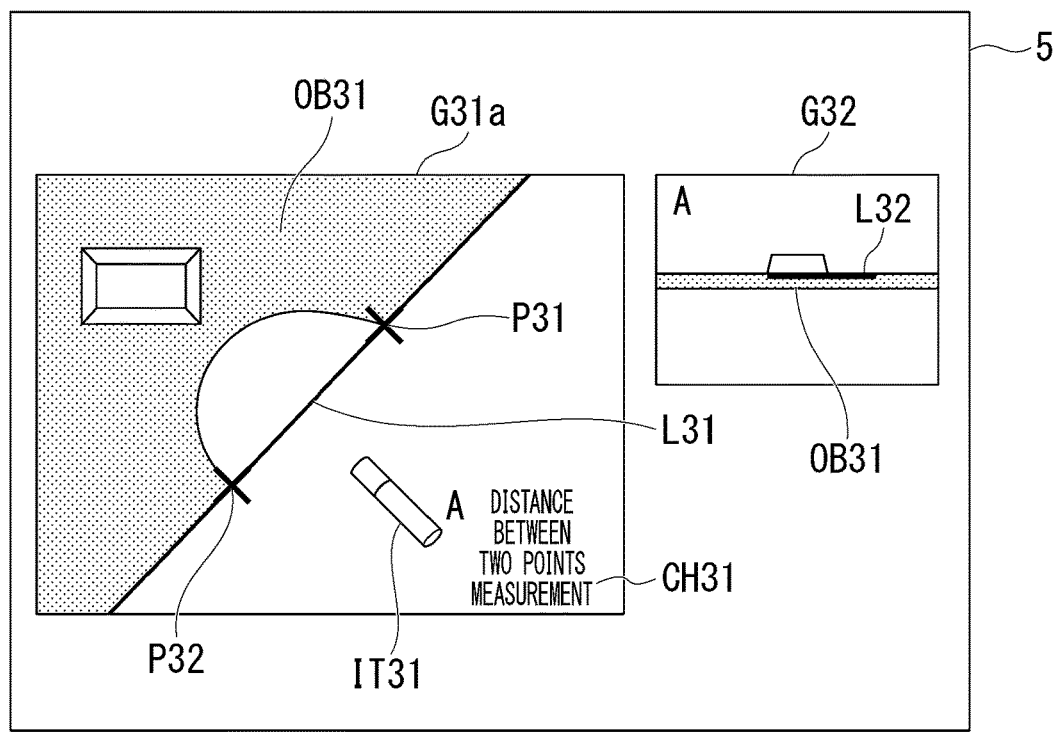
FIG. 40 is a diagram showing an example of an image displayed on the display unit according to the sixth embodiment of the present invention.

FIG. 40 shows an example of an image displayed on the display unit 5 in Step S308. A 3D image G31a and a 3D image G32 are displayed on the display unit 5. The display control unit 181 displays the 3D image G32 on the display unit 5 in Step S308 such that the 3D image G32 does not overlap the 3D image G31a. The 3D image G31a is a 3D image of a subject OB31 seen in an initial direction from an initial viewpoint. Characters CH31, a first measurement point P31, a second measurement point P32, a measurement line L31, and an illustration IT31 are displayed on the 3D image G31a.

The 3D image G32 is a 3D image of the subject OB31 seen in a direction A from a viewpoint A. A measurement line L32 is displayed on the 3D image G32. The measurement line L32 represents a measurement line seen in the direction A from the viewpoint A. The edge of the subject OB31 seen in the direction parallel to the surface of the subject OB31 is seen in the 3D image G32.

A user determines whether or not the measurement line is set on the edge of the subject OB31 on the basis of the 3D image G32. In this way, a user can confirm whether or not the positions of the two measurement points are valid. In the example shown in FIG. 40, the measurement line L32 matches the edge of the subject OB31. For this reason, a user can confirm that the positions of the two measurement points are valid. An operation for designating a position of a viewpoint and a direction of a visual line is unnecessary.

The display control unit 181 displays information that represents the viewpoint A and the direction A on the display unit 5. Specifically, the display control unit 181 displays the illustration IT31 of the tip end 20 of the insertion unit 2 on the display unit 5 in Step S308. The illustration IT31 is displayed on the 3D image G31a. The illustration IT31 represents the tip end 20 of the insertion unit 2 disposed at the viewpoint A and facing in the direction A. Since the illustration IT31 is displayed, a user can confirm the viewpoint A and the direction A.

When the 3D image G32 is displayed on the display unit 5, the display control unit 181 may hide the 3D image G31a. In this way, the display control unit 181 can display the 3D image G32 large. The display control unit 181 may switch between a first state and a second state on the basis of an instruction from a user. In the first state, only the 3D image G31a is displayed on the display unit 5. In the second state, only the 3D image G32 is displayed on the display unit 5. After a user finishes confirmation of the positions of the two measurement points, the user may cause the 3D image G31a and the 3D image G32 to be displayed by performing a predetermined operation. The display control unit 181 may display the 3D image G32 on the display unit 5 such that at least part of the 3D image G32 overlaps the 3D image G31a.

Figure 41:
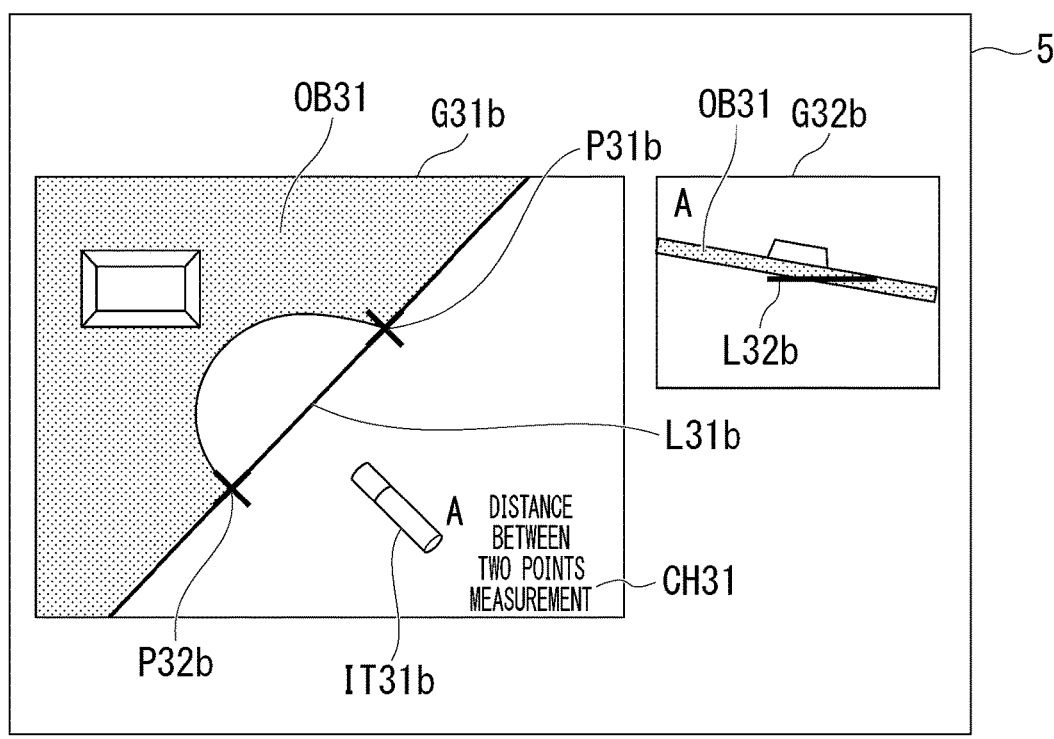
FIG. 41 is a diagram showing an example of an image displayed on the display unit according to the sixth embodiment of the present invention.

FIG. 41 shows another example of an image displayed on the display unit 5 in Step S308. A 3D image G31b and a 3D image G32b are displayed on the display unit 5. The 3D image G31b is a 3D image of a subject OB31 seen in an initial direction from an initial viewpoint. Characters CH31, a first measurement point P31b, a second measurement point P32b, a measurement line L31b, and an illustration IT31b are displayed on the 3D image G31b. The first measurement point P31b is set at the endpoint of a chipped portion of the subject OB31. The second measurement point P32b is set at a position that is not on the surface of the subject OB31. It is difficult for a user to understand the actual position of the second measurement point P32b in the 3D image G31b.

The 3D image G32b is a 3D image of the subject OB31 seen in a direction A from a viewpoint A. A measurement line L32b is displayed on the 3D image G32b. In the example shown in FIG. 41, the measurement line L32b does not match the edge of the subject OB31. For this reason, a user can determine that the positions of the two measurement points are not valid.

After Step S308, the measurement unit 187 calculates the size of the subject on the basis of the three-dimensional coordinates of the two measurement points. Specifically, the measurement unit 187 calculates the three-dimensional distance between the two measurement points (Step S309).

After Step S309, the display control unit 181 displays a measurement result on the display unit 5 (Step S310). When Step S310 is executed, the three-dimensional measurement is completed.

In Step S303, instead of a 3D image, a 2D image of a subject seen in an initial direction from an initial viewpoint may be displayed on the display unit 5. The first measurement point and the second measurement point may be set on the 2D image.

Display of the first measurement point in Step S304, display of the second measurement point in Step S305, and display of the measurement line in Step S306 are not essential.

After Step S309 or Step S310 is executed, Step S307 may be executed. After Step S309 or Step S310 is executed, Step S308 may be executed. In a case in which Step S308 is executed after Step S309 or Step S310 is executed, a user can confirm whether or not the positions of the two measurement points that have been used for measurement are valid.

The viewpoint calculation unit 185 may set the direction A to the positive direction of the Z' axis and set the viewpoint A on the Z' axis in Step S307. The viewpoint calculation unit 185 may set the direction A to the positive direction of the X' axis and set the viewpoint A on the X' axis in Step S307. A 3D image of a subject seen in the direction A from the viewpoint A and a 3D image of the subject seen in another direction from another viewpoint may be displayed on the display unit 5.

A straight line axis defining the viewpoint A and the direction A may be parallel to an approximate plane that approximates the surface of a subject. For example, the viewpoint calculation unit 185 sets an X' axis that extends in the same direction as that in which a measurement line extends. The X' axis matches the measurement line. The viewpoint calculation unit 185 calculates an approximate plane on the basis of three-dimensional coordinates of at least three points around the measurement line. For example, the viewpoint calculation unit 185 calculates the approximate plane by using the least squares method. For example, the viewpoint calculation unit 185 calculates the approximate plane on the basis of three-dimensional coordinates of the at least three points that are within a predetermined distance from the measurement line. The at least three points are near the measurement line. The at least three points may include at least one of two measurement points. The at least three points may not include two measurement points. In a case in which the at least three points include at least one measurement point, the at least three points include a point on the measurement line. The viewpoint calculation unit 185 sets a Y' axis that extends in a direction that is parallel to the approximate plane and is perpendicular to the X' axis.

The viewpoint calculation unit 185 sets the direction from a first region in which the data number of three-dimensional coordinates of a subject is small to a second region in which the data number of three-dimensional coordinates of the subject is large to the positive direction of the Y' axis. The first region and the second region are set around the Y' axis. The viewpoint calculation unit 185 sets a Z' axis that extends in a direction perpendicular to each of the X' axis and the Y' axis. The Z' axis passes through a camera position.

The viewpoint calculation unit 185 sets the direction A to the positive direction of the Y' axis. The viewpoint calculation unit 185 calculates the viewpoint A such that the subject falls within the visual field when the subject is seen in the direction A. For example, the Z' coordinate of the viewpoint A is 0. The X' coordinate of the viewpoint A is the average of the X' coordinate of a first measurement point and the X' coordinate of a second measurement point. The Y' coordinate of the viewpoint A is a position at which the entire subject falls within the visual field. The Y' coordinate of the viewpoint A may be a position for which at least the first measurement point and the second measurement point fall within the visual field.

The direction A may not be parallel to the above-described approximate plane. The direction A may be slightly tilted away from the direction parallel to the approximate plane. For example, the direction A may be slightly tilted away from the direction parallel to the approximate plane by 5 degrees. In this way, a user can obtain three-dimensional sense. The direction A may be perpendicular to the approximate plane.

The endoscope device 1 according to the sixth embodiment may have a function of correcting a measurement point. The operation unit 4 may accept input of at least one corrected measurement point. At least one of two measurement points that were previously set may be replaced with the corrected measurement point. The reference figure calculation unit 184 may calculate a measurement line on the basis of three-dimensional coordinates of two measurement points including at least one corrected measurement point.

In the sixth embodiment, a 3D image of a subject seen in a direction A from a viewpoint A is displayed on the display unit 5. For this reason, the endoscope device 1 can simplify determination of validity of a point designated on an image of a subject.

Seventh Embodiment

A seventh embodiment of the present invention will be described. The endoscope device 1 according to the seventh embodiment has a function of area/total length measurement. At least three measurement points are designated by a user. Each of the at least three measurement points represents a position for measuring the size of a subject. In addition, each of the at least three measurement points represents a reference position for calculating a reference figure used for confirmation of the positions of the measurement points. Therefore, each of the at least three measurement points corresponds to a reference point of each aspect of the present invention.

In the seventh embodiment, a reference figure is a plane. A straight line axis defining a second viewpoint and a second direction is perpendicular to the reference figure. The operation unit 4 accepts input of the at least three measurement points. The reference figure calculation unit 184 calculates the reference figure on the basis of three-dimensional coordinates of the at least three measurement points. A reference plane is the reference figure in the seventh embodiment.

The measurement unit 187 calculates the area of the figure having the at least three measurement points as vertexes. For example, the measurement unit 187 divides the figure into a plurality of triangles and calculates the total of the areas of the plurality of triangles. The measurement unit 187 further calculates the total length of the figure having the at least three measurement points as vertexes. For example, the total length of a polygon having N vertexes is the total of lengths of N sides. The numeral N is an integer of three or more. The length of one side is the distance between two points having three-dimensional coordinates of the two measurement points that are consecutive in order of measurement points designated by a user.

Figure 42:
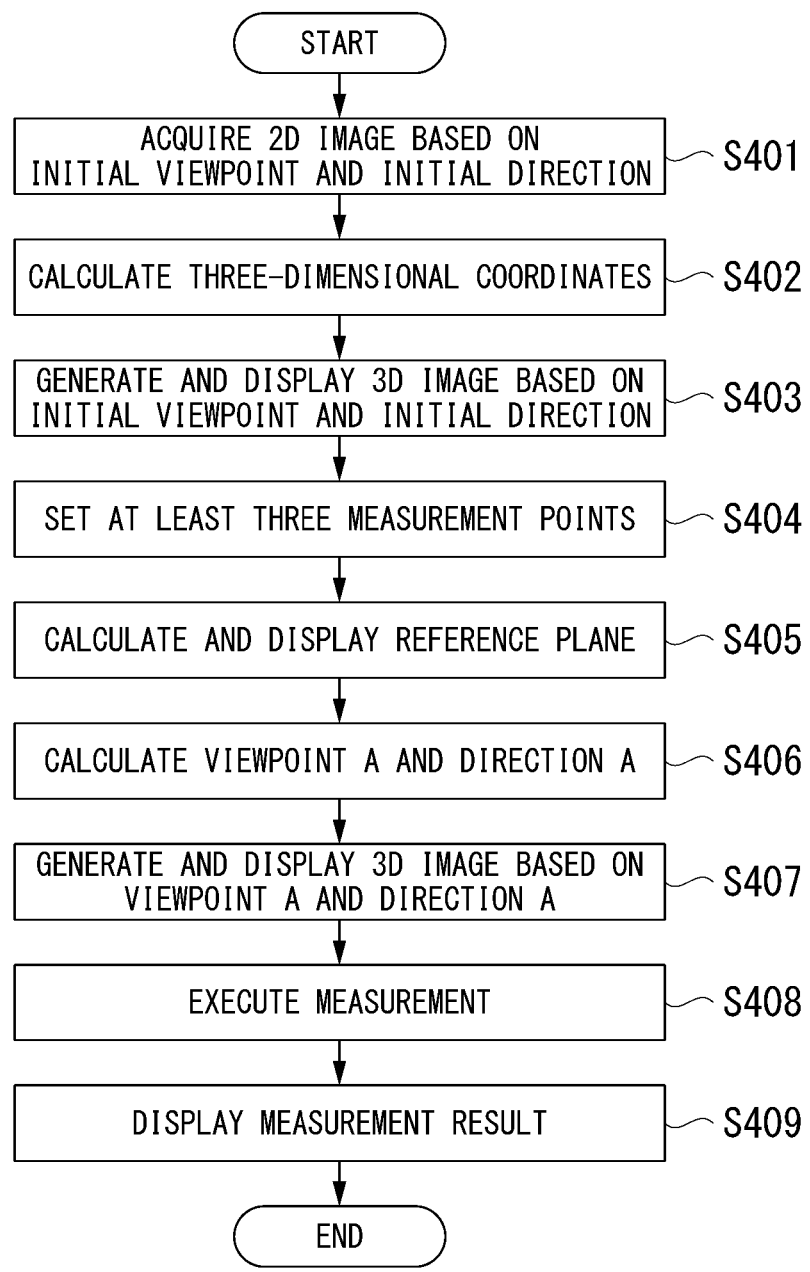
FIG. 42 is a flow chart showing a procedure of three-dimensional measurement in a seventh embodiment of the present invention.

Three-dimensional measurement in the seventh embodiment will be described by using FIG. 42. FIG. 42 shows a procedure of the three-dimensional measurement.

The imaging device 28 acquires a 2D image of a subject by imaging the subject and generating an imaging signal. The acquired 2D image (first image) is a two-dimensional image of the subject seen in an initial direction from an initial viewpoint. The CPU 18 acquires the 2D image of the subject from the CCU 9 through the video signal processing circuit 12 (Step S401). Step S401 corresponds to the image acquisition step.

After Step S401, the coordinate calculation unit 183 calculates three-dimensional coordinates of all pixels in the 2D image (Step S402). Step S402 corresponds to the coordinate calculation step.

After Step S402, the image generation unit 186 generates a three-dimensional image (3D image) of the subject seen in the initial direction from the initial viewpoint on the basis of the three-dimensional coordinates calculated in Step S402. The display control unit 181 displays the 3D image (second image) on the display unit 5 (Step S403). Step S403 corresponds to the first display step.

After Step S403, the point setting unit 182 determines the position designated by a user as a measurement point on the basis of the operation result of the operation unit 4 and sets the measurement point at the position. The point setting unit 182 sets at least three measurement points. The display control unit 181 displays the at least three measurement points on the 3D image displayed in Step S403 (Step S404).

After Step S404, the reference figure calculation unit 184 calculates a reference plane on the basis of three-dimensional coordinates of the at least three measurement points. For example, the reference figure calculation unit 184 calculates the reference plane by using the least squares method. The reference figure calculation unit 184 calculates at least three measurement lines. Each of the measurement lines joins points each having the three-dimensional coordinates of each of the two measurement points that are consecutive in order of measurement points designated by a user. The display control unit 181 displays the at least three measurement lines on the 3D image displayed in Step S403 (Step S405). The at least three measurement lines that have been displayed represent the position of the reference plane. Step S405 corresponds to the reference figure calculation step.

Figure 43:
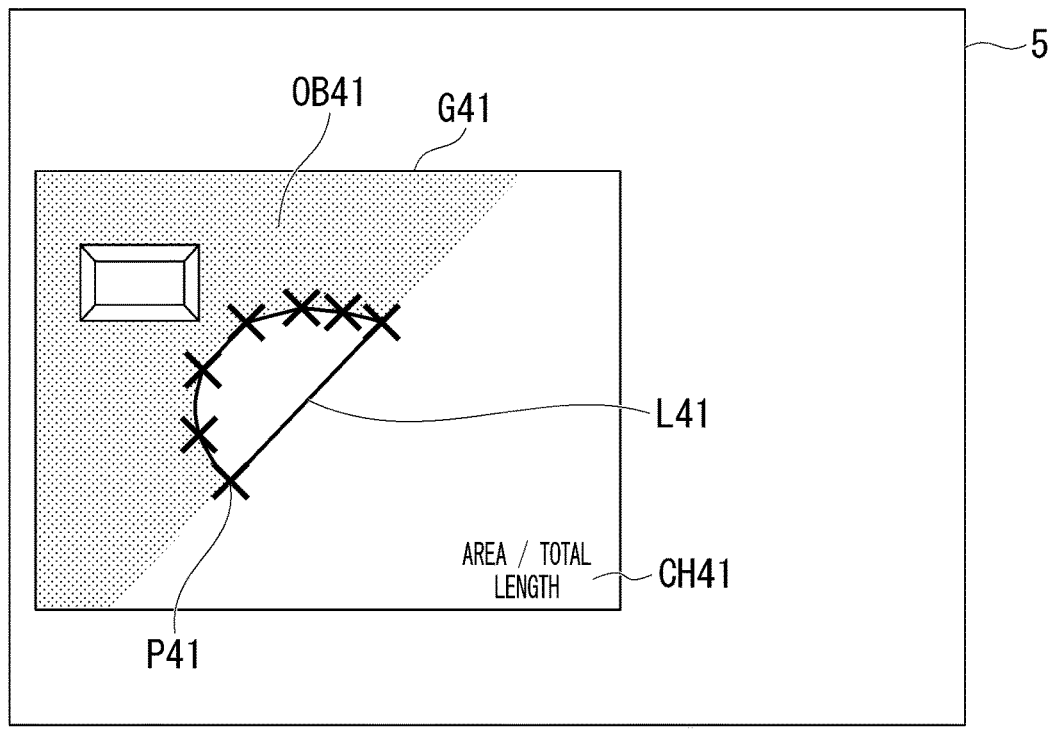
FIG. 43 is a diagram showing an example of an image displayed on a display unit according to the seventh embodiment of the present invention.

FIG. 43 shows an example of an image displayed on the display unit 5 in Step S405. A 3D image G41 is displayed on the display unit 5. The 3D image G41 is a 3D image of a subject OB41 seen in an initial direction from an initial viewpoint. Characters CH41 that represent a measurement mode is displayed on the 3D image G41. The characters CH41 represent that the measurement mode is the area/total length measurement. Seven measurement points P41 are displayed on the 3D image G41. In FIG. 43, a reference sign of one measurement point P41 is shown as a representative. Each measurement point is displayed as a mark that represents the position of the measurement point. Seven measurement lines L41 are displayed on the 3D image G41. In FIG. 43, a reference sign of one measurement line L41 is shown as a representative.

After Step S405, the viewpoint calculation unit 185 calculates a viewpoint A (second viewpoint) and a direction A (second direction) on the basis of the reference plane (Step S406). Step S406 corresponds to the viewpoint calculation step. The method of calculating the viewpoint A and the direction A in Step S406 is the same as the method of calculating the viewpoint A and the direction A in Step S208 shown in FIG. 33. The viewpoint calculation unit 185 sets the direction A to the positive direction of a Y' axis and sets the viewpoint A on the Y' axis.

After Step S406, the image generation unit 186 generates a three-dimensional image (3D image) of the subject seen in the direction A from the viewpoint A on the basis of the three-dimensional coordinates calculated in Step S402. At this time, the image generation unit 186 generates image data for displaying the 3D image by using perspective projection. The image generation unit 186 superimposes the measurement plane on the 3D image. The at least three measurement lines calculated in Step S405 represent an approximate position of the reference plane. For example, the image generation unit 186 superimposes the measurement plane on the 3D image by superimposing the at least three measurement lines on the 3D image. The display control unit 181 displays the 3D image on which the measurement plane has been superimposed on the display unit 5 (Step S407). The 3D image (third image) displayed in Step S407 represents a state of the subject seen in the direction A from the viewpoint A. Step S407 corresponds to the image generation step and the second display step.

Figure 44:
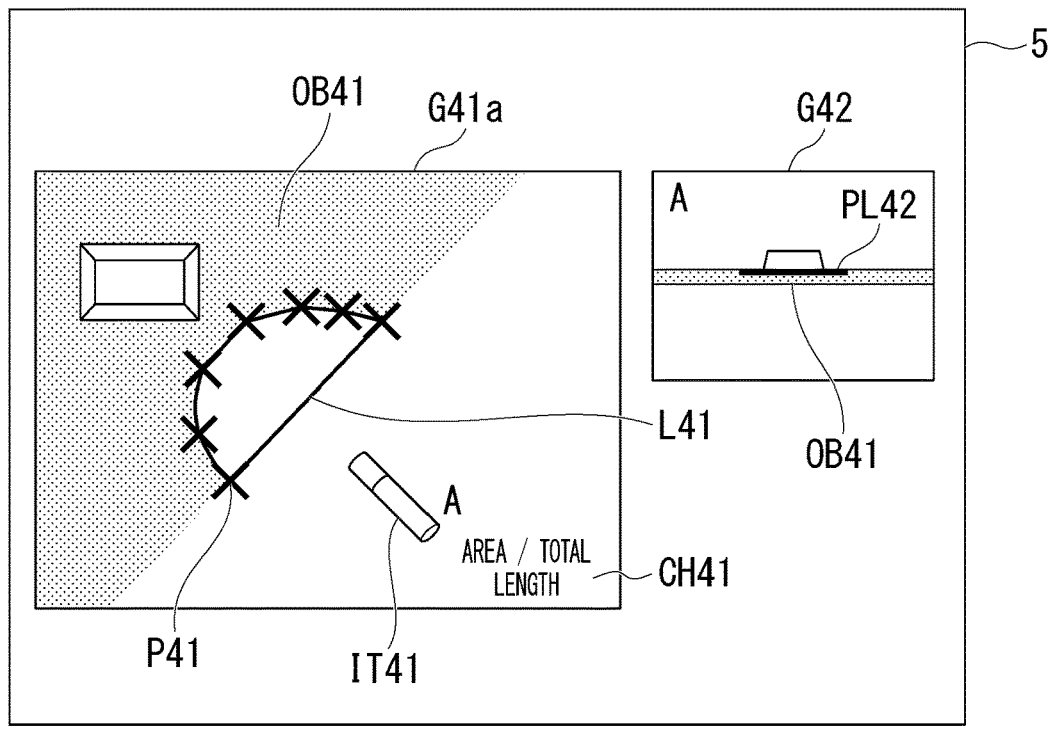
FIG. 44 is a diagram showing an example of an image displayed on the display unit according to the seventh embodiment of the present invention.

FIG. 44 shows an example of an image displayed on the display unit 5 in Step S407. A 3D image G41a and a 3D image G42 are displayed on the display unit 5. The display control unit 181 displays the 3D image G42 on the display unit 5 in Step S407 such that the 3D image G42 does not overlap the 3D image G41a.

The 3D image G41a is a 3D image of a subject OB41 seen in an initial direction from an initial viewpoint. Characters CH41, seven measurement points P41, seven measurement lines L41, and an illustration IT41 are displayed on the 3D image G41a. The 3D image G42 is a 3D image of the subject OB41 seen in a direction A from a viewpoint A. A reference plane PL42 is displayed on the 3D image G42. The reference plane PL42 represents a reference plane seen in the direction A from the viewpoint A. When the reference plane is seen in the direction parallel to the reference plane, the reference plane looks to be a straight line. The edge of the subject OB41 seen in the direction parallel to the surface of the subject OB41 is seen in the 3D image G42.

A user determines whether or not the reference plane is set on the edge of the subject OB41 on the basis of the 3D image G42. In a case in which the reference plane is set on the edge of the subject OB41, the reference plane approximates the surface of the subject OB41 at high precision. In this way, a user can confirm whether or not the positions of the seven measurement points are valid. In the example shown in FIG. 44, the reference plane PL42 matches the edge of the subject OB41. For this reason, a user can confirm that the positions of the seven measurement points are valid. An operation for designating a position of a viewpoint and a direction of a visual line is unnecessary.

The display control unit 181 displays information that represents the viewpoint A and the direction A on the display unit 5. Specifically, the display control unit 181 displays the illustration IT41 of the tip end 20 of the insertion unit 2 on the display unit 5 in Step S407. The illustration IT41 is displayed on the 3D image G41a. The illustration IT41 represents the tip end 20 of the insertion unit 2 disposed at the viewpoint A and facing in the direction A. Since the illustration IT41 is displayed, a user can confirm the viewpoint A and the direction A.

When the 3D image G42 is displayed on the display unit 5, the display control unit 181 may hide the 3D image G41a. In this way, the display control unit 181 can display the 3D image G42 large. The display control unit 181 may switch between a first state and a second state on the basis of an instruction from a user. In the first state, only the 3D image G41a is displayed on the display unit 5. In the second state, only the 3D image G42 is displayed on the display unit 5. After a user finishes confirmation of the positions of the seven measurement points, the user may cause the 3D image G41a and the 3D image G42 to be displayed by performing a predetermined operation. The display control unit 181 may display the 3D image G42 on the display unit 5 such that at least part of the 3D image G42 overlaps the 3D image G41a.

Figure 45:
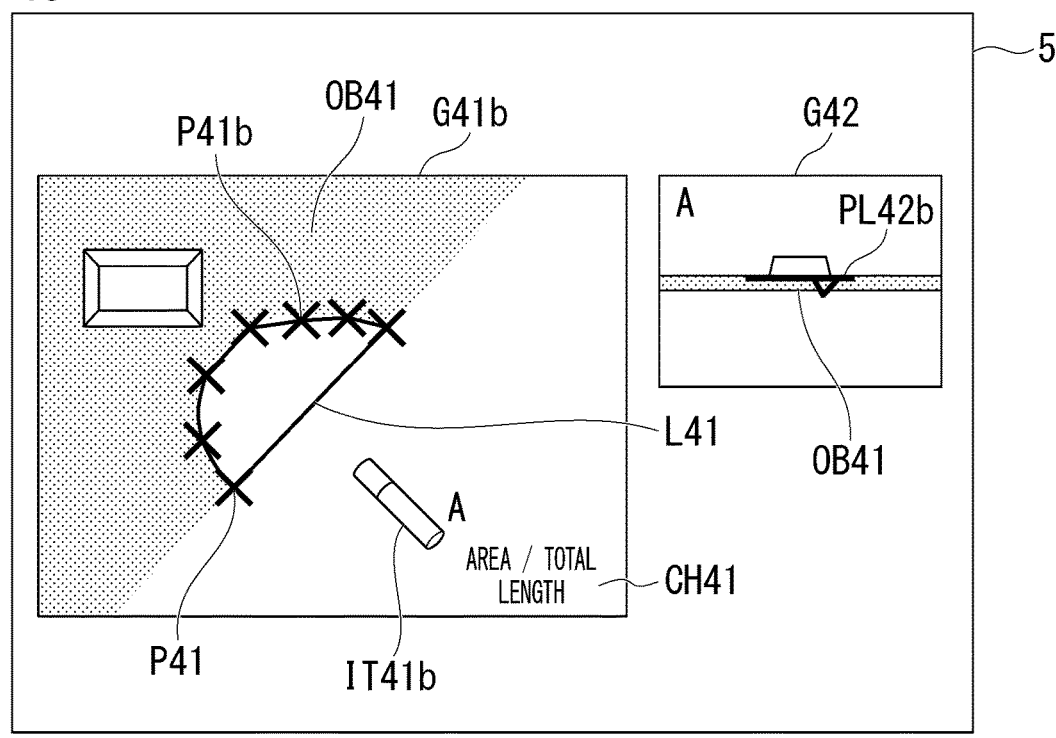
FIG. 45 is a diagram showing an example of an image displayed on the display unit according to the seventh embodiment of the present invention.

FIG. 45 shows another example of an image displayed on the display unit 5 in Step S407. A 3D image G41b and a 3D image G42b are displayed on the display unit 5. The 3D image G41b is a 3D image of a subject OB41 seen in an initial direction from an initial viewpoint. Characters CH41, seven measurement points P41, seven measurement lines L41, and an illustration IT41b are displayed on the 3D image G41b. One measurement point P41b is set at the height different from the height at which the other six measurement points P41 are set in the edge of a subject OB41. It is difficult for a user to understand the actual position of the measurement point P41b in the 3D image G41b.

The 3D image G42b is a 3D image of the subject OB41 seen in a direction A from a viewpoint A. A reference plane PL42b is displayed on the 3D image G42b. The reference plane PL42b is displayed as seven measurement lines. In the example shown in FIG. 45, since the height of the measurement point P41b in the direction perpendicular to the surface of the subject OB41 is shifted, some of the seven measurement lines are not parallel to the edge of the subject OB41. For this reason, a user can determine that the positions of some of the seven measurement points are not valid.

After Step S407, the measurement unit 187 calculates the size of the subject on the basis of the three-dimensional coordinates of the at least three measurement points. Specifically, the measurement unit 187 calculates the area of the figure having the at least three measurement points as vertexes and the total length of the figure (Step S408).

After Step S408, the display control unit 181 displays a measurement result on the display unit 5 (Step S409). When Step S409 is executed, the three-dimensional measurement is completed.

In Step S403, instead of a 3D image, a 2D image of a subject seen in an initial direction from an initial viewpoint may be displayed on the display unit 5. The at least three measurement points may be set on the 2D image.

Display of the measurement points in Step S404 and display of the reference plane in Step S405 are not essential.

After Step S408 or Step S409 is executed, Step S406 may be executed. After Step S408 or Step S409 is executed, Step S407 may be executed. In a case in which Step S407 is executed after Step S408 or Step S409 is executed, a user can confirm whether or not the positions of the at least three measurement points that have been used for measurement are valid.

The viewpoint calculation unit 185 may set the direction A to the positive direction of the Z' axis and set the viewpoint A on the Z' axis in Step S406. The viewpoint calculation unit 185 may set the direction A to the positive direction of the X' axis and set the viewpoint A on the X' axis in Step S406. A 3D image of a subject seen in the direction A from the viewpoint A and a 3D image of the subject seen in another direction from another viewpoint may be displayed on the display unit 5.

The endoscope device 1 according to the seventh embodiment may have a function of correcting a measurement point. The operation unit 4 may accept input of at least one corrected measurement point. Some of at least three measurement points that were previously set may be replaced with the corrected measurement point. The reference figure calculation unit 184 may calculate a reference plane on the basis of three-dimensional coordinates of at least three measurement points including at least one corrected measurement point.

In the seventh embodiment, a 3D image of a subject seen in a direction A from a viewpoint A is displayed on the display unit 5. For this reason, the endoscope device 1 can simplify determination of validity of a point designated on an image of a subject.

Eighth Embodiment

An eighth embodiment of the present invention will be described. The operation unit 4 accepts input of one measurement point. The point setting unit 182 sets a measurement point at the position of a cursor in an image (second image) of a subject displayed on the display unit 5. The measurement point corresponds to a reference point of each aspect of the present invention. The image generation unit 186 generates a 3D image (third image) of a subject seen in a second direction from a second viewpoint on the basis of three-dimensional coordinates of the measurement point. The image generation unit 186 generates a 3D image (fourth image) of the subject seen in a third direction from a third viewpoint on the basis of three-dimensional coordinates of the measurement point. The third direction is different from the second direction. The third viewpoint is different from the second viewpoint. The display control unit 181 displays the two 3D images on which information representing the position of the measurement point has been superimposed on the display unit 5.

The viewpoint calculation unit 185 sets the second direction to the positive direction of an X axis and sets the second viewpoint on the X axis. The viewpoint calculation unit 185 sets the third direction to the positive direction of a Y axis and sets the third viewpoint on the Y axis. The X axis, the Y axis, and a Z axis are coordinate axes that define an initial viewpoint and an initial direction. For example, the Z axis extends in the optical axis direction of the optical system of the endoscope device 1. The X axis extends in a direction perpendicular to the optical axis direction and the Y axis extends in another direction perpendicular to the optical axis direction.

Figure 46:
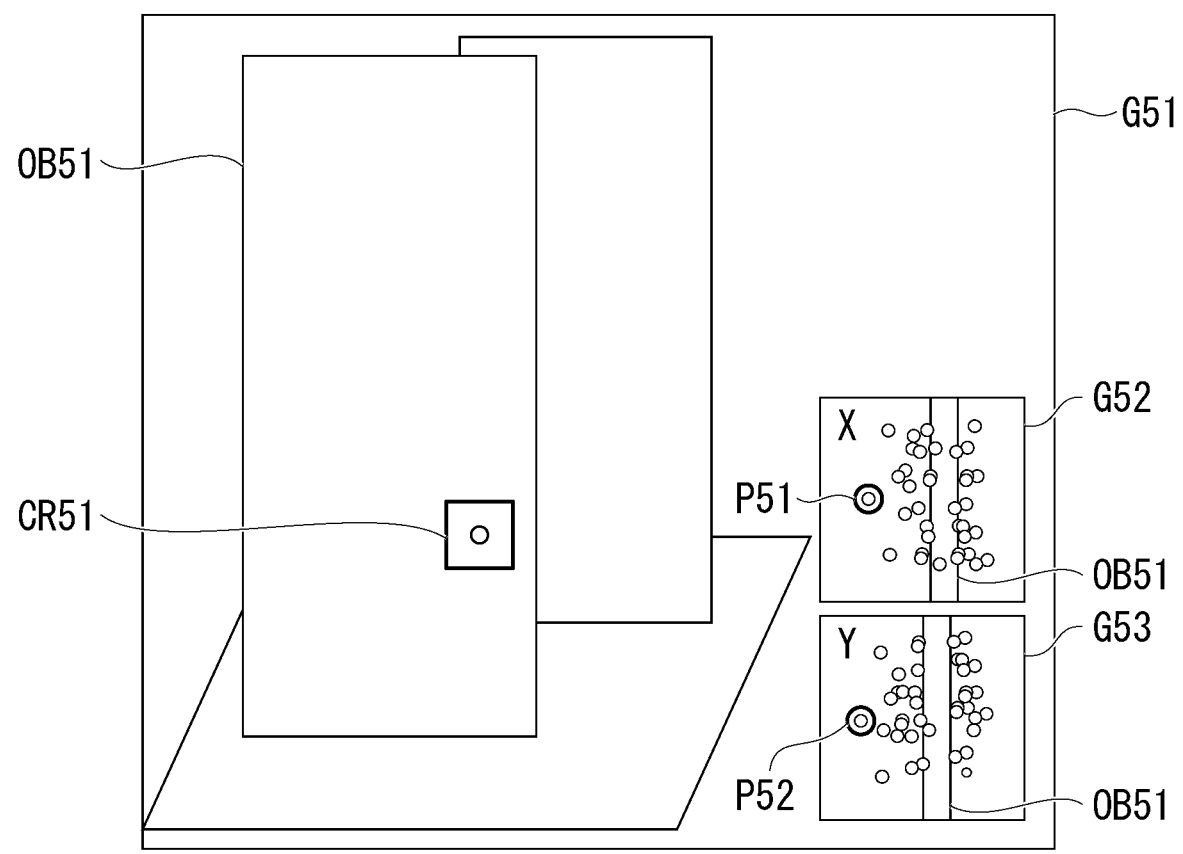
FIG. 46 is a diagram showing an example of an image displayed on a display unit according to an eighth embodiment of the present invention.

FIG. 46 shows an example of an image displayed on the display unit 5. A 3D image G51 is displayed on the display unit 5. The 3D image G51 is a 3D image of a subject OB51 seen in an initial direction from an initial viewpoint. A cursor CR51 is displayed on the 3D image G51. A user can move the cursor CR51 by operating the operation unit 4. A measurement point is set at the position of the cursor CR51.

A 3D image G52 and a 3D image G53 are displayed on the 3D image G51. The 3D image G52 is a 3D image of the subject OB51 seen in a second direction from a second viewpoint. The 3D image G53 is a 3D image of the subject OB51 seen in a third direction from a third viewpoint. A measurement point P51 is displayed on the 3D image G52. The measurement point P51 represents a measurement point seen in the second direction from the second viewpoint. A measurement point P52 is displayed on the 3D image G53. The measurement point P52 represents a measurement point seen in the third direction from the third viewpoint.

The imaging device 28 acquires a 2D image of the subject OB51. The coordinate calculation unit 183 calculates three-dimensional coordinates of all pixels in the 2D image. The image generation unit 186 generates the 3D image G51, the 3D image G52, and the 3D image G53 on the basis of the three-dimensional coordinates calculated by the coordinate calculation unit 183.

Figure 47:
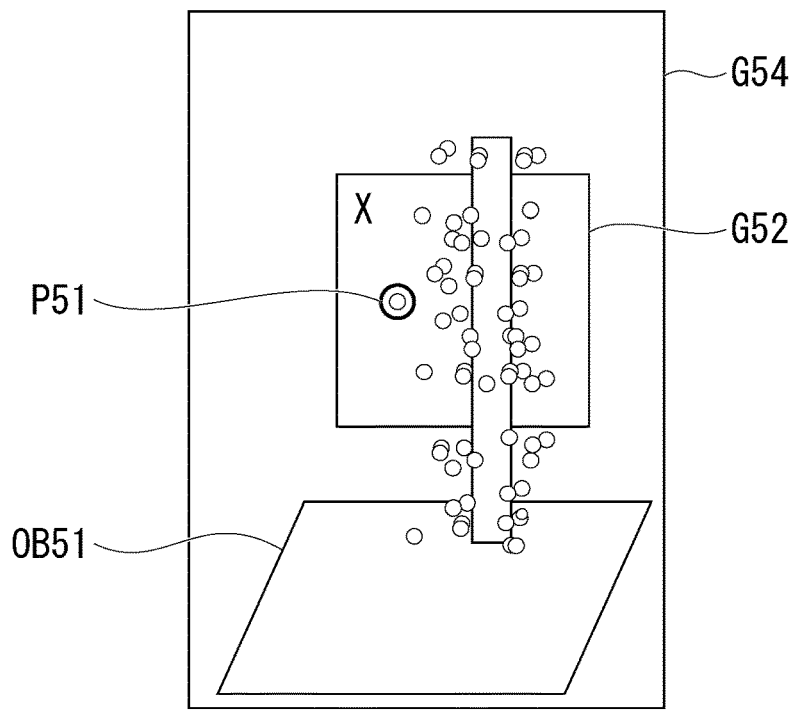
FIG. 47 is a diagram showing an example of a three-dimensional image in the eighth embodiment of the present invention.
Figure 48:
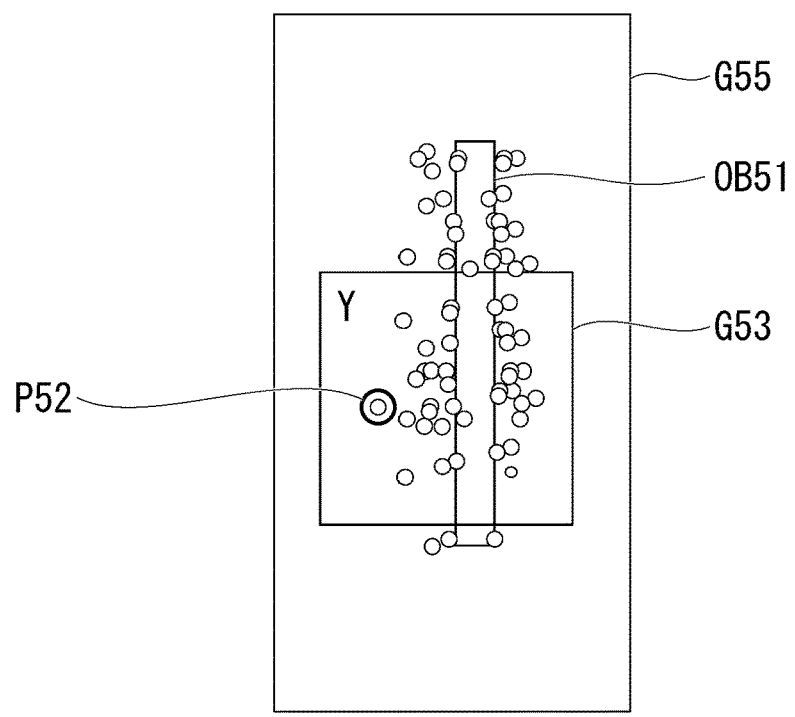
FIG. 48 is a diagram showing an example of a three-dimensional image in the eighth embodiment of the present invention.

FIG. 47 and FIG. 48 show 3D images generated by the image generation unit 186. A 3D image G54 shown in FIG. 47 is a 3D image of the subject OB51 seen in the second direction from the second viewpoint. A 3D image G55 shown in FIG. 48 is a 3D image of the subject OB51 seen in the third direction from the third viewpoint. The 3D image G54 and the 3D image G55 include a plurality of points corresponding to the entire subject OB51 seen in the 3D image G51. The image generation unit 186 cuts out an image including a region around the measurement point P51 from the 3D image G54. The image that has been cut out is the 3D image G52. The image generation unit 186 cuts out an image including a region around the measurement point P52 from the 3D image G55. The image that has been cut out is the 3D image G53.

There is a case in which a calculation result of three-dimensional coordinates includes an error. In comparison with a calculation result of each of an X coordinate and a Y coordinate, a calculation result of a Z coordinate tends to include a larger error. The direction parallel to a Z axis is the depth direction of an image. Even when a user thinks that a measurement point on the edge of a subject has been designated on the 3D image G51, there is a case in which the measurement point is not on the edge of the subject. The measurement point P51 is away from a large point group of the subject OB51 on the 3D image G52. The measurement point P52 is away from a large point group of the subject OB51 on the 3D image G53. For this reason, a user can determine that the position of the measurement point represented by the cursor CR51 is not valid.

In the example shown in FIG. 46, the two 3D images G52 and G53 are displayed on the display unit 5. Only the 3D image G52 or only the 3D image G53 may be displayed on the display unit 5.

In the eighth embodiment, a 3D image of a subject seen in a second direction from a second viewpoint and a 3D image of a subject seen in a third direction from a third viewpoint are displayed on the display unit 5. For this reason, the endoscope device 1 can simplify determination of validity of a point designated on an image of a subject.

Ninth Embodiment

A ninth embodiment of the present invention will be described. In a case in which a 3D image is displayed by using the method described in the eighth embodiment, there is a case in which determining the validity of a measurement point is difficult due to the angle of the surface of a subject in the 3D image.

Figure 49:
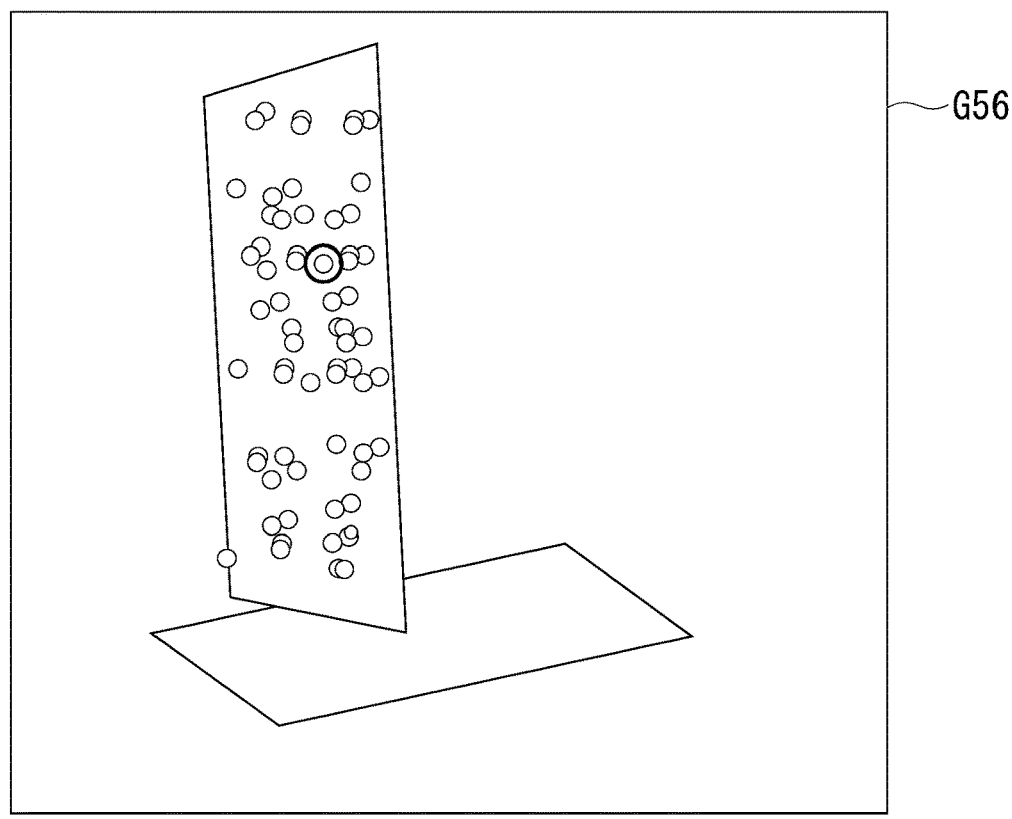
FIG. 49 is a diagram showing an example of a three-dimensional image in the eighth embodiment of the present invention.
Figure 50:
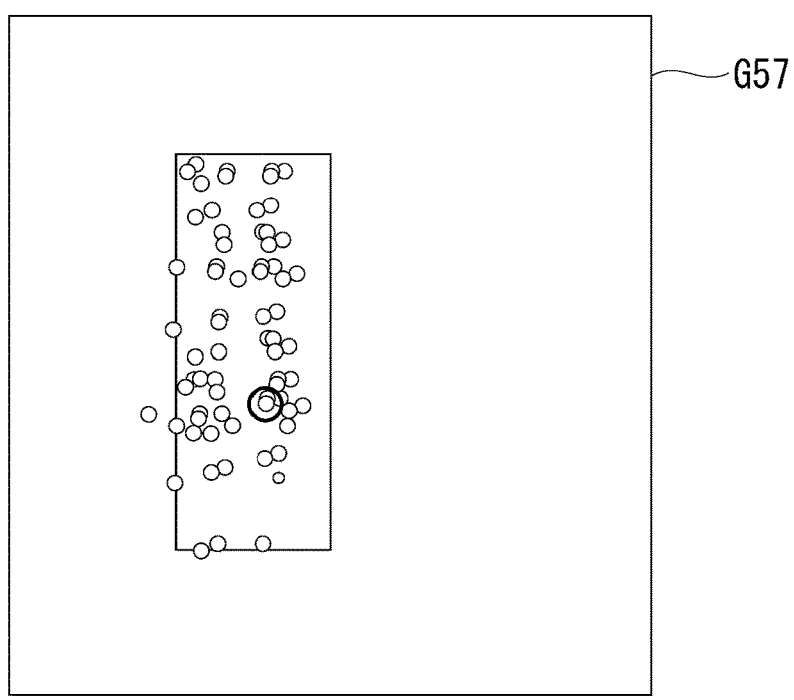
FIG. 50 is a diagram showing an example of a three-dimensional image in the eighth embodiment of the present invention.

FIG. 49 and FIG. 50 show a 3D image generated by using the method described in the eighth embodiment. FIG. 49 shows a 3D image G56 of a subject seen in the direction parallel to the X axis in a case in which a plane approximating the surface of the subject has an angle of 45 degrees for the Z axis. FIG. 50 shows a 3D image G57 of the subject seen in the direction parallel to the Y axis in a case in which the plane approximating the surface of the subject has an angle of 45 degrees for the Z axis.

In the 3D image G56 and the 3D image G57, there is a case in which a point having three-dimensional coordinates including a large error overlaps another point on the surface of the subject. For this reason, it is difficult for a user to determine whether or not the position of a measurement point is valid. In addition, when a measurement point is set near the edge of the subject, it is difficult for a user to understand the direction of shift between the edge and the measurement point.

In the ninth embodiment, the viewpoint calculation unit 185 calculates a second direction and a second viewpoint on the basis of a state of a subject in a region around a measurement point. Specifically, the reference figure calculation unit 184 calculates a reference figure on the basis of three-dimensional coordinates of at least three points. In the ninth embodiment, a reference figure is a plane that approximates the surface of the subject. Each of the at least three points is one of a plurality of points on the subject. The at least three points are determined on the basis of at least one measurement point. The second direction is parallel to a straight line axis. The straight line axis is perpendicular to the reference figure or parallel to the reference figure. The second viewpoint is on the straight line axis.

The viewpoint calculation unit 185 determines whether or not the edge of the subject is present in a region around the measurement point. When the viewpoint calculation unit 185 determines that the edge of the subject is present in the region around the measurement point, the viewpoint calculation unit 185 calculates the second direction and the second viewpoint on the basis of the position of the edge.

Figure 51:
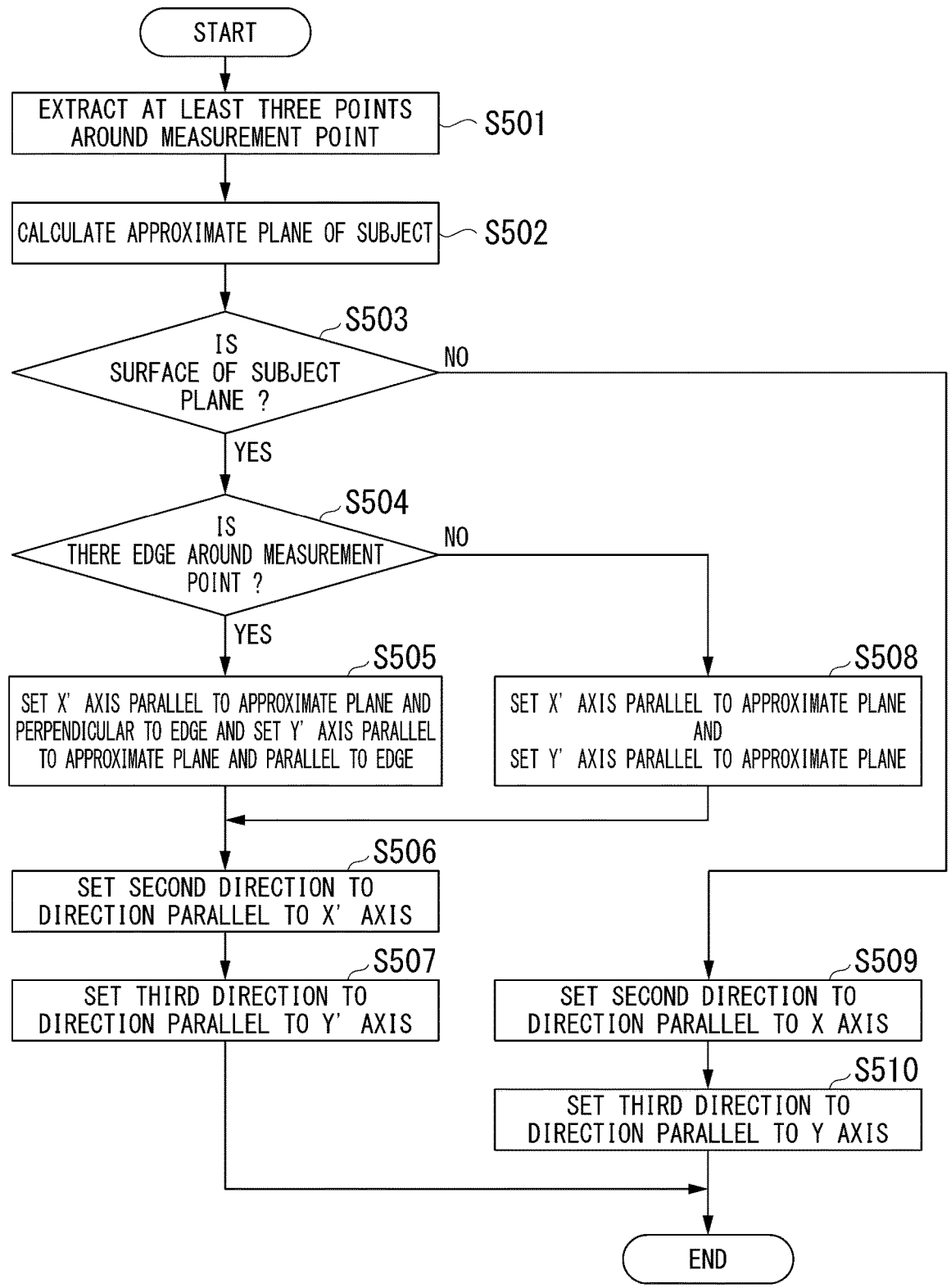
FIG. 51 is a diagram showing a procedure of calculating a direction of a visual line in a ninth embodiment of the present invention.

The method of calculating a direction of a visual line in the ninth embodiment will be described by using FIG. 51. FIG. 51 shows a procedure for calculating a direction of a visual line. The coordinate calculation unit 183 calculates three-dimensional coordinates of all pixels in a 2D image acquired by the imaging device 28. After the three-dimensional coordinates are calculated, the processing shown in FIG. 51 is executed.

The viewpoint calculation unit 185 extracts at least three points around a measurement point from a plurality of points having the three-dimensional coordinates calculated by the coordinate calculation unit 183. For example, the viewpoint calculation unit 185 extracts at least three points within a predetermined distance from the measurement point. At least three points around the measurement point may include the measurement point. At least three points around the measurement point may not include the measurement point (Step S501).

After Step S501, the viewpoint calculation unit 185 calculates an approximate plane on the basis of the three-dimensional coordinates of the at least three points that have been extracted. For example, the viewpoint calculation unit 185 calculates the approximate plane by using the least squares method (Step S502).

After Step S502, the viewpoint calculation unit 185 determines whether or not the surface of the subject is a plane. For example, the viewpoint calculation unit 185 calculates the square sum of the distance between each of the at least three points extracted in Step S501 and the approximate plane. The viewpoint calculation unit 185 compares the square sum with a predetermined threshold value. When the square sum is less than or equal to the threshold value, the viewpoint calculation unit 185 determines that the surface of the subject is a plane. When the square sum is greater than the threshold value, the viewpoint calculation unit 185 determines that the surface of the subject is not a plane (Step S503).

When the viewpoint calculation unit 185 determines that the surface of the subject is a plane in Step S503, the viewpoint calculation unit 185 determines whether or not there is an edge around the measurement point (Step S504). Various algorithms can be used for detecting an edge. For example, there is a method of detecting an edge by applying a two-dimensional filter to a 2D image. The two-dimensional filter is a canny edge detector, a Sobel filter, a Prewitt filter, or the like. There is a method of detecting an edge by applying the canny edge detector to a distance image. The distance image is an image including a distance in a pixel of a 2D image as a value of each pixel. There is a method of detecting an edge by applying a difference of normal operator to a 3D point cloud. The viewpoint calculation unit 185 may detect an edge by using a method other than the above-described methods.

When the viewpoint calculation unit 185 determines that there is an edge around the measurement point in Step S504, the viewpoint calculation unit 185 sets an X' axis and a Y' axis. The X' axis extends in a direction parallel to the approximate plane and perpendicular to the edge. The Y' axis extends in a direction parallel to the approximate plane and parallel to the edge (Step S505). In a case in which the edge does not have a straight line shape, an approximate straight line most similar to the edge may be used.

After Step S505, the viewpoint calculation unit 185 sets the second direction to a direction parallel to the X' axis (Step S506). After Step S506, the viewpoint calculation unit 185 sets the third direction to a direction parallel to the Y' axis (Step S507). When Step S507 is executed, the processing of calculating a direction of a visual line is completed.

When the viewpoint calculation unit 185 determines that there is not an edge around the measurement point in Step S504, the viewpoint calculation unit 185 sets an X' axis and a Y' axis. The X' axis extends in a direction parallel to the approximate plane. The Y' axis extends in a direction parallel to the approximate plane (Step S508). After Step S508, Step S506 is executed.

When the viewpoint calculation unit 185 determines that the surface of the subject is not a plane in Step S503, the viewpoint calculation unit 185 sets the second direction to a direction parallel to an X axis defining an initial viewpoint and an initial direction (Step S509). After Step S509, the viewpoint calculation unit 185 sets the third direction to a direction parallel to a Y axis defining the initial viewpoint and the initial direction (Step S510). When Step S510 is executed, the processing of calculating a direction of a visual line is completed.

In the procedure shown in FIG. 51, a description of a Z' axis is omitted. The Z' axis extends in a direction perpendicular to the approximate plane.

In the procedure shown in FIG. 51, a description of a second viewpoint and a third viewpoint is omitted. For example, the second viewpoint is set on the X' axis or the X axis. For example, the third viewpoint is set on the Y' axis or the Y axis.

Figure 52:
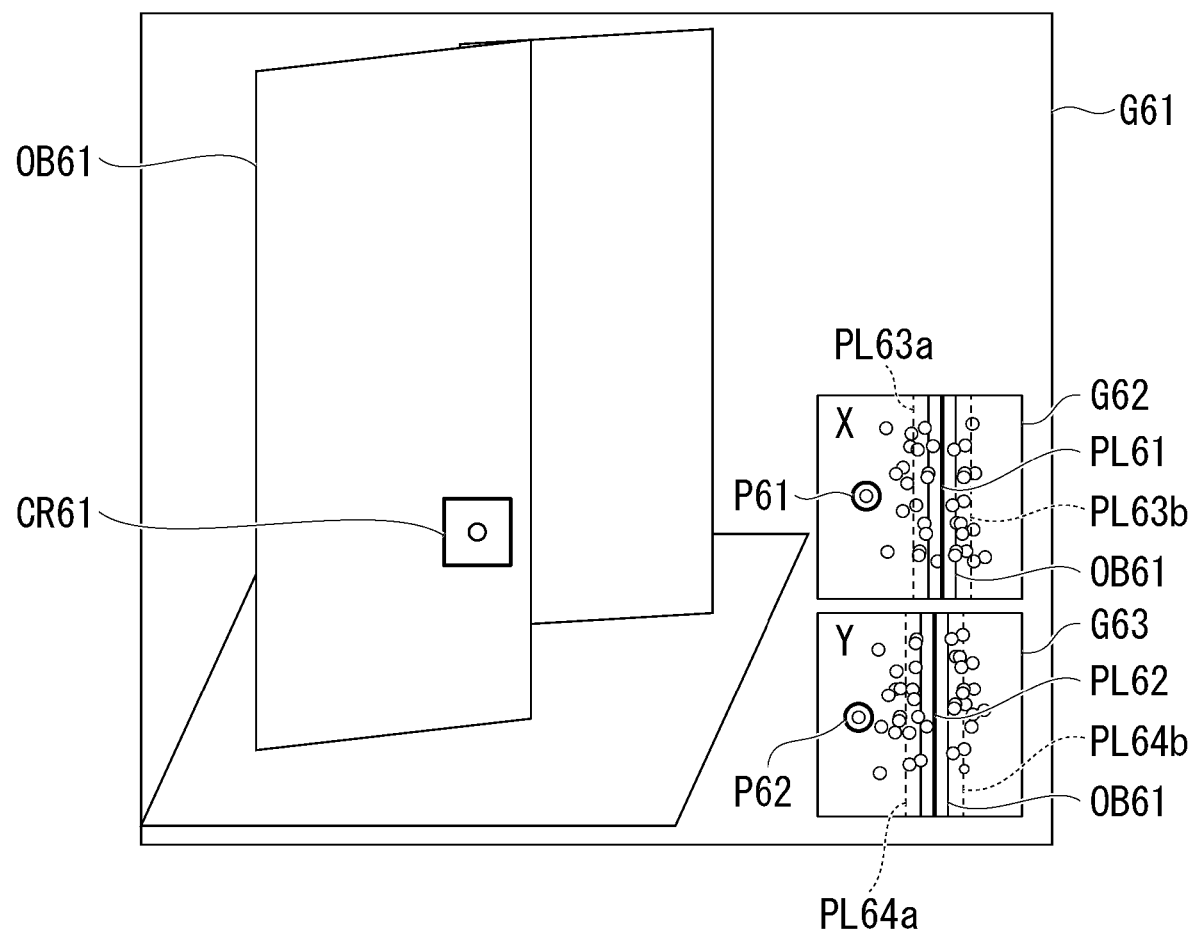
FIG. 52 is a diagram showing an example of an image displayed on a display unit according to the ninth embodiment of the present invention.

FIG. 52 shows an example of an image displayed on the display unit 5. A 3D image G61 is displayed on the display unit 5. The 3D image G61 is a 3D image of a subject OB61 seen in an initial direction from an initial viewpoint. A cursor CR61 is displayed on the 3D image G61. A measurement point is set at the position of the cursor CR61.

A 3D image G62 and a 3D image G63 are displayed on the 3D image G61. The 3D image G62 is a 3D image of the subject OB61 seen in a second direction from a second viewpoint. The 3D image G63 is a 3D image of the subject OB61 seen in a third direction from a third viewpoint. A measurement point P61 is displayed on the 3D image G62. The measurement point P61 represents a measurement point seen in the second direction from the second viewpoint. A measurement point P62 is displayed on the 3D image G63. The measurement point P62 represents a measurement point seen in the third direction from the third viewpoint. The 3D image G62 and the 3D image G63 are examples of a 3D image generated in a case in which it is determined that the surface of the subject is a plane and there is not an edge around the measurement point.

The image generation unit 186 superimposes the approximate plane calculated in Step S502 on a 3D image. The display control unit 181 displays the 3D image on which the approximate plane has been superimposed on the display unit 5. An approximate plane PL61 is displayed on the 3D image G62. An approximate plane PL62 is displayed on the 3D image G63.

The display control unit 181 displays the 3D image on which distance information has been superimposed on the display unit 5. The distance information represents a statistic of the distance between each of a plurality of points on the 3D image and the approximate plane. For example, the viewpoint calculation unit 185 calculates a standard deviation 6 of the distance between each of the at least three points extracted in Step S501 and the approximate plane. The viewpoint calculation unit 185 calculates two planes apart from the approximate plane by 2σ. The two planes are parallel to the approximate plane. The image generation unit 186 superimposes the two planes on the 3D image. The display control unit 181 displays the 3D image on which the two planes have been superimposed on the display unit 5. A plane PL63a and a plane PL63b are displayed on the 3D image G62. The plane PL63a and the plane PL63b represent a statistic. A plane PL64a and a plane PL64b are displayed on the 3D image G63. The plane PL64a and the plane PL64b represent a statistic.

A user determines the validity of the measurement point P61 on the basis of the distance between the measurement point P61 and the approximate plane PL61. Alternatively, a user determines the validity of the measurement point P62 on the basis of the distance between the measurement point P62 and the approximate plane PL62. A user can determine the validity of the measurement point P61 with reference to the plane PL63a and the plane PL63b. A user can determine the validity of the measurement point P62 with reference to the plane PL64a and the plane PL64b.

The measurement point P61 is not between the plane PL63a and the plane PL63b. In other words, the distance between the measurement point P61 and the approximate plane PL61 is large. The measurement point P62 is not between the plane PL64a and the plane PL64b. In other words, the distance between the measurement point P62 and the approximate plane PL62 is large. This shows that the three-dimensional coordinates of the measurement point represented by the cursor CR61 include a large error. For this reason, a user can determine that the position of the measurement point represented by the cursor CR61 is not valid.

Figure 53:
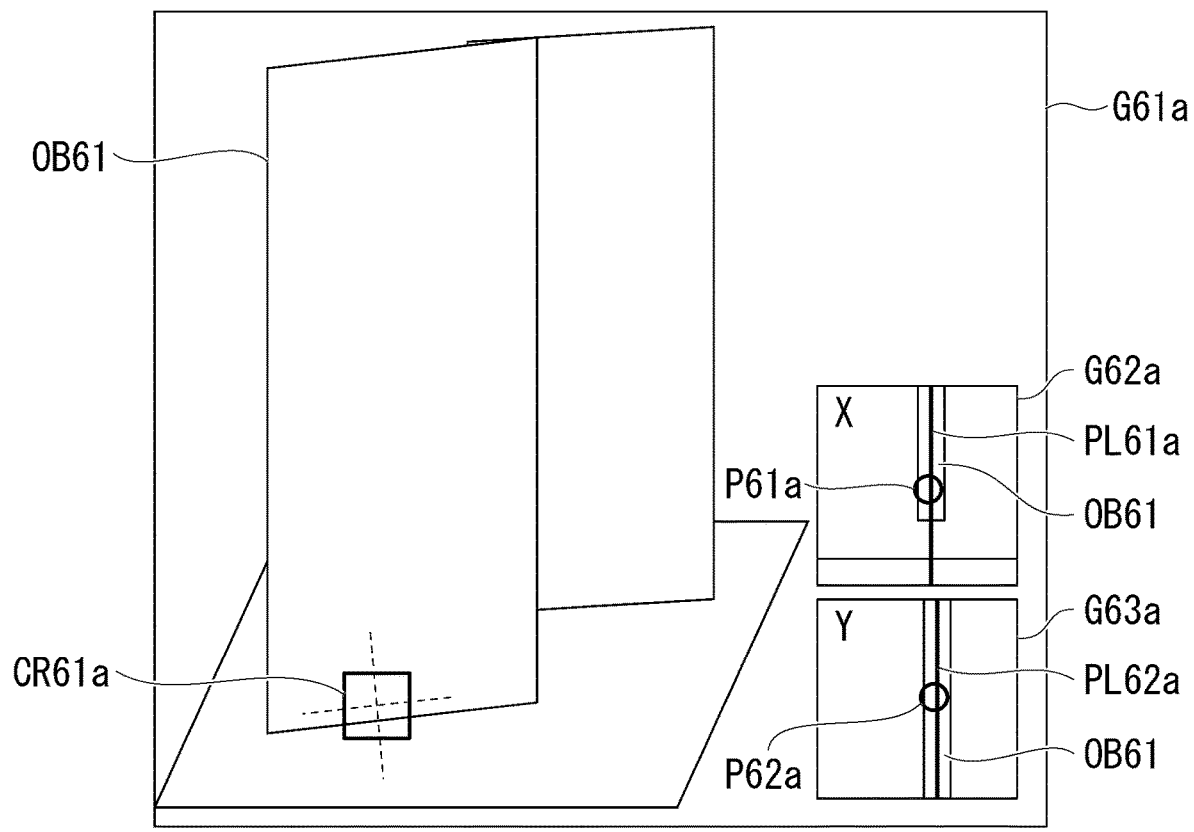
FIG. 53 is a diagram showing an example of an image displayed on the display unit according to the ninth embodiment of the present invention.

FIG. 53 shows another example of an image displayed on the display unit 5. A 3D image G61a is displayed on the display unit 5. The 3D image G61a is a 3D image of a subject OB61 seen in an initial direction from an initial viewpoint. A cursor CR61a is displayed on the 3D image G61a. A measurement point is set at the position of the cursor CR61a. The edge of the subject OB61 is present near the measurement point represented by the cursor CR61a.

A 3D image G62a and a 3D image G63a are displayed on the 3D image G61a. The 3D image G62a is a 3D image of the subject OB61 seen in a second direction from a second viewpoint. The 3D image G63a is a 3D image of the subject OB61 seen in a third direction from a third viewpoint. A measurement point P61a is displayed on the 3D image G62a. The measurement point P61a represents a measurement point seen in the second direction from the second viewpoint. A measurement point P62a is displayed on the 3D image G63a. The measurement point P62a represents a measurement point seen in the third direction from the third viewpoint. The 3D image G62a and the 3D image G63a are examples of a 3D image generated in a case in which it is determined that the surface of the subject is a plane and there is an edge around the measurement point.

An approximate plane PL61a is displayed on the 3D image G62a. An approximate plane PL62a is displayed on the 3D image G63a. Information that represents a statistic of the distance between each of a plurality of points on the 3D image and the approximate plane may be displayed on the 3D image G62a and the 3D image G63a.

The measurement point P61a is on the approximate plane PL61a. The measurement point P62a is on the approximate plane PL62a. For this reason, a user can determine that the position of the measurement point represented by the cursor CR61a is valid.

In the example shown in FIG. 52, the two 3D images G62 and G63 are displayed on the display unit 5. Only the 3D image G62 or only the 3D image G63 may be displayed on the display unit 5. In the example shown in FIG. 53, the two 3D images G62a and G63a are displayed on the display unit 5. Only the 3D image G62a or only the 3D image G63a may be displayed on the display unit 5.

In the ninth embodiment, a 3D image of a subject seen in a second direction from a second viewpoint and a 3D image of a subject seen in a third direction from a third viewpoint are displayed on the display unit 5. For this reason, the endoscope device 1 can simplify determination of validity of a point designated on an image of a subject.

In a case in which the surface of a subject is a plane in a region around a measurement point, the direction of a visual line is set to a direction parallel to the plane. For this reason, it is easy for a user to determine whether or not the position of a measurement point is valid.

In a case in which the surface of a subject is a plane in a region around a measurement point and the edge of the subject is near the measurement point, the direction of a visual line is parallel to the plane and is parallel to the edge. Alternatively, the direction of a visual line is parallel to the plane and is perpendicular to the edge. For this reason, it is easy for a user to determine whether or not the position of a measurement point is valid.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A three-dimensional image display method comprising:
    acquiring a first image that is a two-dimensional image of a subject;
    calculating three-dimensional coordinates of a plurality of points on the subject on the basis of the first image;
    displaying a second image on a display, the second image representing an image of the subject seen in a first direction from a first viewpoint, the second image being one of the first image and a three-dimensional image of the subject generated on the basis of the three-dimensional coordinates of the plurality of points;
    accepting input of at least one reference point, the at least one reference point being on a region included in the second image and being included in the plurality of points;
    calculating a reference figure on the basis of three-dimensional coordinates of at least two points that have been set on the basis of the at least one reference point, the at least two points being included in the plurality of points;
    calculating a second direction different from the first direction and a second viewpoint different from the first viewpoint on the basis of the reference figure;
    generating a third image on the basis of the three-dimensional coordinates of the plurality of points, the third image being a three-dimensional image of the subject seen in the second direction from the second viewpoint; and
    displaying the third image and information representing a position of the reference figure superimposed on the third image, on the display.

2. The three-dimensional image display method according to claim 1,
    wherein the reference figure is one of a straight line, a line segment, and a plane,
    wherein the second direction is parallel to a straight line axis, and
    wherein the straight line axis is perpendicular to the reference figure or parallel to the reference figure.

3. The three-dimensional image display method according to claim 2,
    wherein the reference figure is one of the straight line and the line segment, and
    wherein the straight line axis is perpendicular to the reference figure.

4. The three-dimensional image display method according to claim 2,
    wherein the reference figure is one of the straight line and the line segment, and
    wherein the straight line axis is parallel to the reference figure.

5. The three-dimensional image display method according to claim 2,
    wherein the reference figure is the plane, and
    wherein the straight line axis is parallel to the reference figure.

6. The three-dimensional image display method according to claim 2,
    wherein the reference figure is one of the straight line and the line segment,
    wherein the three-dimensional image display method comprises calculating an approximate plane on the basis of three-dimensional coordinates of at least three points,
    wherein the approximate plane is a plane that approximates a surface of the subject,
    wherein the at least three points are included in the plurality of points and are near the reference figure or on the reference figure, and
    wherein the straight line axis is parallel to the approximate plane.

7. The three-dimensional image display method according to claim 2,
    wherein the reference figure is one of the straight line and the line segment,
    wherein the three-dimensional image display method comprises calculating an approximate plane on the basis of three-dimensional coordinates of at least three points,
    wherein the approximate plane is a plane that approximates a surface of the subject,
    wherein the at least three points are included in the plurality of points and are near the reference figure or on the reference figure, and
    wherein the straight line axis is perpendicular to the approximate plane.

8. The three-dimensional image display method according to claim 2,
    wherein the second direction is a direction from a first region to a second region,
    wherein the straight line axis passes through the first region and the second region,
    wherein a volume of the first region and a volume of the second region are the same, and
    wherein the volume of the subject included in the first region is less than the volume of the subject included in the second region.

9. The three-dimensional image display method according to claim 2, comprising:
    calculating a third direction and a third viewpoint on the basis of the reference figure, the third direction being different from any of the first direction and the second direction, the third viewpoint being different from any of the first viewpoint and the second viewpoint;
    generating a fourth image on the basis of the three-dimensional coordinates of the plurality of points, the fourth image being a three-dimensional image of the subject seen in the third direction from the third viewpoint; and displaying the fourth image and information representing a position of the reference figure superimposed on the fourth image, on the display.

10. The three-dimensional image display method according to claim 9, comprising:
when the second direction and the second viewpoint that are based on the subject are changed, generating the second image again on the basis of the changed second direction and the changed second viewpoint;
when the second viewpoint that is based on the subject is changed, changing the third viewpoint that is based on the subject such that a relative relationship between the second viewpoint and the third viewpoint is maintained;
when the second direction that is based on the subject is changed, changing the third direction that is based on the subject such that a relative relationship between the second direction and the third direction is maintained;
generating the fourth image again on the basis of the changed third direction and the changed third viewpoint;
displaying the second image generated again and the fourth image generated again on the display.

11. The three-dimensional image display method according to claim 2,
wherein, after displaying the second image, displaying the third image on the display such that at least part of the third image overlaps the second image.

12. The three-dimensional image display method according to claim 2,
wherein, after displaying the second image, displaying the third image on the display such that the third image does not overlap the second image.

13. The three-dimensional image display method according to claim 2, comprising displaying information that represents the second viewpoint and the second direction on the display.

14. The three-dimensional image display method according to claim 2,
wherein the reference figure is one of the straight line and the line segment, and
wherein the three-dimensional image display method comprises generating the third image on the basis of three-dimensional coordinates of at least three points, and
wherein the at least three points are included in the plurality of points and are on a plane that passes through the reference figure and is perpendicular to the straight line axis.

15. The three-dimensional image display method according to claim 2,
wherein the reference figure is one of the straight line and the line segment,
wherein the three-dimensional image display method comprises generating the third image on the basis of three-dimensional coordinates of at least three points, and
wherein the at least three points are included in the plurality of points and are away from a plane in the second direction, the plane passing through the reference figure and being perpendicular to the straight line axis.

16. The three-dimensional image display method according to claim 2,
wherein the reference figure is one of the straight line and the line segment, wherein the three-dimensional image display method comprises generating the third image on the basis of three-dimensional coordinates of at least three points,
wherein the at least three points are included in the plurality of points and are positioned in a region between a first plane and a second plane,
wherein the first plane passes through the reference figure and is perpendicular to the straight line axis, and
wherein the second plane is perpendicular to the straight line axis and is away from the first plane in the second direction.

17. The three-dimensional image display method according to claim 2,
wherein the reference figure is the plane, and
wherein the three-dimensional image display method comprises displaying the third image and distance information superimposed on the third image, on the display, and
wherein the distance information represents a statistic of a distance between each point included in the plurality of points and the plane.

18. The three-dimensional image display method according to claim 1, comprising calculating the reference figure on the basis of three-dimensional coordinates of at least three points,
wherein the reference figure is a plane that approximates a surface of the subject,
wherein the at least three points are included in the plurality of points and are determined on the basis of the at least one reference point,
wherein the second direction is parallel to a straight line axis, and
wherein the straight line axis is perpendicular to the reference figure or parallel to the reference figure.

19. A three-dimensional image display device comprising:
a processor comprising hardware, wherein the processor is configured to:
acquire a first image that is a two-dimensional image of a subject;
calculate three-dimensional coordinates of a plurality of points on the subject on the basis of the first image;
display a second image on the display, the second image representing an image of the subject seen in a first direction from a first viewpoint, the second image being one of the first image and a three-dimensional image of the subject generated on the basis of the three-dimensional coordinates of the plurality of points;
accept input of at least one reference point, the at least one reference point being on a region included in the second image and being included in the plurality of points;
calculate a reference figure on the basis of three-dimensional coordinates of at least two points that have been set on the basis of the at least one reference point, the at least two points being included in the plurality of points;
calculate a second direction different from the first direction and a second viewpoint different from the first viewpoint on the basis of the reference figure;
generate a third image on the basis of the three-dimensional coordinates of the plurality of points, the third image being a three-dimensional image of the subject seen in the second direction from the second viewpoint; and display the third image and information representing a position of the reference figure on the third, on the display.

20. A non-transitory computer-readable recording medium saving a program for causing a computer to execute:
- acquiring a first image that is a two-dimensional image of a subject;
- calculating three-dimensional coordinates of a plurality of points on the subject on the basis of the first image;
- displaying a second image on the display, the second image representing an image of the subject seen in a first direction from a first viewpoint, the second image being one of the first image and a three-dimensional image of the subject generated on the basis of the three-dimensional coordinates of the plurality of points;
- accepting input of at least one reference point, the at least one reference point being on a region included in the second image and being included in the plurality of points;
- calculating a reference figure on the basis of three-dimensional coordinates of at least two points that have been set on the basis of the at least one reference point, the at least two points being included in the plurality of points;
- calculating a second direction different from the first direction and a second viewpoint different from the first viewpoint on the basis of the reference figure;
- generating a third image on the basis of the three-dimensional coordinates of the plurality of points, the third image being a three-dimensional image of the subject seen in the second direction from the second viewpoint; and
- displaying the third image and information representing a position of the reference figure superimposed on the third image, on the display.

21. A three-dimensional image display method comprising:
- acquiring a first image that is a two-dimensional image of a subject;
- calculating three-dimensional coordinates of a plurality of points on the subject on the basis of the first image;
- displaying a second image on a display, the second image representing an image of the subject seen in a first direction from a first viewpoint, the second image being one of the first image and a three-dimensional image of the subject generated on the basis of the three-dimensional coordinates of the plurality of points;
- accepting input of at least one reference point, the at least one reference point being on a region included in the second image and being included in the plurality of points;
- calculating a reference figure on the basis of three-dimensional coordinates of at least two points that have been set on the basis of the at least one reference point, the at least two points being included in the plurality of points;
- calculating a second direction different from the first direction and a second viewpoint different from the first viewpoint on the basis of the reference figure;
- generating a third image on the basis of the three-dimensional coordinates of the plurality of points, the third image being an image of the subject seen in the second direction from the second viewpoint; and
- displaying the third image and information representing a position of the reference figure superimposed on the third image, on the display.

22. The three-dimensional image display method according to claim 1,
wherein the second image and the third image are displayed on the same screen of the display.

* * * * *